US012477642B2

(12) United States Patent
Sabolcik et al.

(10) Patent No.: US 12,477,642 B2
(45) **Date of Patent: *Nov. 18, 2025**

(54) CROSSTALK MITIGATION FOR LIGHTING CONTROL

(71) Applicant: Wangs Alliance Corporation, Port Washington, NY (US)

(72) Inventors: Michael Sabolcik, Leander, TX (US); Suman Minnaganti, Austin, TX (US); Paul McGinnis, Austin, TX (US)

(73) Assignee: Wangs Alliance Corporation, Port Washington, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/814,908

(22) Filed: Aug. 26, 2024

(65) Prior Publication Data

US 2025/0008630 A1 Jan. 2, 2025

Related U.S. Application Data

(63) Continuation of application No. 18/521,272, filed on Nov. 28, 2023, now Pat. No. 12,075,545.
(Continued)

(51) Int. Cl.
*H05B 47/185* (2020.01)
*H05B 45/10* (2020.01)

(52) U.S. Cl.
CPC ........... *H05B 47/185* (2020.01); *H05B 45/10* (2020.01)

(58) Field of Classification Search
CPC ...... H05B 47/185; H05B 45/10; H05B 47/19; H05B 47/10; H05B 47/165; H05B 47/17; H05B 47/11; H05B 45/12; H05B 47/16; H05B 6/688; H05B 45/382; H05B 45/39; H05B 47/199; H05B 47/29; H05B 45/14;
(Continued)

(56) References Cited

U.S. PATENT DOCUMENTS 6,459,919 B1 * 10/2002 Lys ........................ H05B 47/18 600/407
7,128,440 B2 10/2006 Mateescu et al.
(Continued)

OTHER PUBLICATIONS

FOCUS LCDs, Focus LCDs is an ISO 9001:2015 certified organization that has been at the forefront of LCD technology since our inception in 2001, Website: https://focuslcds.com/LCD-resources/rgb-signals-and-timing-diagrams/?srsltid=AfmBOooyGNnnt9c7YX_Nu9yB97f-0i8g8Dof1dcKYc8mM2aPDkbwz0gx (Year: 2001).*
(Continued)

*Primary Examiner* — Monica C King
(74) *Attorney, Agent, or Firm* — Weiss & Arons LLP

(57) ABSTRACT

Apparatus and methods for crosstalk mitigation in a lighting system. The apparatus may include a circuit. The circuit may be configured to receive electrical power. The circuit may be configured to provide lighting power from the electrical power, along an electrical power transmission line, to a light-emitting diode ("LED") light fixture. The circuit may be configured to transmit along the electrical power transmission line first lighting control information that is configured to control light emitted from the fixture. The circuit may be configured to transmit along the electrical power transmission line second lighting control information that is defined by a pattern in the lighting power.

5 Claims, 39 Drawing Sheets

Related U.S. Application Data

(60) Provisional application No. 63/523,711, filed on Jun. 28, 2023.

(58) Field of Classification Search
CPC .. H05B 47/00; H05B 1/0252; H05B 45/3575; H05B 45/395; H05B 6/668; F21Y 2115/10; F21Y 2103/10
See application file for complete search history.

(56) References Cited

U.S. PATENT DOCUMENTS

| | | | | |
|---|---|---|---|---|
| 10,201,063 | B2 | 2/2019 | Leinen et al. | |
| 10,251,246 | B2 | 4/2019 | Shukla et al. | |
| 10,650,621 | B1 * | 5/2020 | King | G07C 5/0816 |
| 11,003,548 | B2 | 5/2021 | Raghuram et al. | |
| 11,232,655 | B2 * | 1/2022 | Bhattacharyya | H04L 67/12 |
| 2012/0140748 | A1 | 6/2012 | Carruthers | |
| 2015/0237694 | A1 | 8/2015 | Zudrell-Koch | |
| 2016/0095186 | A1 | 3/2016 | Reed | |
| 2016/0234899 | A1 * | 8/2016 | Reed | H05B 45/46 |
| 2017/0086281 | A1 * | 3/2017 | Avrahamy | H05B 47/115 |
| 2017/0164439 | A1 * | 6/2017 | Reed | F21V 9/30 |
| 2017/0265287 | A1 * | 9/2017 | Avrahamy | H05B 47/115 |
| 2018/0013986 | A1 * | 1/2018 | Chien | F21V 29/00 |
| 2019/0313503 | A1 * | 10/2019 | Woytowitz | H05B 45/20 |
| 2019/0373687 | A1 * | 12/2019 | Williams | H05B 45/46 |
| 2021/0112647 | A1 * | 4/2021 | Coleman | G01S 7/497 |
| 2021/0219237 | A1 | 7/2021 | Lu | |
| 2021/0345085 | A1 | 11/2021 | Anselm et al. | |
| 2022/0062463 | A1 * | 3/2022 | Ramer | H05B 47/16 |

OTHER PUBLICATIONS

TFT LCD, Website: https://en.wikipedia.org/wiki/TFT_LCD "By 2013, most modern high-resolution and high-quality electronic visual display devices used TFT-based active matrix displays. [6][7][4][8][9][10]" (Year: 2013).*

* cited by examiner

Over current and short circuit Protection 1

Peak detection circuit

2400

CROSSTALK MITIGATION FOR LIGHTING CONTROL

CROSS-REFERENCE TO RELATED APPLICATIONS

This application is a continuation of co-pending U.S. patent application Ser. No. 18/521,272, filed on Nov. 28, 2023, which issued as U.S. Pat. No. 12,075,545, which is a nonprovisional of U.S. Provisional Application No. 63/523,711, filed on Jun. 28, 2023, both of which are hereby incorporated herein by reference in their entireties.

BACKGROUND

Light emitting diode ("LED") lighting apparatus often include multiple fixture control modules. As different signals are transmitted along power communication lines, crosstalk often occurs. The crosstalk generally occurs between different communication lines of different fixture groups. An LED light source of a first fixture group can receive signals intended for a second fixture group. An LED light source can receive multiple signals. A light emitted by the LED light source may not correspond to a user selected light output.

Installers routinely install landscape lighting wires that run from different fixture control modules to different fixtures in a conduit. Because most installers do not use twisted or shielded wires, strong crosstalk between the different wires often occurs. Signals are often passed through the different wires included in the conduit.

As such it may be desirable to provide a system for mitigating crosstalk between communication lines within a lighting apparatus.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

Figure 1:
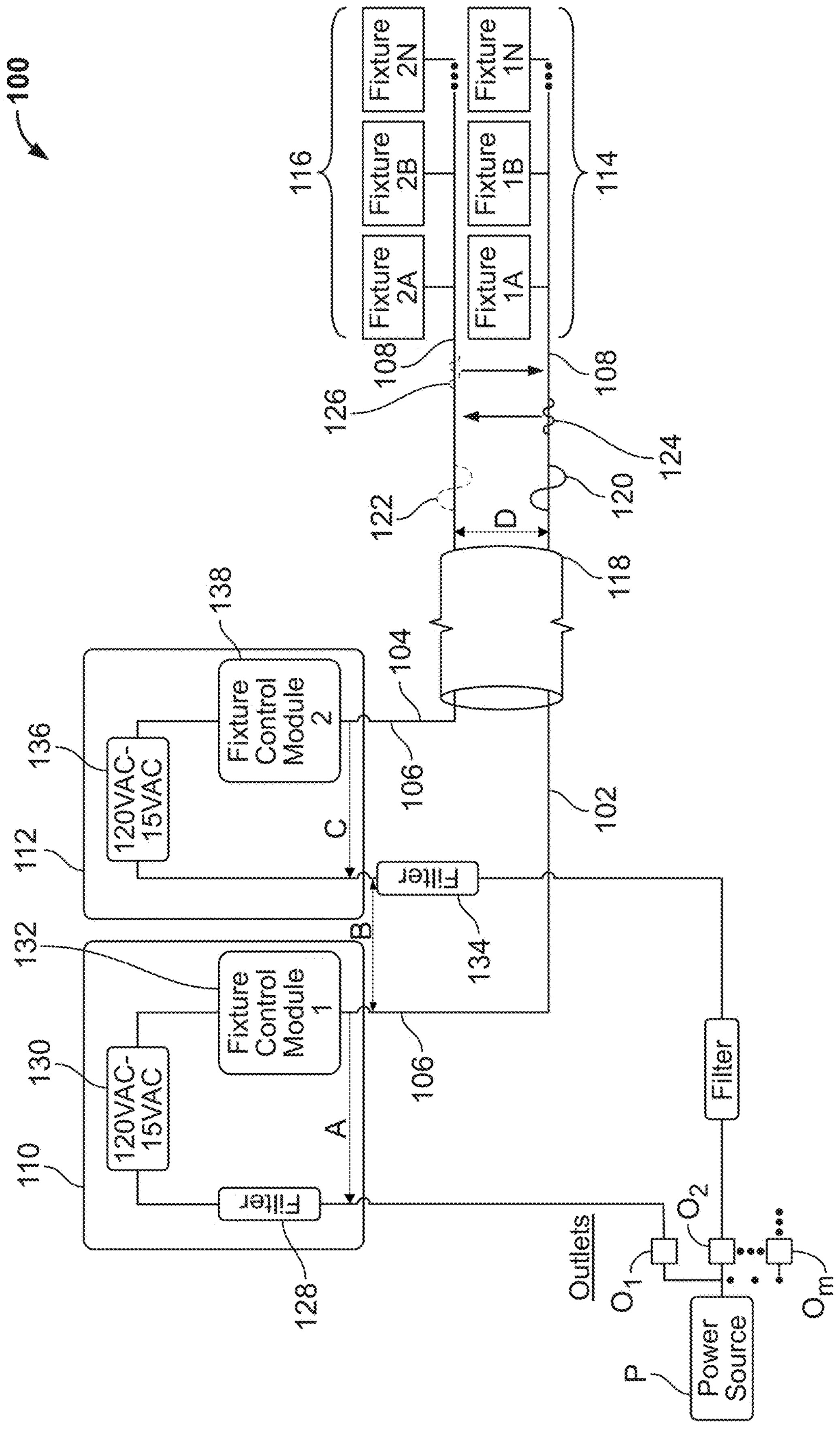
FIG. 1 shows schematically illustrative apparatus in accordance with the principles of the invention.

The leftmost digit (e.g., "L") of a three-digit reference numeral (e.g., "LRR"), and the two leftmost digits (e.g., "LL") of a four-digit reference numeral (e.g., "LLRR"), generally identify the first figure in which a part is called-out.

DETAILED DESCRIPTION

Apparatus and methods for crosstalk mitigation are provided.

The apparatus may include a fixture control module. The fixture control module may include a circuit. The circuit may be configured to receive electrical power. The circuit may be configured to provide lighting power from the electrical power, along a power transmission line, to a light-emitting diode ("LED") light fixture. The circuit may be configured to transmit along the power transmission line first lighting control information that is configured to control light emitted from the fixture. The circuit may be configured to transmit along the power transmission line second lighting control information that is defined by a pattern in the lighting power.

The fixture control module may be referred to as a "transformer unit."

Each fixture may be uniquely addressable by a lighting control unit. Table 1 lists illustrative lighting control information elements.

TABLE 1

Illustrative lighting control information elements.
Illustrative lighting control information elements

| Discovery | |
|---|---|
| Information | Description |
| Pattern | Alerts fixture that discovery is in progress |
| DiscoveryPending | Announces intent to initiate discovery process |
| RemoteNodeID | Identifies "other" lighting controller |
| LocalNodeID | Identifies lighting controller "itself" |
| Discovery Initiated | Announces beginning of discovery process |
| DiscoverNodes | Alerts fixture that discovery is in process |
| DiscoveryResponse | Acknowledges beginning of discovery. May include fixture ID. |
| SetMasterID | Instructs fixture to set as governing lighting controller the ID of lighting controller that initiated discovery |
| masterIDSet | Acknowledges setting as governing lighting controller the ID of lighting controller that initiated discovery |

| Lighting configuration | |
|---|---|
| Information | Description |
| Dimming level | Instruction to set fixture to a dimming level |
| Correlated Color Temperature ("CCT") | Instruction to adjust fixture to emit white light of a certain CCT |
| CCT warming curve | Parameters that define an operational CCT mix as a function of dimming level |
| Group lighting control messages | Instruction to set light of fixtures identified as members of a selected group |
| Scene ID | Set fixtures or groups to preselected scene, which may be defined by dimming levels or color temperatures |
| Scene trigger | Activate scene in response to a trigger, such as a user-activated switch, date, time of day, motion sensor, voice system |
| Other suitable elements | |

The apparatus may include a male plug. The plug may be configured to be inserted into a National Electrical Manufacturers Association ("NEMA") approved electrical outlet. The plug may be configured to receive the electrical power.

The lighting power may be carried by alternating current having a voltage in the range 10-20 VAC.

The lighting power may be carried by alternating current having a nominal frequency in the range 50-60 Hz.

The first lighting control information may be carried by a current having a nominal frequency that is not less than 1 MHz.

The first lighting control information may be carried by a current having a nominal frequency that is not less than 100 Hz.

The pattern may include a square wave.

The pattern may include a pulse. The pattern may include a pause. The pattern may include a repetition of a sequence that includes a pulse and a pause.

The pattern may include a pulse of a predetermined voltage. The predetermined voltage may be transmitted as a 15 VAC current.

Table 2 lists illustrative ranges that may include nominal values of the predetermined voltage.

TABLE 2

Illustrative ranges that may include nominal values of the predetermined voltage.
Illustrative ranges that may include nominal values of the predetermined voltage.

| From | To | From | To |
|---|---|---|---|
| 1 | 5 | 30 | 35 |
| 5 | 10 | 35 | 40 |
| 10 | 15 | 40 | 45 |
| 15 | 20 | 45 | 50 |
| 20 | 25 | 50 | >50 |
| 25 | 30 | Other suitable lower limits | Other suitable upper limits |

The pulse may have a duration. During the pulse, the voltage may be held at a steady AC voltage level. Table 3 lists illustrative ranges that may include a length of the duration.

TABLE 3

| Illustrative ranges that may include a length of the duration. Illustrative ranges (sec.) that may include a length of the duration | | | |
|---|---|---|---|
| From | To | From | To |
| 0.01 | 0.1 | 4 | 5 |
| .1 | .5 | 5 | 6 |
| .5 | 1 | 6 | 10 |
| 1 | 2 | 10 | 100 |
| 2 | 3 | 100 | >100 |
| 3 | 4 | Other suitable lower limits | Other suitable upper limits |

Table 4 lists illustrative ranges that may include a length of the pause.

TABLE 4

| Illustrative ranges that may include a length of the pause. Illustrative ranges (sec.) that may include a length of the pause | | | |
|---|---|---|---|
| From | To | From | To |
| 0.01 | 0.1 | 4 | 5 |
| .1 | .5 | 5 | 6 |
| .5 | 1 | 6 | 10 |
| 1 | 2 | 10 | 100 |
| 2 | 3 | 100 | >100 |
| 3 | 4 | Other suitable lower limits | Other suitable upper limits |

The apparatus may include a first transformer unit. The apparatus may include a second transformer unit. The apparatus may include any suitable number of transformer units. The first and second transformer units may receive 120 volts of AC voltage. The voltage may be received from an outlet. The outlet may transmit line power to the first and second transformer units. The line power may have an AC voltage of 120V. The first and second transformer units may step-down the voltage to 15 VAC voltage.

The first and second transformer units may include filters. The filters may prevent signals from being transmitted backwards on the wires carrying the 120V from the outlet to the transformer units. The filters may prevent crosstalk that can occur between the high voltage wires.

The apparatus may include a first group of fixtures. The first group of fixtures may include one or more fixtures. The one or more fixtures may include one or more light emitting diode ("LED") light sources. The first group of fixtures may include a first fixture driver circuit. The first fixture driver circuit may include a receiver. The first group of fixtures may be connected to the first transformer unit. The connection may be a physical connection. The connection may be through a wire. The wire may include copper.

The apparatus may include a second group of fixtures. The second group of fixtures may include one or more fixtures. The one or more fixtures may include one or more light emitting diode ("LED") light sources. The second group of fixtures may include a second fixture driver circuit. The second fixture driver circuit may include a receiver. The second group of fixtures may be connected to the second transformer unit. The connection may be a physical connection. The connection may be through a wire. The wire may include copper.

A user may control the brightness of the light emitted by the LED light source or the fixture. A user may control the color of the light emitted by the LED light source or the fixture. A user may control the intensity of the light emitted by the LED light source or the fixture. A user may control dim-to-warm level of the light emitted from the LED light source or the fixture. A user may control any suitable feature of the light emitted by the LED light source or the fixture. A user may control the light emitted from the LED light source or the fixture using a software application. The software application may be on a mobile device.

The apparatus may include a microcontroller. The apparatus may include a power line communication ("PLC") module. The PLC module may be configured to transmit data along a power transmission line that provides operational power to a fixture. The microcontroller may be configured to provide to the PLC module the first lighting control information. The PLC module may be configured to provide the first lighting control information to the power transmission line.

The transformer unit may include a PLC module. The PLC module may be initiated on a chip. The chip may be included in the transformer unit. The PLC module may be connected to a central processing unit ("CPU"). The CPU many include a memory protection unit (MPU).

Two or more PLC modules may communicate with each other over a conductor that transmits power. A PLC module may communicate using a carrier signal that is within a predetermined frequency band. The band may be referred to as a channel. Communication in the channel may be full-duplex communication. Communication in the channel may be half-duplex communication. Communication in the channel may be simplex communication.

Lighting control information may be transmitted via the channel. Lighting control information may be propagated via a power transmission line, but not via the channel.

Lighting control information that is propagated via the power transmission line, but not via the channel, may include current and voltage that conform, respectively, to the current and voltage that are used to power the fixtures. Lighting control information that is propagated via a power transmission line, but not via the channel, may include current that is outside a range of current provided in the channel. Lighting control information that is propagated via a power transmission line, but not via the channel, may include voltage that is outside a range of voltage that is provided in the channel. Lighting control information that is propagated via a power transmission line, but not via the channel, may include current that is greater than the current provided in the channel and less than the current that is used to power the fixtures. Lighting control information that is propagated via a power transmission line, but not via the channel, may include voltage that is greater than the voltage provided in the channel and less than the voltage that is used to power the fixtures.

The first and second transformer units may each include a transmitter. The first and second transformer units may each include a receiver. The first and second transformer units may each include a transceiver. The transceiver may receive a signal. The signal may correspond to a user selected control setting. The user selected control setting may include the first lighting control information.

The PLC module may encode the received signal. The PLC module may encode the received signal into a signal that is readable by the fixtures. The PLC may transmit the encoded signals along a PLC communication line. The PLC communication lines may be low voltage communication lines. The PLC communication line may transmit the encoded signals through pulse width modulated ("PWM") signals.

The receivers included in the first and second fixture driver circuits may receive the encoded signals. The receivers may decode the signals. The fixture driver circuits may run a corresponding protocol to implement the selected user control setting.

A PLC communication from the first transformer unit may address the first group of fixtures. A PLC communication from the second transformer unit may address the second group of fixtures. The first and second group of fixtures may not know which transformer unit they are wired to. The second group of fixtures may determine that it is wired to the first transformer unit. The first group of fixtures may determine it is wired to the second transformer unit. Encoded signals that are being transmitted from the first transformer unit may be picked up by both the first group of fixtures and the second group of fixtures.

Crosstalk between the different communication lines may cause uncertainty about which transformer unit is wired to which group of fixtures. Crosstalk may cause unwanted noise. Crosstalk may prevent the transmission of the correct signal to the correct group of fixtures. Crosstalk may disrupt the control of the fixtures. A fixture may receive more than one signal. A fixture may receive the wrong signal. A fixture may receive a signal from the wrong transformer unit. As such, the fixture may not emit a light at a specific color and intensity level that a user selected.

Crosstalk may interrupt the transmission of a user-selected controls to the correct fixtures. Due to crosstalk, there may be a detectable lag between user-selected controls being transmitted and performance of the operations corresponding to such controls by a fixture or a group of fixtures. As a result of crosstalk, pairing of transformer units with fixtures that are wired to them may render the system as a whole or its components inoperable or not fully operable.

While crosstalk may remain even after a transformer unit is paired with a wired fixture, such crosstalk may not affect control of the fixture because through the pairing the fixture becomes controllable only by the paired transformer unit. For example, a unique identifier of a fixture may be passed on to the paired transformer unit during pairing. A unique identifier of a transformer unit may be passed on to the paired fixture during pairing. Mitigating crosstalk before pairing to enable pairing may mitigate effects of crosstalk on a system or its components after pairing has been established. Using or manipulating crosstalk, for example, by allowing a transformer unit to identify both those fixtures that are in conductive communication with a transformer and those, if any, that are not, the lighting controller may enable the transformer unit to identify and pair only with fixtures wired to the transformer unit.

The lighting apparatus may communicate with fixtures in a broadcast mode.

The identified crosstalk may be mitigated using the crosstalk itself. Because of crosstalk, each transformer unit may be "aware" of all the fixtures in a system, whether or not the fixtures are connected to the transformer unit by wire. Features governing the powering on or off of the one or more transformer units and one or more fixtures in the system may lead to mitigation of crosstalk. For example, enabling identification of fixtures wired to a given transformer unit by mitigating crosstalk may allow the fixtures to be paired with the given transformer unit. This may eliminate any visibly detectable lag between transmission of a user command and the fixture's performance of an operation corresponding to such a command. This may enable higher speed signal transmission and more seamless performance of a lighting system and components thereof. The protocols may include initiating or performing a discovery process.

The discovery process may include a begin-discovery phase. The begin-discovery phase may include disabling an auto-discover mode. The begin-discovery phase may be initiated with a button press. The button may be on the transformer unit. The button may be pressed through a mobile application.

The discovery process may include a discovery-pending phase. In the discovery-pending phase the first transformer unit may send a DISCOVERY-PENDING message. The microcontroller may be configured to transmit, via the PLC module, a DISCOVERY-PENDING message.

The DISCOVERY-PENDING message may indicate that a given transformer unit is beginning the discovery process. The DISCOVERY-PENDING message may be broadcasted to all connected elements of the lighting apparatus. In the discovery-pending mode, the first transformer unit may receive a DISCOVERY-PENDING message from a third transformer unit. The third transformer unit may have a node ID that is greater than a node ID of the first transformer unit. In response to receiving a DISCOVERY-PENDING message from the third transformer unit with a greater node ID, the first transformer unit may terminate its discovery process.

In the discovery-pending phase, the first transformer unit may receive a DISCOVERY-PENDING message from a fourth transformer unit. The fourth transformer unit may have a node ID that is less than a node ID of the first transformer unit. In response to receiving a DISCOVERY-PENDING message from the fourth transformer unit with a lesser node ID, the first transformer unit may continue its discovery process, while the fourth transformer unit terminates its discovery process.

In the discovery-pending phase, the first transformer unit may receive a DISCOVERY-INITIATED message of a fifth transformer unit. The first transformer unit may receive a DISCOVER-NODES message of a fifth transformer unit. In response to receiving either a DISCOVERY-INITIATED message, a DISCOVER-NODE message, or any other suitable message indicating that another transformer unit is in middle of initiating a discovery process, the first transformer unit may terminate its discovery process.

The microcontroller may be a first microcontroller. The power transmission line may be a first power transmission line. The discovery-pending message may be a first discovery pending message. The first microcontroller may be configured to perform a delay.

If during the delay the first microcontroller: (a) receives a second discovery pending message from a second microcontroller via a second power transmission line; and (b) determines that the second microcontroller has a higher priority than the first microcontroller, the first microcontroller may terminate the discovery process.

If the first microcontroller: (a) receives a second discovery pending message from a second microcontroller via a second power transmission line; and (b) determines that the second microcontroller has a lower priority than the first microcontroller, the first microcontroller may send a discovery-initiated message, via the PLC module, over the first power transmission line.

Once all other transformer units are determined not to be initiating a discovery process, the first transformer unit may begin a discovery-initiated phase. In the discovery-initiated phase, the first transformer unit may broadcast a DISCOV- ERY-INITIATED message to all elements included in the lighting apparatus. The DISCOVERY-INITIATED message may be broadcast continually. The DISCOVERY-INITIATED message may be broadcast continually as long as the first transformer unit is running the discovery process.

The discovery process may include a power-cycling phase. The first transformer unit may send a power cycle to the fixtures that are connected. The power cycle may include a cycle of alternations between high and low power. The fixtures may detect the power cycle. When the fixtures detect the power cycle the same amount or more than a predetermined number of times, discovery may be enabled.

The power cycle may include the pattern. The apparatus may include a power-limiting circuit. The microcontroller may be configured to cause the power-limiting circuit to output to the power transmission line lighting power expressing the pattern.

The microcontroller may receive a request to discover a light fixture. In response to receiving the request, the microcontroller may instruct the power-limiting circuit to transmit the second lighting control information. The PLC module may be configured to receive third lighting control information from the power transmission line. The first microcontroller may be configured to transmit the second lighting control information after sending the DISCOVERY-INITIATED message.

The power-limiting circuit may include a dimming circuit.

The microcontroller may identify a light fixture based on first lighting control information from the power transmission line.

The discovery process may include a fixture-discovery phase. In the fixture-discovery phase, the first transformer unit may broadcast a DISCOVER-NODES message. The DISCOVER-NODES message may be broadcast to all elements of the lighting apparatus. Only fixtures that were determined to be connected to the first transformer unit may respond to the DISCOVER-NODES message.

The first microcontroller may be configured to receive from a first power transmission line fixture that is not on the second power transmission line, via the PLC module, third lighting control information.

The third lighting control information may include a discovery response. The discovery response may include a DISCOVER-NODES message.

The discovery response may include a first power transmission line fixture identifier.

The first microcontroller may be configured to provide, in response to the discovery response, to the first power transmission line fixture, a first fixture control module identifier.

The discovery process may include an end-discovery phase. Once discovery is complete, the discovery process may be terminated. In response to a discovery complete, the lighting apparatus may output a success LED pattern. Once discovery is disabled, the DISCOVERY-INITIATED message may be terminated.

The apparatus may include a fixture. The fixture may include first circuitry. The first circuitry may include a light-emitting diode ("LED") light source. The first circuitry may be configured to receive lighting power from an electrical power transmission line. The first circuitry may be configured to emit light from the LED light source using energy from the lighting power. The fixture may include second circuitry. The second circuitry may be configured to receive first lighting control information from the electrical power transmission line. The second circuitry may be configured to control the light based on the first lighting control information. The second circuitry may be configured to output, in response to second lighting control information defined by a pattern in the lighting power, third lighting control information. The third lighting information may be different from the first lighting control information.

The fixture may include a microcontroller that is configured to detect the pattern. The apparatus may include a microcontroller that is configured to provide to the second circuitry the third lighting control information.

The first circuitry may include a boost converter. The boost converter may be configured to receive from the power transmission line the lighting power. The boost converter may be configured to communicate to the microcontroller the pattern.

The second circuitry may include power transmission line communication circuity. The power transmission line communication circuity may be configured to decode the first lighting control information. The power transmission line communication circuity may be configured to communicate the first lighting control information to the microcontroller.

The third lighting control information may include a discovery response.

The discovery response may include an identifier that corresponds to the LED light source.

The methods may include momentarily powering down lighting fixtures connected to one transformer unit to identify which fixtures are connected to it by a physical (e.g., copper, wire) communication line. By comparing all communicating fixtures before the power-down with all fixtures discovered after the power-down, the fixtures physically connected to the transformer unit may be identified.

The methods may include a setup parameter mode. Setting up the parameter may include disabling the transformer unit's system control module ("SCM") from performing an automatic discovery of fixtures function. The SCM may include a microcontroller. The setup parameter mode may include disabling the SCM from performing automatic "Set Master ID", and "Delete Master ID" commands to lighting fixtures. The setup parameter mode may include continuing automatic SCM "broadcast" messages which prompt the lighting fixtures to respond with their ID. The setup parameter mode may include disabling automatic modifications to the SCM's list of detected lighting fixtures.

The methods may include a pre-discovery mode. The pre-discovery mode may include capturing and storing a source ID from all lighting fixtures including source IDs that crosstalk from lighting fixtures not directly connected to the discovering transformer unit. The pre-discovery mode may include capturing and storing source IDs by collecting transmissions from the fixture to SCM only. These may include packets with "Command" messages from 1000 to 1999. Storing target IDs may also be beneficial in determining if adjacent transformers are incorrectly switched off during fixture discovery mode.

The methods may include a discovery mode. The discovery mode may include entering the fixture discovery mode by pressing a "zone 1" button until the a "zone 1" LED illuminates. The discovery mode may include pressing and holding a "presets" button until an audible beep is heard, and the "zone 1" LED flashes. The discovery mode may include using the transformer unit's internal ELV dimming circuitry, the SCM will completely shut down all power to the fixtures included in zone 1. The discovery mode may include repeating the steps from pre-discovery mode.

During the fixture discovery mode, the discovering transformer unit can detect the absence of packets from other transformer units that were identified during the pre-discovery mode. If packet traffic from adjacent transformer units is not detected, it could indicate that the adjacent transformer has been switched off, and the fixture discovery mode should be aborted.

The methods may include a discovery process. The discovery process may include restoring normal power to zone 1. The discovery process may include comparing a first memory table with all source IDs collected during the pre-fixture discovery mode with a second memory table with source IDs collected during the fixture discovery mode when zone 1 powered down. The discovery process may include identifying that the source IDs that appear in the first table but were not listed in the second table are the source IDs from fixtures that are physically wired to the transformer performing the fixture discovery. The discovery process may include performing a "Write Master ID" function to assign a master ID to all physically connected lighting fixtures. The discovery process may include completing the fixture discovery process and resuming normal operation.

Illustrative embodiments of apparatus and methods in accordance with the principles of the invention will now be described with reference to the accompanying drawings, which form a part hereof. It is to be understood that other embodiments may be utilized and that structural, functional and procedural modifications or omissions may be made without departing from the scope and spirit of the present invention.

FIG. 1 shows schematically illustrative lighting architecture 100. Lighting architecture 100 may include power transmission lines such as power transmission lines 102 and 104.

Power transmission lines 102 and 104 may be coupled at a proximal ends 106 to lighting controllers 110 and 112, respectively. Power transmission lines 102 and 104 may be coupled at a distal ends 108 to fixture strings 114 and 116, respectively.

Lighting controllers 110 and 112 may provide power via power transmission lines 102 and 104 to fixture strings 114 and 116. Lighting controllers 110 and 112 may exchange lighting control information via power transmission lines 102 and 104 with fixture strings 114 and 116.

Power source P may be a source of AC current. The source may be residential, commercial or from a utility service. Outlets O1, O2, . . . , OM may be energized by power source P.

Architecture 100 may include power transmission line accessory 118. Accessory 118 may include conduit, wire tie or any other wire management device. Accessory 118 may retain power transmission lines 102 and 104 for some or all of the length between proximal ends 106 and distal ends 108.

Power transmission lines 102 and 104 may be two of M power transmission lines that run through accessory 118. Each power transmission line m of the M power transmission lines may correspond to a lighting controller, an mth fixture string, and an mth outlet. The M power transmission lines, lighting controllers and fixture strings may have elements and features similar or identical to those of architecture 100.

Lighting power 120 and 122 may travel along power transmission lines 102 and 104, respectively. Lighting control information channels 124 and 126 may travel along power transmission lines 102 and 104. Channels 124 and 126 represent two-way PLC communication channels. The lighting power may be used as lighting control information.

Lighting controller 110 may include filter 128. Lighting controller 110 may include step-down transformer 130. Lighting controller 110 may include fixture control module 132. Fixture control module 132 may provide 15 VAC lighting power to power transmission line 102. Fixture control module 132 may generate lighting control information for transmission along power transmission line 102. Filter 128 may prevent the lighting control information from propagating to outlet O1. Filter 128 may prevent lighting control information from a different lighting controller, such as lighting controller 112, from propagating into fixture control module 132.

Lighting controller 110 may include filter 134. Lighting controller 110 may include step-down transformer 136. Lighting controller 110 may include fixture control module 138. Fixture control module 138 may provide 15 VAC lighting power to power transmission line 104. Fixture control module 138 may generate lighting control information for transmission along power transmission line 102. Filter 134 may prevent the lighting control information from propagating past outlet $O_2$. Filter 134 may prevent lighting control information from a different lighting controller, such as lighting controller 110, from propagating into fixture control module 138.

Arrows A, B, C, and D illustrate possible crosstalk that may occur between transmission lines, such as transmission lines 102 and 104. Crosstalk between the different communication lines may cause uncertainty about which fixture control module is wired to which fixtures. Crosstalk may cause unwanted noise. Crosstalk may prevent the transmission of lighting control information to the correct fixtures. Arrows A and C illustrate possible crosstalk in which lighting control information may propagate back to Outlets $O_1$, $O_2$, . . . , $O_M$. Filters 128 and 134 may prevent the possible crosstalk illustrated by arrows A and C. Arrows B and D illustrate possible crosstalk between transmission lines 102 and 104. The lighting control information may be intended for fixture group 116. Because of possible crosstalk as illustrated by arrows B and D, the lighting control information may be transmitted to fixture group 114 through transmission line 102. The lighting control information may be intended for fixture group 114. Because of possible crosstalk as illustrated by arrows B and D, the lighting control information may be transmitted to fixture group 116 through transmission line 104.

Figure 2:
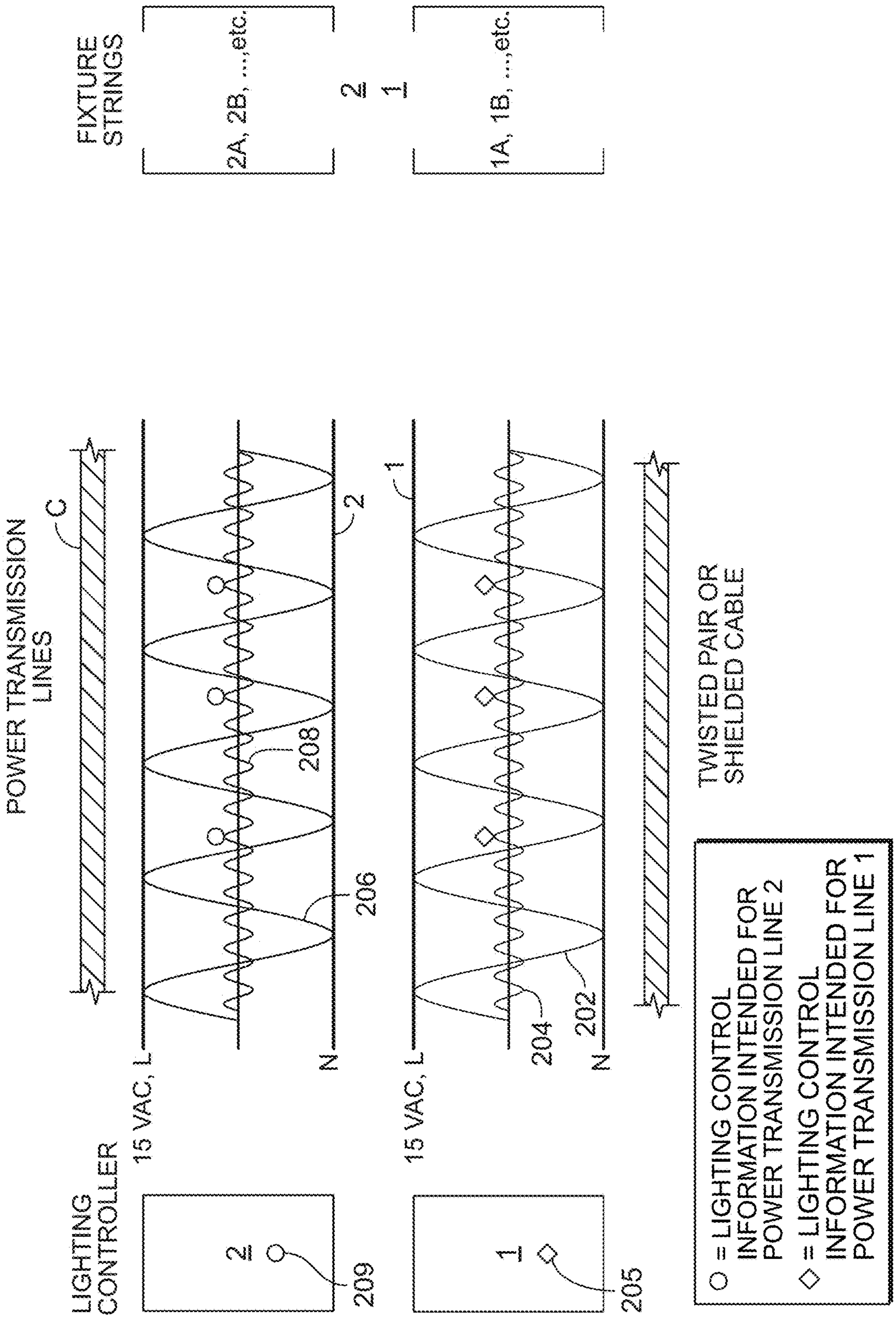
FIG. 2 shows schematically illustrative apparatus in accordance with the principles of the invention along with other apparatus.

FIG. 2 shows schematically illustrative power transmission lines 1 and 2. Power transmission lines 1 and 2 may pass through conduit C. Power transmission lines 1 and 2 may have one or more features in common with the features of power transmission lines 102 and 104. Power transmission lines 1 and 2 may be coupled to lighting controllers 1 and 2. Power transmission lines 1 and 2 may be coupled to fixture strings 1 and 2. Lighting controllers 1 and 2 may have one or more features in common with the features lighting controllers 110 and 112. Fixture strings 1 and 2 may have one or more features in common with the features of fixture strings 114 and 116.

Power transmission line 1 may conduct lighting power 202 and, via lighting information channel 204, lighting control information 205. Power transmission line 2 may conduct lighting power 206 and, via lighting information channel 208, lighting control information 209. Power transmission lines 1 and 2 may be constructed or arranged to reduce or eliminate electrical coupling between power transmission lines 1 and 2. Electrical coupling may be a coupling that causes a waveform from one of the power transmission lines to create a propagation in the other power transmission line. The propagation may be an undesired propagation. The coupling may include capacitive coupling, inductive coupling, or any other electrical coupling. The propagation may cause noise in the power transmission line in which it is present. It may be noise known as "crosstalk."

Power transmission lines that include twisted pairs of conductors may reduce or eliminate crosstalk. Power transmission lines that are shielded may reduce or eliminate crosstalk.

Power 202 may have an amplitude, between a live ("L") line and a neutral ("N") line, that is in a range of 5-10V, 10-15V, 15-20V, 25-30V, or more, or any other suitable voltage.

Figure 3:
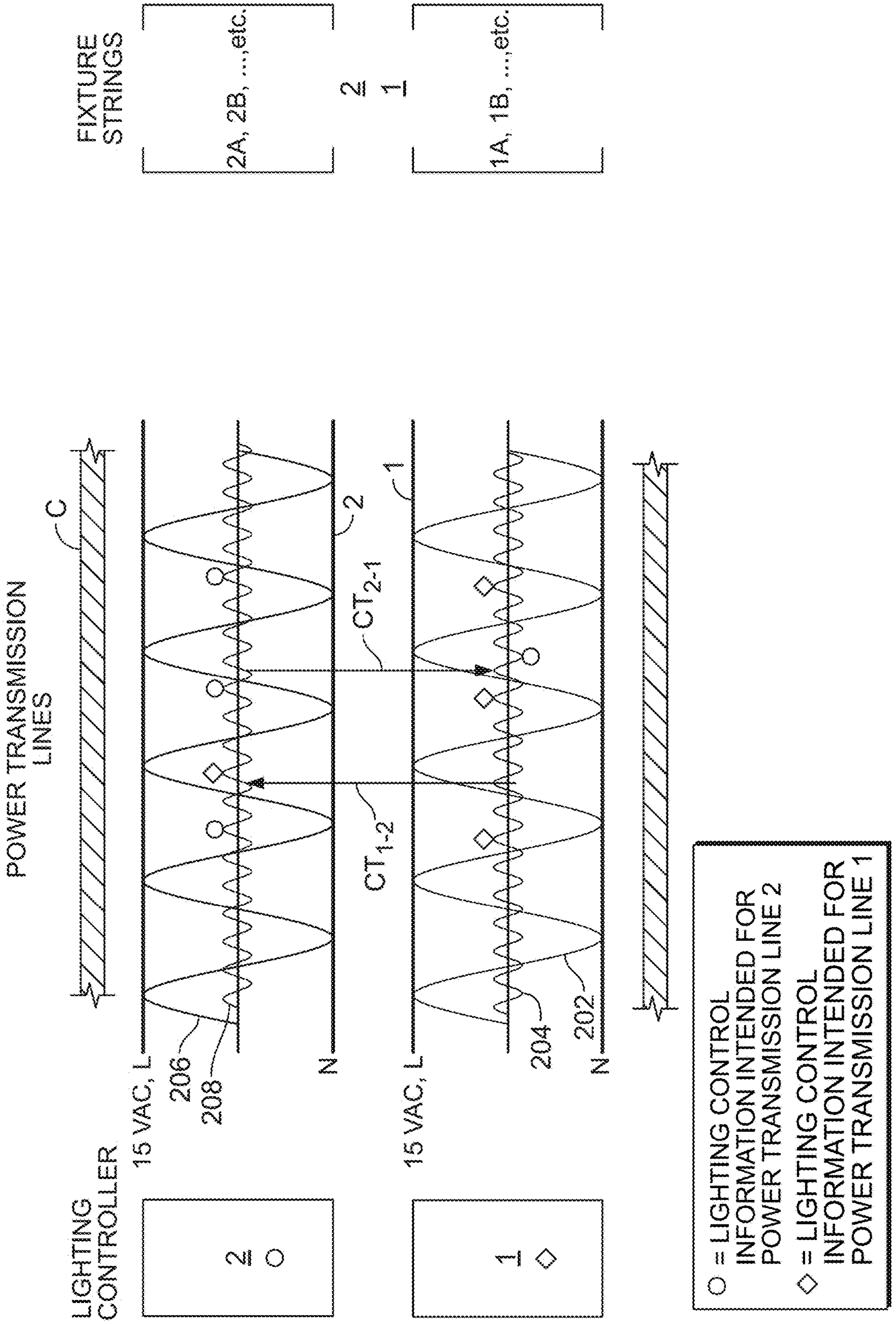
FIG. 3 shows schematically illustrative apparatus in accordance with the principles of the invention.

FIG. 3 shows schematically cross-talk paths $CT_{1-2}$ and $CT_{2-1}$. Cross-talk may occur when power transmission lines are not constructed or arranged to reduce or eliminate electrical coupling between the power transmission lines. $CT_{1-2}$ transfers of information from power transmission line 1 to power transmission line 2. $CT_{2-1}$ transfers information from power transmission line 2 to power transmission line 1. Cross talk may be present along one or more cross-talk paths $CT_i$ that may be present between each fixture control module and all other fixture control modules.

Lighting control information 205 may be transmitted by lighting controller 1 over channel 204 and may be intended to be received by fixtures on fixture string 1. When lighting control information 205 propagates along power transmission line 2, carrying information related to lighting controller 1 or fixtures on fixture string 1, lighting controller 2 or fixtures on fixture string 2 may erroneously respond to lighting control information 205. Lighting controller 2 or fixtures on fixture string 2 may be unable to properly read lighting control information 209 and may be unable to function properly.

Lighting control information 209 may be transmitted by lighting controller 2, over channel 208 and may be intended to be received by fixtures on fixture string 2. When lighting control information 209 propagates along power transmission line 1, carrying information related to lighting controller 2 or fixtures on fixture string 2, lighting controller 1 or fixtures on fixture string 1 may erroneously respond to lighting control information 209. Lighting controller 1 and fixtures on fixture string 1 may be unable to properly read lighting control information 209 and may be unable to function properly.

Power 202 on power transmission line 1 may couple to power transmission line 2, if at all, to an extent that the interaction of lighting controller 2 and the fixtures of fixture string 2 is not materially degraded. Power 206 on power transmission line 2 may couple to power transmission line 1, if at all, to an extent that the interaction of lighting controller 1 and the fixtures of fixture string 1 is not materially degraded.

Figure 4:
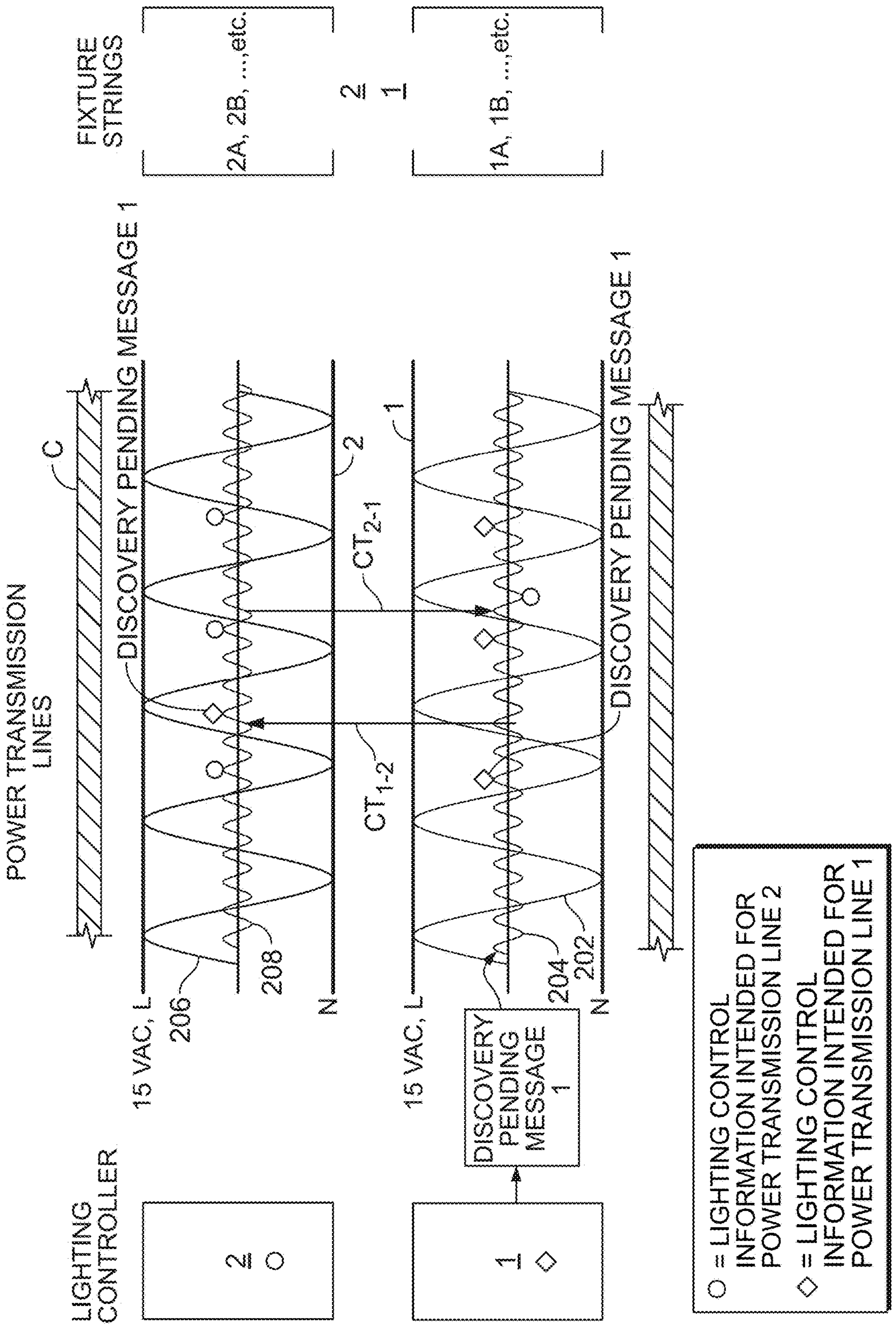
FIG. 4 shows schematically illustrative apparatus in accordance with the principles of the invention.

FIG. 4 schematically illustrates the use of $CT_{1-2}$ to initiate a discovery process in which lighting controller 1 may attempt to discover fixtures that are physically wired to power transmission line 1. Lighting controller 1 may transmit, via lighting control channel 204, DISCOVERY PENDING message 1. Because of $CT_{1-2}$, DISCOVERY PENDING message 1 may propagate, along power transmission line 2, in channel 208.

Lighting controller 2 may be configured to read DISCOVERY PENDING message 1 in channel 208. In response to DISCOVERY PENDING message 1, lighting controller 2 may take steps to avoid engaging in processes that might interfere, via $CT_{2-1}$, with the discovery process of lighting controller 1. Lighting controller 2 may be configured to refrain from initiating its own fixture discovery process.

Figure 5:
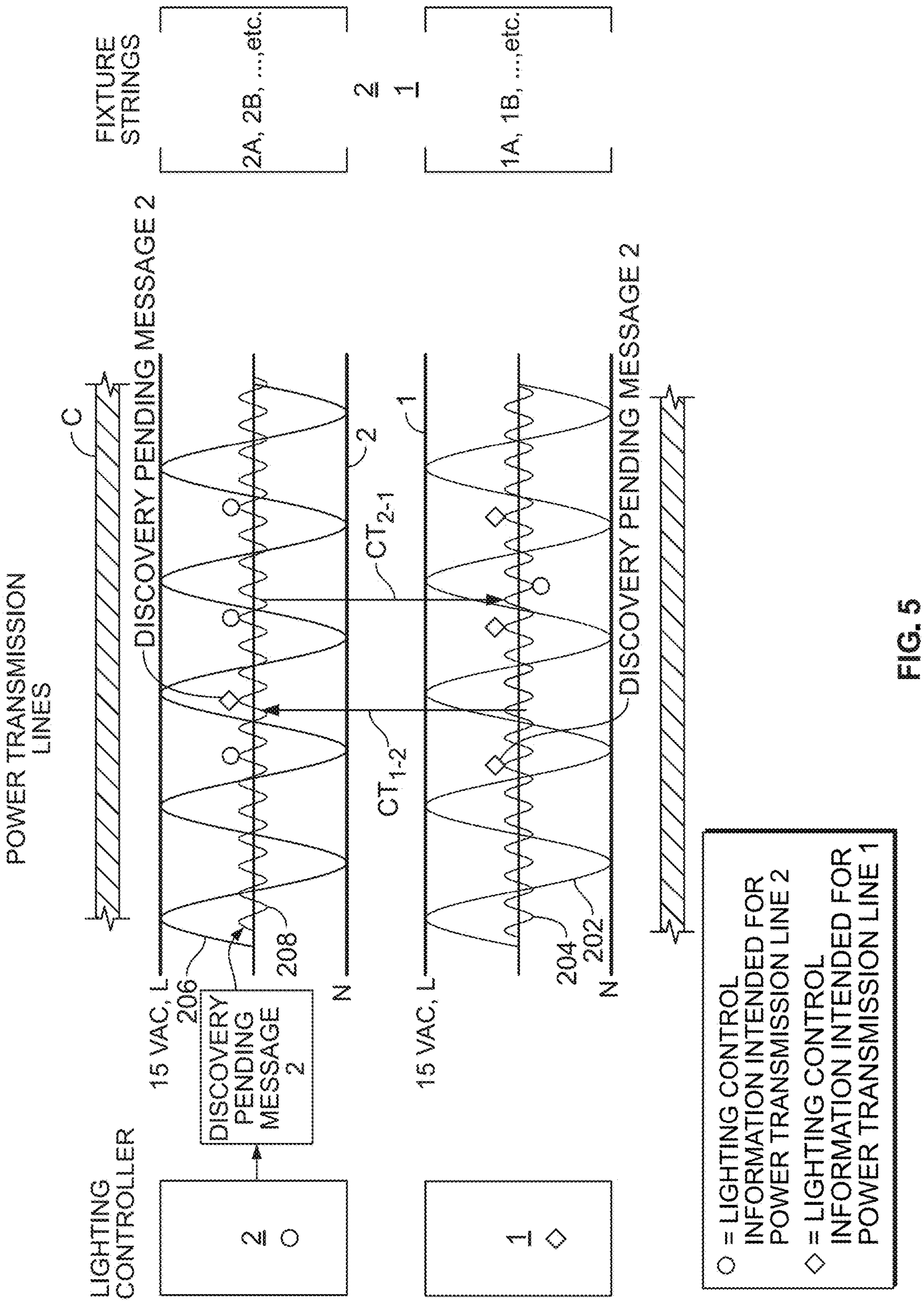
FIG. 5 shows schematically illustrative apparatus in accordance with the principles of the invention.

FIG. 5 shows schematically that lighting controller 2 may transmit, in channel 208, DISCOVERY PENDING message 2. Because of $CT_{2-1}$, DISCOVERY PENDING message 2 may propagate, along power transmission line 1, in channel 204.

Lighting controller 1 may be configured to read DISCOVERY PENDING message 2 in channel 204. In response to reading DISCOVERY PENDING message 2, lighting controller 1 may take steps to avoid engaging in processes that might interfere, via $CT_{1-2}$, with the discovery process of lighting controller 2. Lighting controller 1 may be configured to refrain from initiating its own fixture discovery process.

Lighting controllers 1 and 2 may be configured to determine which of their discovery processes has priority over the other.

Figure 6:
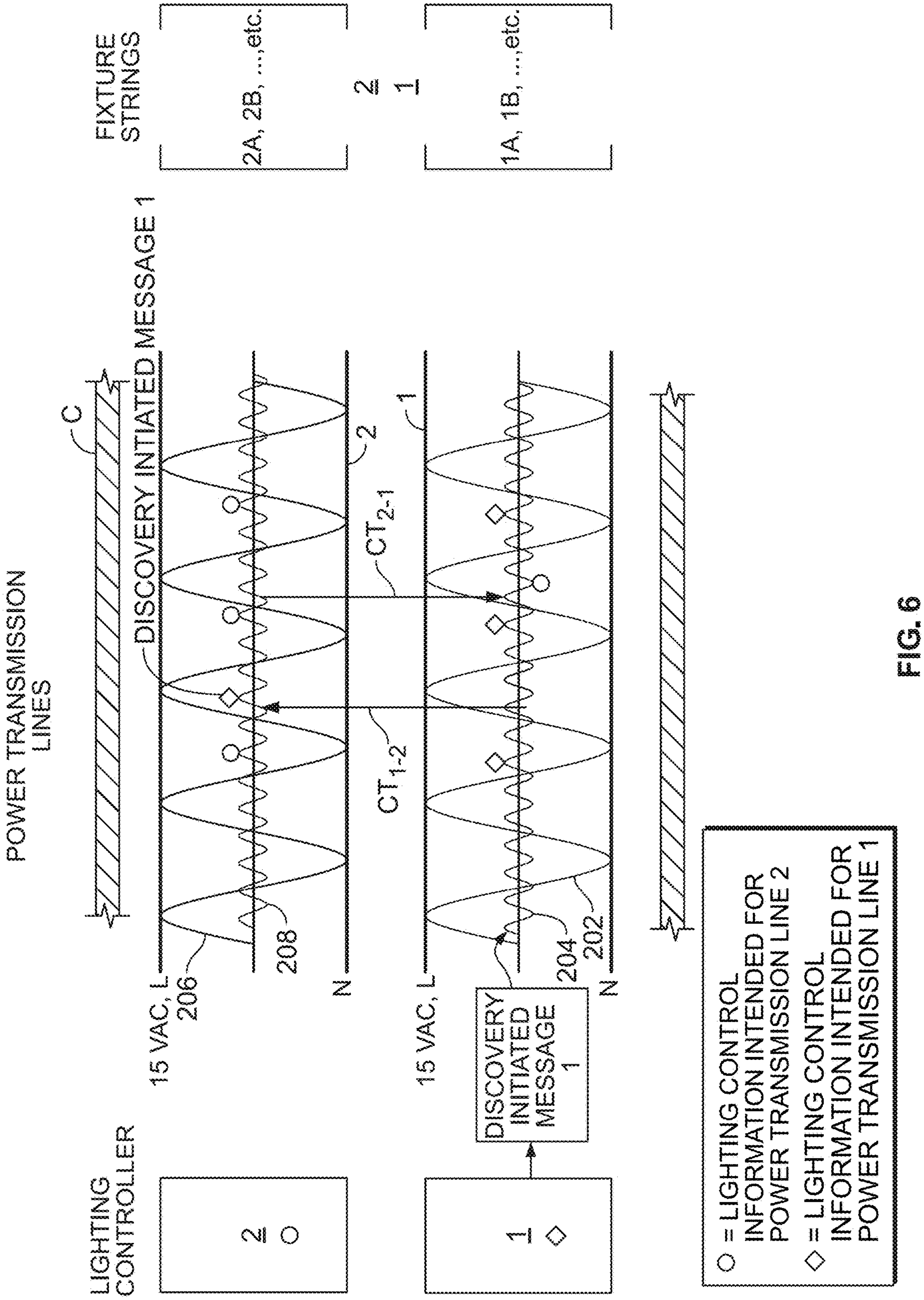
FIG. 6 shows schematically illustrative apparatus in accordance with the principles of the invention.

FIG. 6 shows an illustrative state in which lighting controllers 1 and 2 have determined that the discovery process of lighting controller 1 has priority. Lighting controller 1 may thus transmit, via channel 204, DISCOVERY INITIATED message 1. Because of $CT_{1-2}$, DISCOVERY INITIATED message 1 may propagate, along power transmission line 2, in channel 208. Lighting controller 2 may be configured to read DISCOVERY INITIATED message 1 in channel 208. In response to DISCOVERY INITIATED message 1, lighting controller 2 may take steps to avoid engaging in processes that might interfere, via $CT_{2-1}$, with the discovery process of lighting controller 1. Lighting controller 2 may be configured to take action in response to DISCOVERY INITIATED message 1. Table 5 lists illustrative lighting controller 2 actions.

TABLE 5

| Illustrative lighting controller 2 actions.<br>Illustrative lighting controller 2 actions |
| --- |
| Refrain from initiating a discovery process. |
| Delay a discovery process |
| Cancel a discovery process |
| Prevent fixtures of fixture string 2 from transmitting lighting control information 209 |
| Prevent fixtures of fixture string 2 from transmitting lighting control information 209 that is part of a discovery process |
| Other suitable actions |

Figure 7:
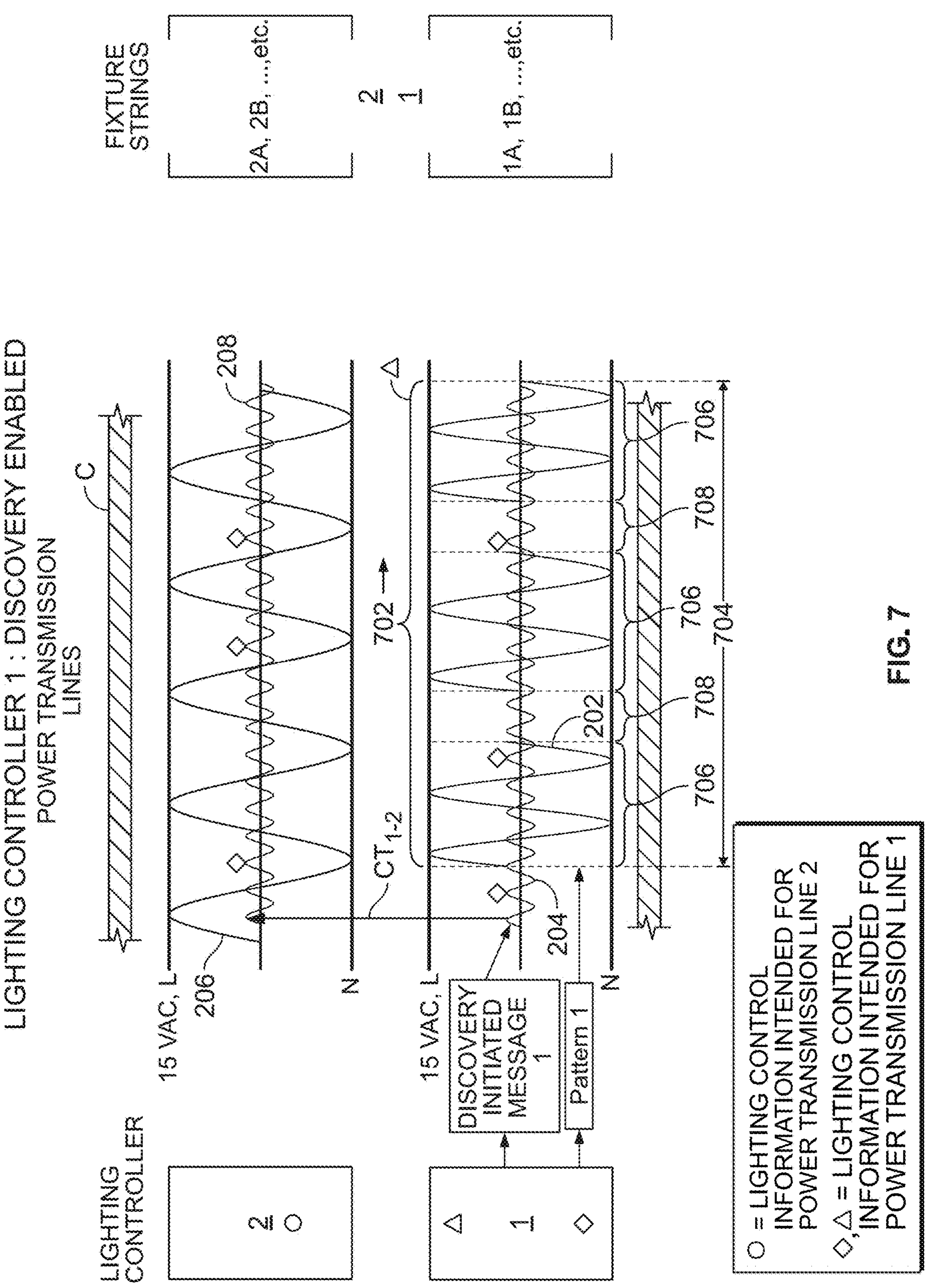
FIG. 7 shows schematically illustrative apparatus in accordance with the principles of the invention.

FIG. 7 shows an illustrative state in which discovery by lighting controller 1 is enabled. Lighting controller 1 may continue to transmit DISCOVERY INITIATED message 1 via channel 204. DISCOVERY INITIATED message 1 may be transmitted to power transmission line 2 via cross-talk $CT_{1-2}$. Lighting controller 1 may transmit pattern 702 along power transmission line 1. Pattern 702 may include a wave amplitude that conforms to lighting power 202. Pattern 702 may have duration 704. Pattern 702 may include pulses 706. Pattern 702 may include pauses 708.

The fixtures of fixture string 1 may be configured to recognize pattern 702. The fixtures of fixture string 1 may respond to pattern 702. Pattern 702 may be lighting control information. Table 6 lists illustrative responses of the fixtures to pattern 702.

TABLE 6

| Illustrative responses of the fixtures to pattern 702.<br>Illustrative responses of the fixtures to pattern 702 |
| --- |
| Send discovery response via lighting control information channel 204 |

TABLE 6-continued

| Illustrative responses of the fixtures to pattern 702. Illustrative responses of the fixtures to pattern 702 |
|---|
| Send fixture identification code |
| Send acknowledgment of receipt of lighting controller master identifier |
| Prepare for receipt of DISCOVER-NODES message |
| Other suitable actions |

Figure 8:
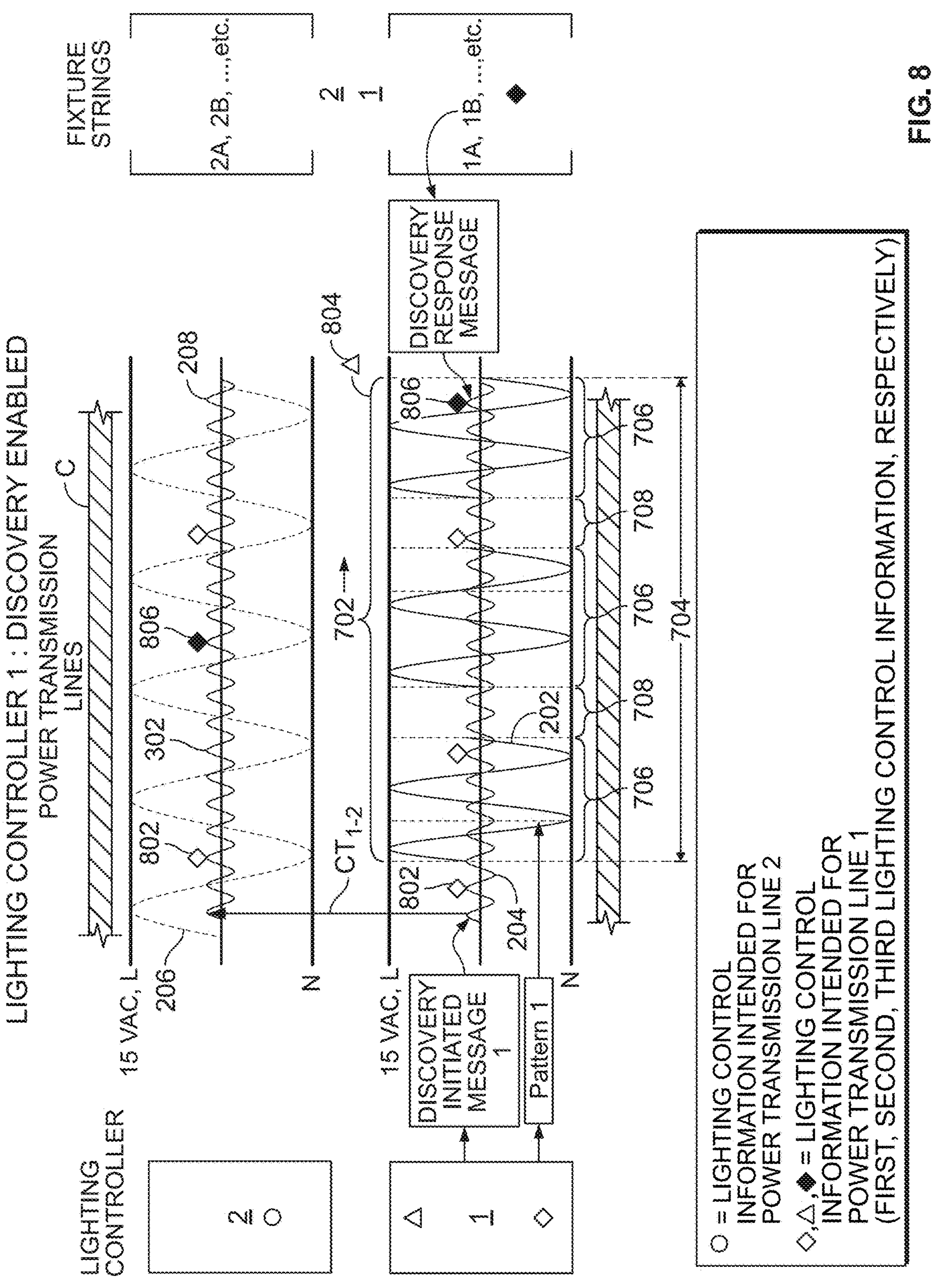
FIG. 8 shows schematically illustrative apparatus in accordance with the principles of the invention.

FIG. 8 shows schematically first lighting control information 802, second lighting control information 804 and third lighting control information 806. First lighting control information 802 may include a DISCOVERY-INITIATED message. Second lighting control information 804 may include a pattern such as pattern 702. Third lighting control information 806 may include a DISCOVERY RESPONSE message. Third lighting control information 806 may be responsive to second lighting control information 804. Third lighting control information 806 may be generated by one of fixtures 1A, 1B, . . . , etc., of fixture string 1.

First lighting control information 802 may be transmitted via channel 204. Third lighting control information 806 may be transmitted via channel 204. First lighting control information 802 may migrate to channel 208 via $CT_{1-2}$. Third lighting control information 806 may migrate to channel 208 via $CT_{1-2}$. Pattern 702 may have current, voltage or frequency characteristics that do not favor, or do not permit, second lighting control information 804 to migrate to channel 208 via $CT_{1-2}$. Thus, none of fixtures 2A, 2B, . . . , etc. from fixture string 2 will have received second lighting control information 804. Thus, any third lighting control information 806 that lighting control receives via channel 204 will exclude third lighting control information from fixtures of fixture string 2. Similarly, when a fixture controller seeks to discover fixtures connected to itself by a power transmission line, the fixture controller can avoid responses from fixtures on two or more other power transmission lines.

Figure 9:
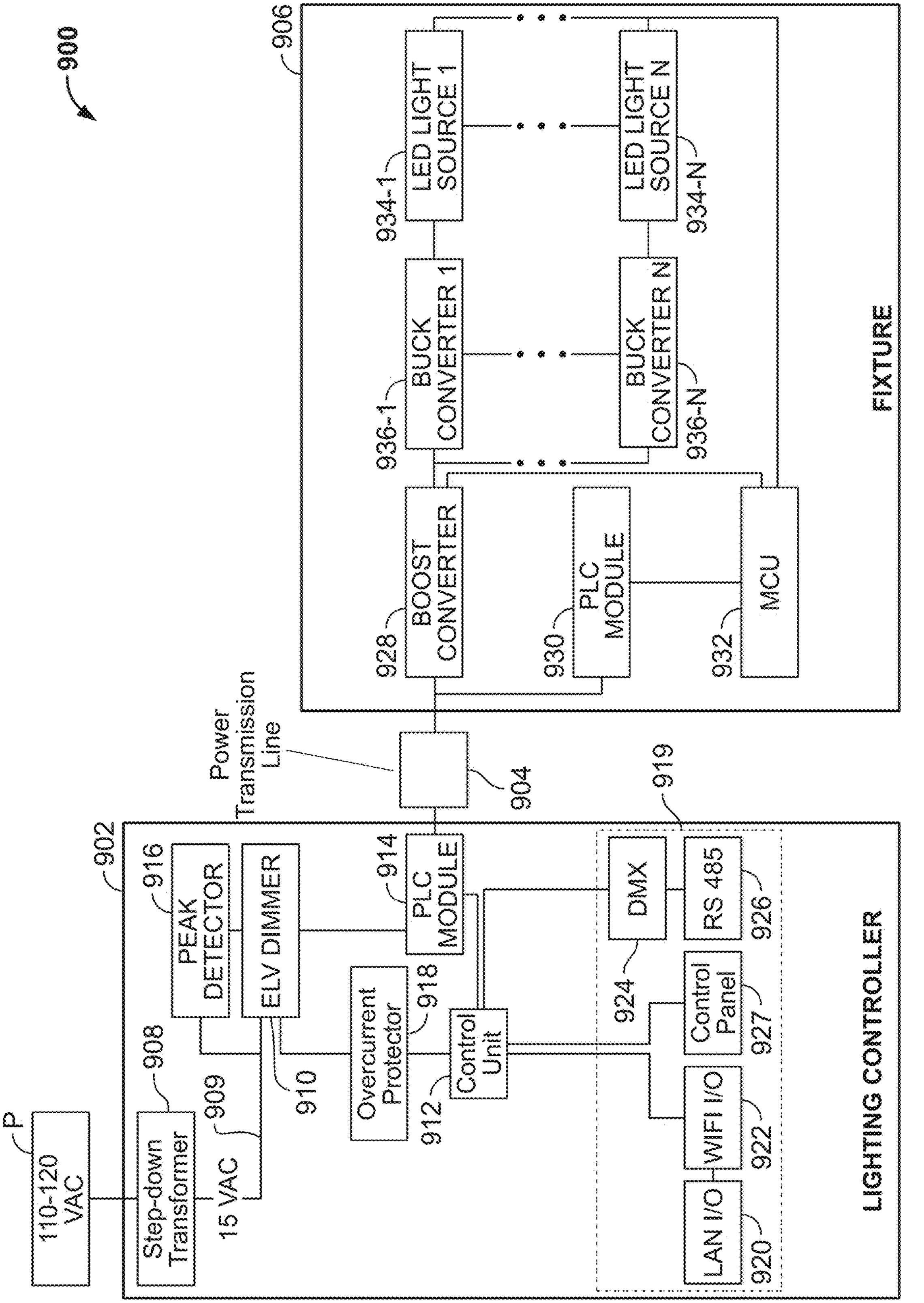
FIG. 9 shows schematically illustrative apparatus in accordance with the principles of the invention.

FIG. 9 shows schematically illustrative circuitry 900 for communication of lighting control information between a lighting controller and a fixture. Circuitry 900 may include lighting controller 902. Circuitry 900 may include power transmission line 904. Circuitry 900 may include fixture 906.

Lighting controller 902 may have one or more features in common with one or both of lighting controllers 1 and 2 (shown in FIGS. 1-8). Power transmission line 904 may have one or more features in common with one or both of power transmission lines 1 and 2 (shown in FIGS. 1-8). Fixture 906 may have one or more features in common with one or more of fixtures 1A, 1B, . . . , etc. of fixture string 1 and fixtures 2A, 2B, . . . , etc. of fixture string 2 (shown in FIGS. 1-8).

Lighting controller 902 may include step-down transformer 908. Lighting controller 902 may include electronic low voltage ("ELV") dimmer 910. ELV dimmer 910 may include a dimming circuit. The dimming circuit may include a power-limiting circuit. Lighting controller 902 may include control unit 912. Lighting controller 902 may include power transmission line control module 914. Lighting controller 902 may include peak detector 916. Lighting controller 902 may include overcurrent protection circuitry 918. Lighting controller 902 may include one or more of lighting control user inputs 919. User inputs 919 may include local area network ("LAN") input/output ("I/O") circuit 920. User inputs 919 may include Wifi I/O module 922. User inputs 919 may include a module that provides lighting control information in a format. Table 7 lists illustrative formats.

TABLE 7

| Illustrative formats. Illustrative formats |
|---|
| DMX (Digital Multiplexer) |
| DALI (Digital Addressable Lighting Interface) |
| Triac or ELV (Phase cut dimmer signal) |
| 0-10 V dimmer signal |
| Z-wave (Z-wave Alliance, Beaverton, Oregon) |
| Zigbee (Zigbee Alliance, of San Ramon, California) |
| Custom-user defined |
| Default-provided in memory |
| Other third-party control protocol |
| Other suitable formats |

User inputs 919 may include DMX module 924. User inputs 919 may include RS-485 interface 926. User inputs 919 may include control panel 927.

User inputs 919 may receive user commands from a user. The user may transmit the commands from a mobile processor. The user may transmit the commands from a wall-mounted control panel. The user may transmit the commands from a workstation.

Power transmission line 904 may support transmission of lighting power and lighting control information.

Fixture 906 may include boost converter 928. Fixture 906 may include power line communication ("PLC") module 930. Fixture 906 may include microcontroller 932.

Fixture 906 may include n LED light sources 1 . . . N—such as LED light source 934-1. Fixture 906 may include n buck converters 1 . . . N—such as buck converter 936-1, each corresponding to one of the N LED light sources.

Lighting controller 902 may receive power from source P, which may provide sufficient power to power fixtures. For example, source P may provide 110-120 VAC at 60 Hz or any other suitable voltage. Step-down transformer 908 may provide reduced voltage lighting power 909 for provision to fixture 906. The reduced voltage may be 15 VAC.

Step-down transformer 908 may provide the reduced voltage to ELV dimmer 910. ELV dimmer 910 may include dimming circuitry. ELV dimmer 910 may provide to fixture 906 lighting power that may be limited to dim LED light sources 1 . . . N. Peak detector 916 may synchronize ELV dimmer 910 with a phase of current that is received from step-down transformer 908. Overcurrent protection circuity 918 may monitor current in ELV dimmer 910. Overcurrent protection circuity 918 may signal to microcontroller 932 an overcurrent condition. Microcontroller 932 may control ELV dimmer 910 to ameliorate the overcurrent condition.

Control unit 912 may receive user commands from one or more of user inputs 919. The commands may include a dimming level. The commands may include lighting levels for one or more of LED light sources 1 . . . N in fixture 906. A lighting level may be expressed as an individual lighting level, for example, for LEDs of a certain color. A lighting level may be expressed as a dimming level that applies to a string of LED light sources.

Control unit 912 may provide a dimming level to ELV dimmer 910.

Control unit 912 may generate a lighting signal that includes the lighting levels. Control unit 912 may provide the lighting signal to PLC module 914. PLC module 914 may encode the lighting signal onto a carrier frequency. The carrier frequency may be part of a channel such as channel 204. PLC module 914 may insert the frequency, along with the encoded information, into reduced voltage lighting power 909.

ELV dimmer 910 may thus transmit to fixture 906, along power transmission line 904, lighting power that may be limited by ELV dimmer 910 and that may carry encoded lighting signals corresponding to one or more LED light sources 1 . . . N.

Boost converter 928 may receive the lighting power from fixture control module 902. Boost converter 928 may amplify the voltage of the lighting power to improve the quality of the lighting power that is delivered to LED light sources 1 . . . N. Buck converters 1 . . . N may convert the boosted lighting power to a higher quality, lower voltage lighting power for delivery to LED light sources 1 . . . N. PLC module 930 may receive from power transmission line 904 encoded lighting signals for LED light sources 1 . . . N. PLC module 930 may decode the encoded lighting signals and provide them to microcontroller 932.

Microcontroller 932 may control each of LED light sources 1 . . . N based on the lighting signals.

First lighting control information may be addressed to one or more identified fixtures in a string. Second lighting control information may be uniformly directed to all fixtures in string. Third lighting control information may be initiated by an individual fixture in a string. The third lighting information may be addressed to an lighting controller.

Figure 10:
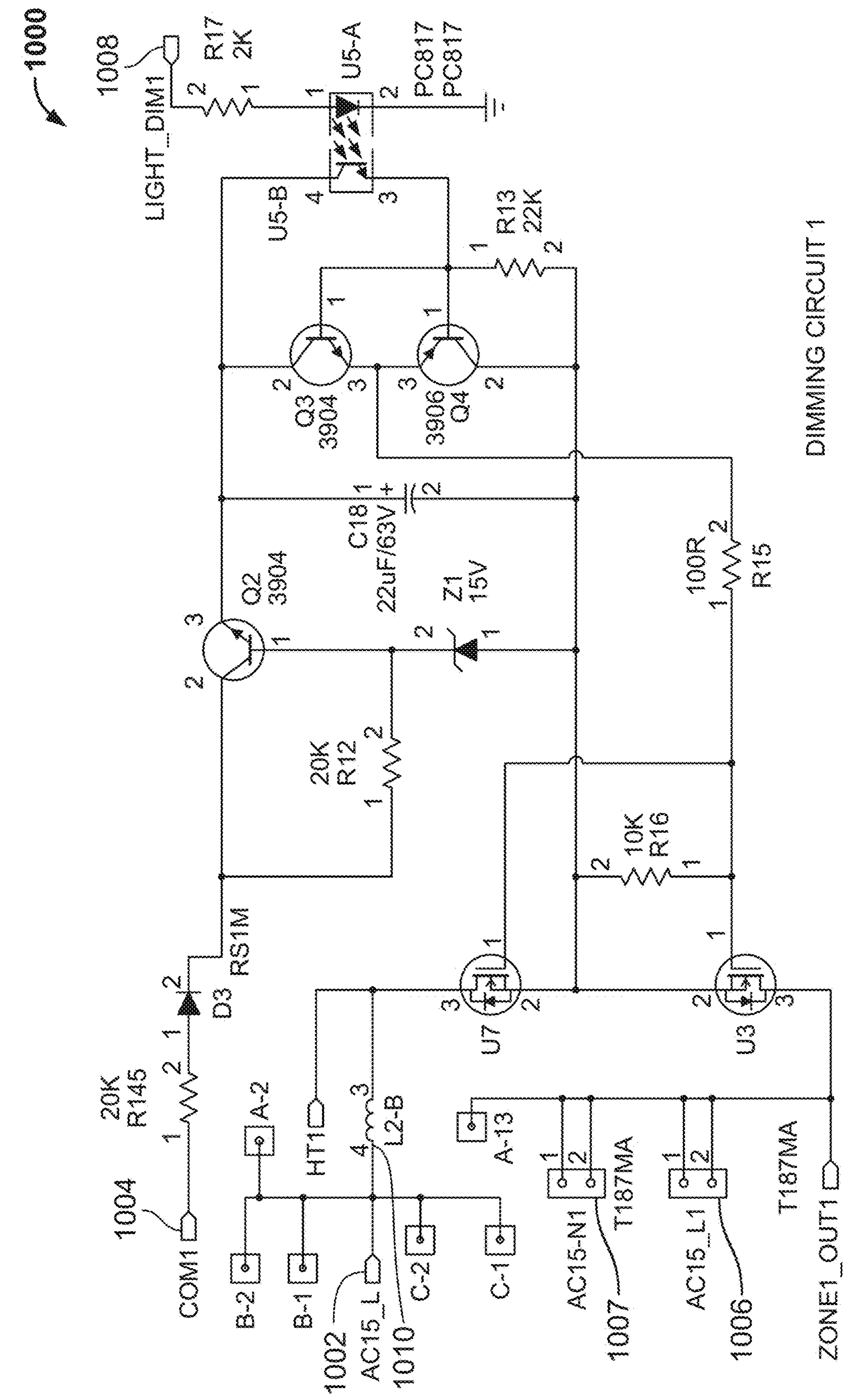
FIG. 10 shows schematically illustrative apparatus in accordance with the principles of the invention.

FIG. 10 shows schematically illustrative dimming circuit 1000. Dimming circuit 1000 may correspond to ELV dimmer 910.

Dimming circuit may receive AC power across inputs 1002 (AC15_L, a 15 VAC live input) and 1004 (COM1). The received AC power may include a reduced voltage that is provided by step-down transformer 908. The reduced voltage may be 15 VAC. The reduced voltage may be the predetermined voltage.

Dimming circuit 1000 may output lighting power across output 1006 (AC15_L1, a 15 VAC live output) and output 1007 (AC15_N1, a neutral output). Output 1006 and output 1007 may be coupled to a power transmission line such as power transmission line 102 to provide lighting power to fixtures such as those of fixture string 114.

Dimming circuit 1000 may receive input 1008 (LIGHT_DIM1). Input 1008 may receive a dimming signal corresponding to a desired dimming level. Dimming circuit 1000 may apply phase-cut dimming to the AC power received across inputs 1002 and 1004 and output dimmed lighting power across output 1006 and output 1007.

Dimming circuit 1000 may include inductive component 1010 (L2-B). Inductive component 1010 may be used by circuit 1200 (see FIG. 12) to sense current flowing through dimming circuit 1000.

Figure 11:
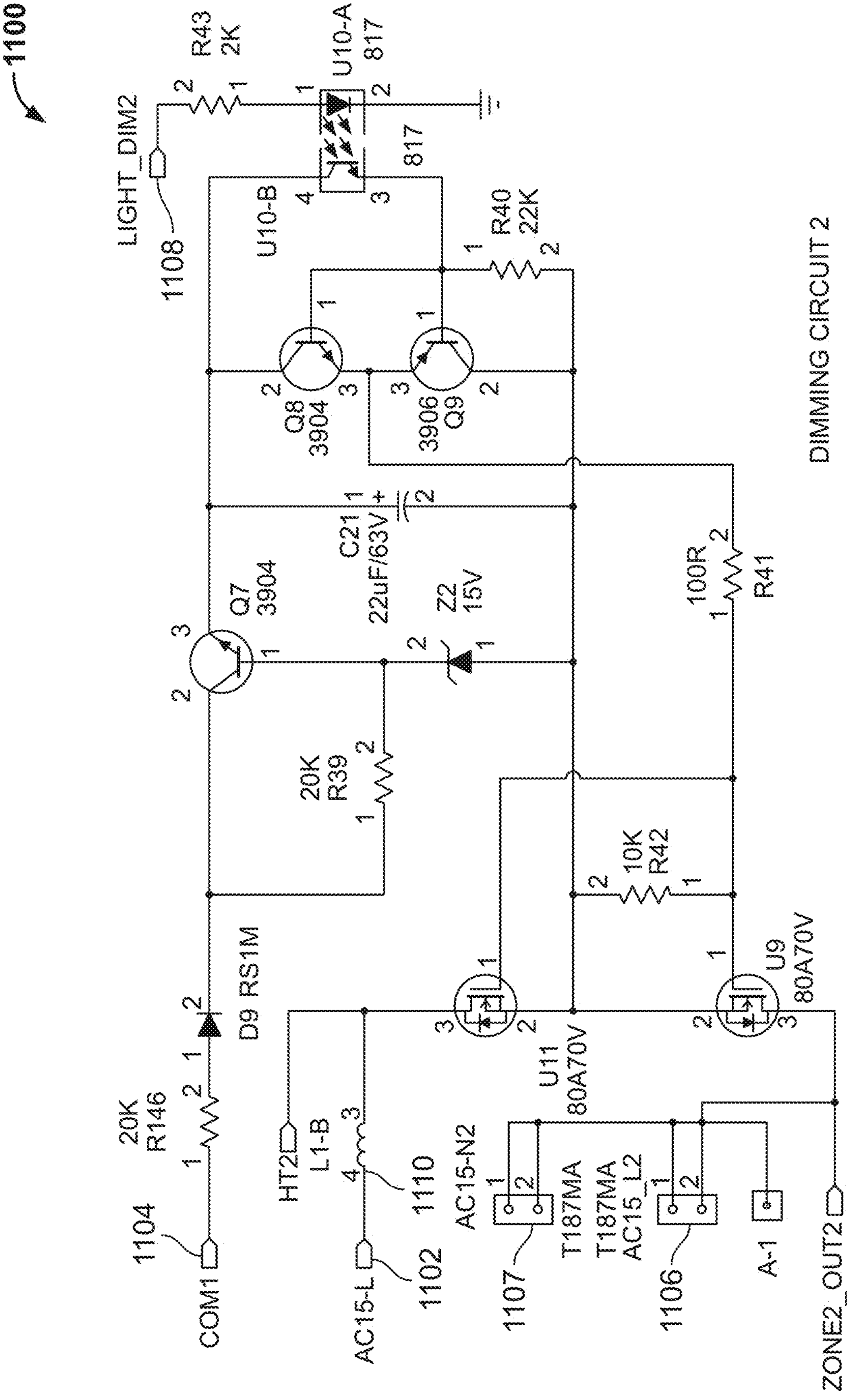
FIG. 11 shows schematically illustrative apparatus in accordance with the principles of the invention.

FIG. 11 shows schematically illustrative dimming circuit 1100. Dimming circuit 1100 may correspond to ELV dimmer 910.

Dimming circuit may receive AC power across inputs 1102 (AC15_L, a 15 VAC live input) and 1104 (COM1). The received AC power may include a reduced voltage that is provided by step-down transformer 908. The reduced voltage may be 15 VAC.

Dimming circuit 1100 may output lighting power across output 1106 (AC15_L2, a 15 VAC live output) and 1107 (AC15_N2, a neutral output). Outputs 1106 and 1107 may be coupled to a power transmission line such as power transmission line 104 to provide lighting power to fixtures. The fixtures that receive lighting power from dimming circuit 1100 may be fixtures that are not configured to receive lighting control information via PLC modules.

Dimming circuit 1100 may receive input 1108 (LIGHT_DIM1). Input 1106 may receive a dimming signal corresponding to a desired dimming level. Dimming circuit 1100 may apply phase-cut dimming to the AC power received across inputs 1102 and 1104 and output dimmed lighting power across outputs 1106 and 1107.

Dimming circuit 1100 may include inductive component 1110 (L2-B). Inductive component 1110 may be used by circuit 1300 (see FIG. 13) to sense current flowing through dimming circuit 1100.

Figure 12:
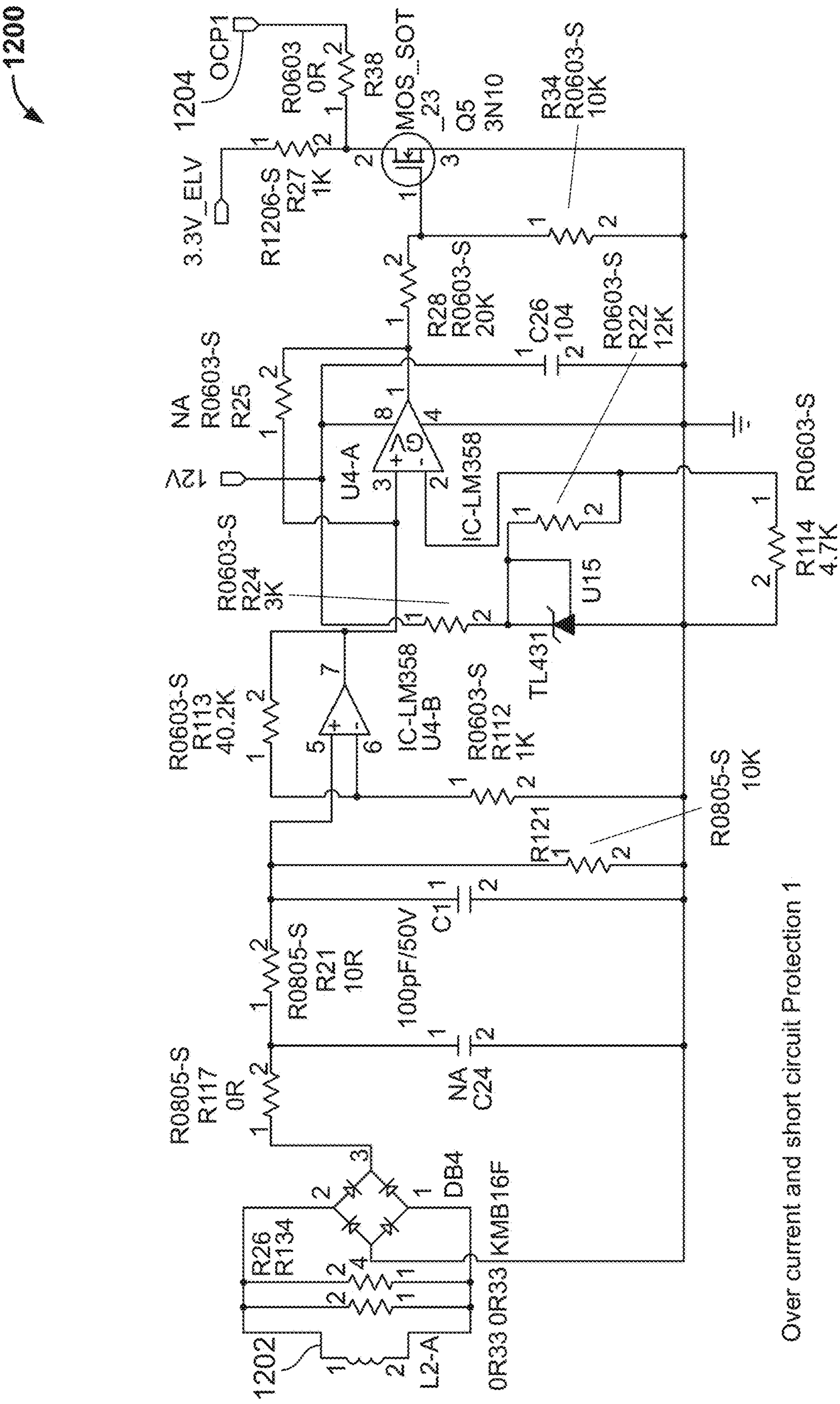
FIG. 12 shows schematically illustrative apparatus in accordance with the principles of the invention.

FIG. 12 shows schematically illustrative protection circuit 1200. Protection circuit 1200 may be part of overcurrent protection circuitry 918. Protection circuit 1200 may include inductive input 1202 (L2-A). Inductive input 1202 may be inductively coupled to inductive component 1010 to sense current flowing through dimming circuit 1000. Protection circuit 1200 may include output 1204 (OCP1). Voltage output 1204 may signal an overcurrent or a short circuit condition in dimming circuit 1000.

Figure 13:
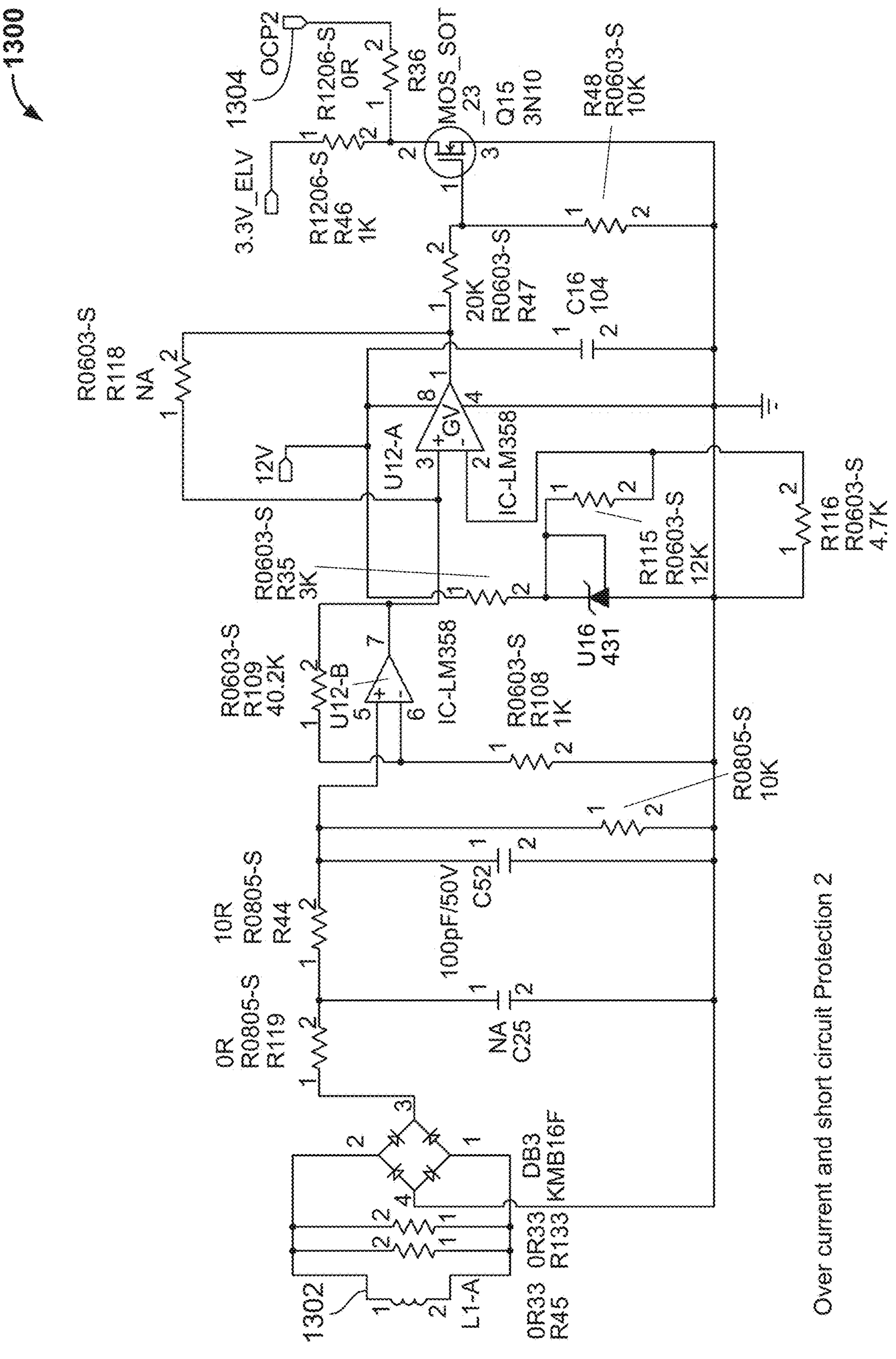
FIG. 13 shows schematically illustrative apparatus in accordance with the principles of the invention.

FIG. 13 shows schematically illustrative protection circuit 1300. Protection circuit 1300 may be part of overcurrent protection circuitry 918. Protection circuit 1300 may include inductive input 1302 (L2-A). Inductive input 1302 may be inductively coupled to inductive component 1110 to sense current flowing through dimming circuit 1100. Protection circuit 1300 may include output 1304 (OCP2). Voltage output 1304 may signal an over-current or a short circuit condition in dimming circuit 1100.

Figure 14:
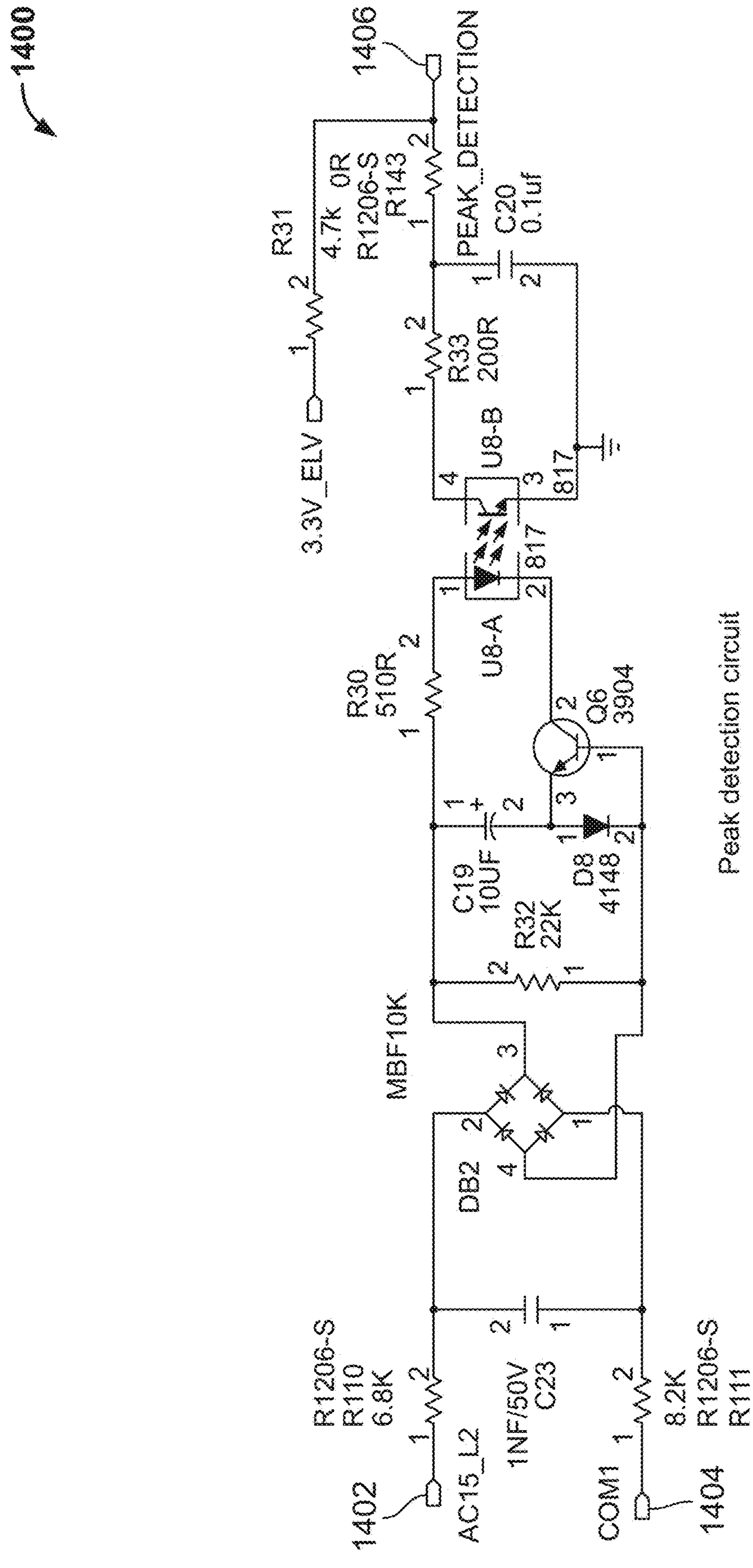
FIG. 14 shows schematically illustrative apparatus in accordance with the principles of the invention.

FIG. 14 shows schematically illustrative peak detection circuit 1400. Peak detection circuit 1400 may be included in peak detector 916. Peak detection circuit 1400 may receive inputs 1402 (AC15_L2) and 1404 (COM1). Inputs 1402 and 1404 may be parallel: (a) power inputs 1002 and 1004, and (b) power inputs 1102 and 1104. Peak detection circuit 1400 may sense peaks in the power received by dimming circuits 1000 and 1100. Peak detection circuit 1400 may include output 1406 (PEAK_DETECTION). Output 1406 may include a voltage that corresponds to the peaks. Output 1406 may be used to synchronize phase-cut functionality of dimming circuits 1000 and 1100 with the phase of power received at: (a) power inputs 1002 and 1004, and (b) power inputs 1102 and 1104.

Figure 15:
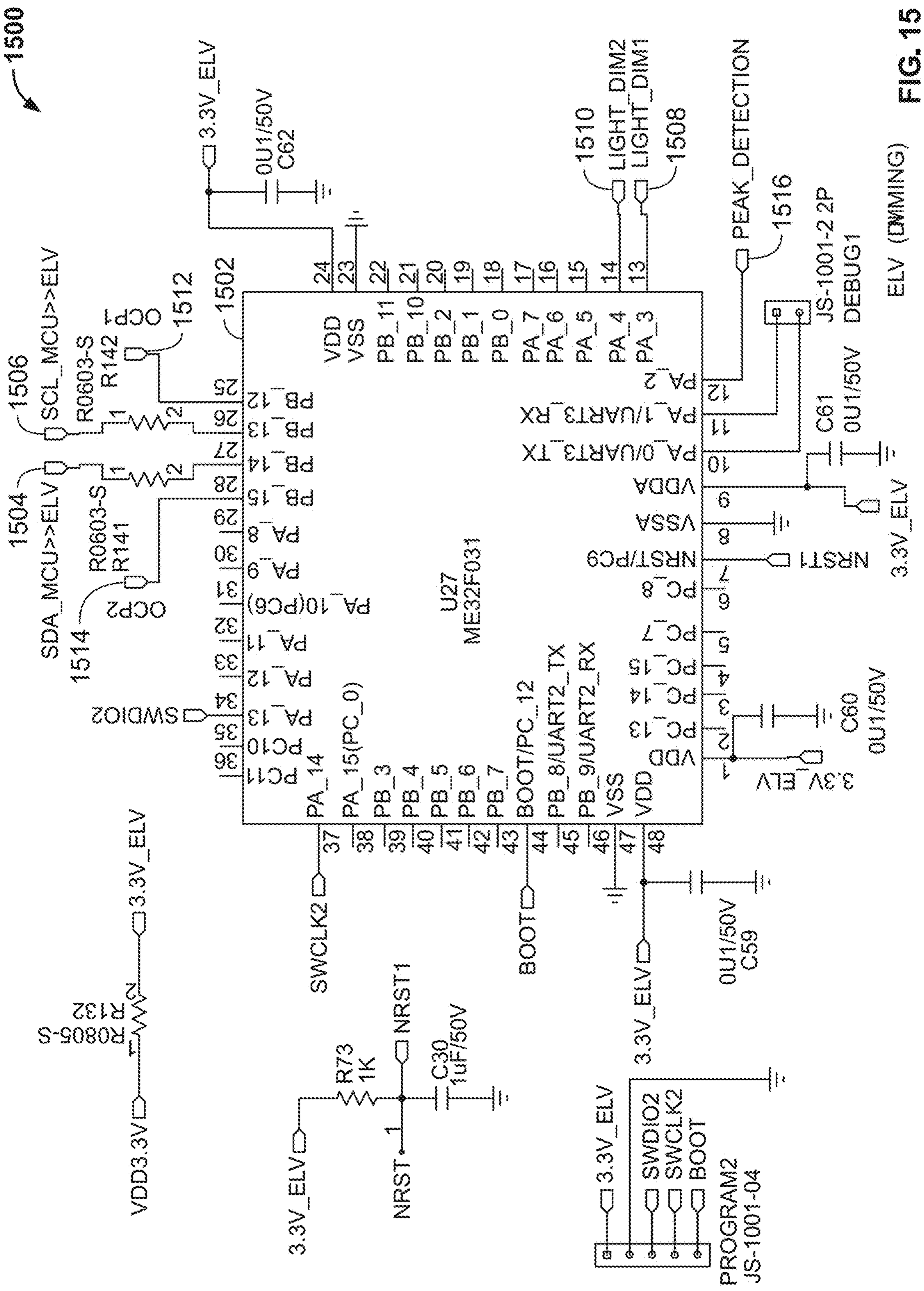
FIG. 15 shows schematically illustrative apparatus in accordance with the principles of the invention.

FIG. 15 shows schematically illustrative ELV dimming circuit 1500. ELV dimming circuit 1500 may be included in ELV dimmer 910. ELV dimming circuit 1500 may include integrated circuit ("IC") 1502 (U27). IC 1502 may receive input 1504 (SDA_MCU>>ELV). Input 1504 may include serial dimming data that corresponds to one or more dimming levels to be attained by one or both of dimming circuits 1000 and 1100. The dimming data may be based on one or more user inputs 919. IC 1502 may receive input 1506 (SCL_MCU>>ELV). Input 1506 may include serial clock data. The serial clock data may synchronize IC 1502 with other circuit elements.

IC 1502 may produce outputs 1508 (LIGHT_DIM1) and 1510 (LIGHT_DIM2). Outputs 1508 and 1510 may be based on inputs 1504 and 1506. Outputs 1508 and 1510 may feed into inputs 1008 and 1108 to adjust power output across: (a) input 1002 and output 1006, and (b) input 1102 and output 1106, respectively of dimming circuits 1000 and 1100.

IC 1502 may receive inputs 1512 (OCP1) and 1514 (OCP2), which may correspond to voltage outputs 1204 (of dimming circuit 1200) and 1304 (of dimming circuit 1300). Inputs 1512 and 1514 may provide IC 1502 with indications of overcurrent or short circuit conditions in dimming circuits 1200 and 1300, respectively. IC 1502 may, in response to an overcurrent or short circuit condition transmit, via one or both of outputs 1510 and 1508, to a corresponding dimming circuit, a signal that reduces or eliminates power output via a corresponding outputs 1006 and 1106.

IC 1502 may receive input 1516 (PEAK_DETECTION). Input 1516 may provide IC 1502 with a signal corresponding to a peak of a phase of AC power received across inputs 1002 and 1004 (of dimming circuit 1000) and inputs 1102 and 1104 (of dimming circuit 1100). IC 1502 may register outputs 1508 and 1510, to the AC power peak to accurately control phase cutting performed by dimming circuits 1000 and 1100, respectively.

Figure 16:
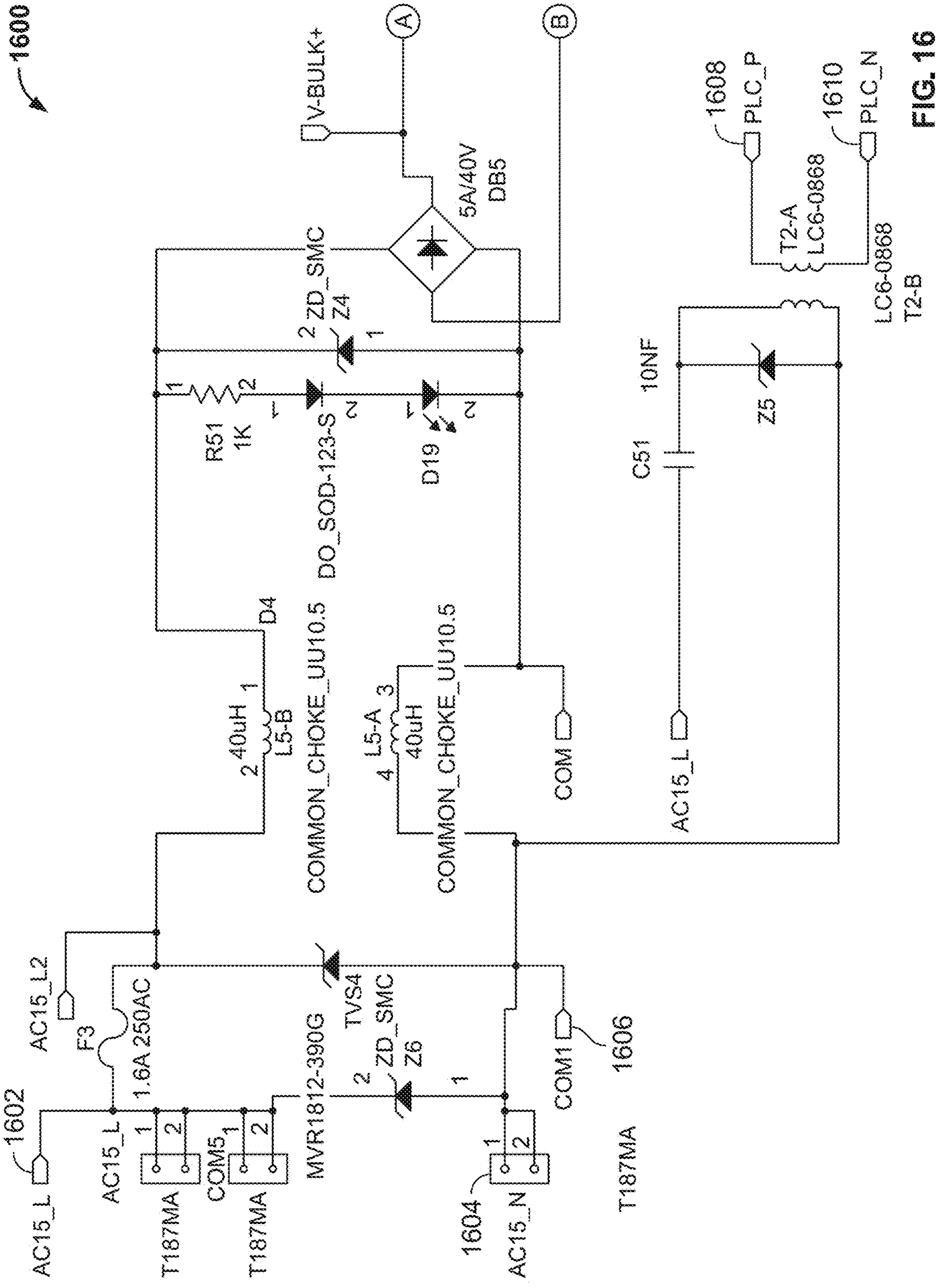
FIG. 16 shows schematically illustrative apparatus in accordance with the principles of the invention.
Figure 16:
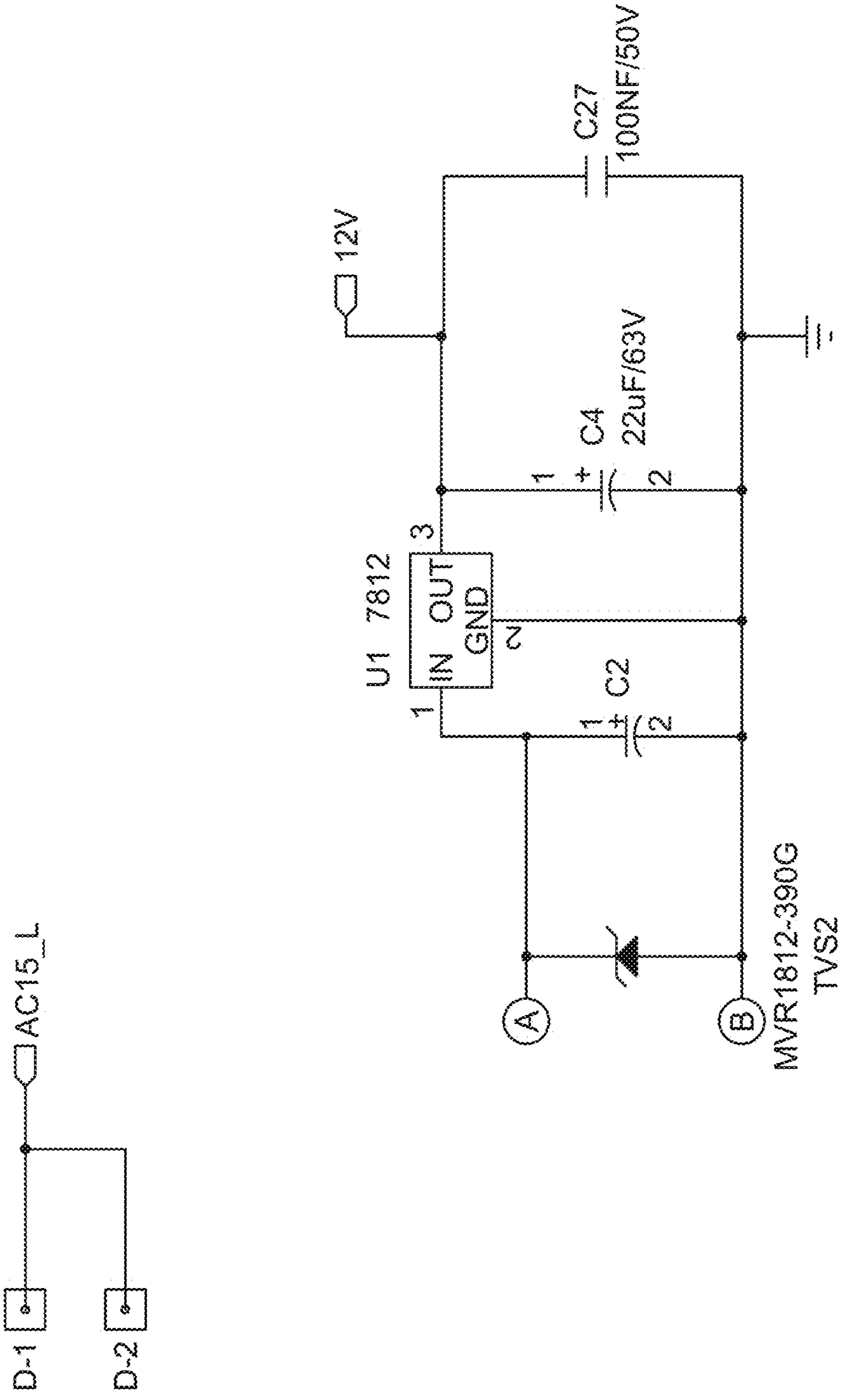

FIG. 16 shows schematically illustrative power supply 1600. Power supply 1600 may be included in PLC module 914. Power supply 1600 may receive inputs 1602 (AC15_L), 1604 (AC15_N) and 1606 (COM1). Power supply 1600 may receive reduced voltage from step-down transformer 908 across inputs 1602 and 1606. Power supply 1600 may receive an analog PLC signal across inputs 1608 (PLC_P) and 1610 (PLC_N). The analog PLC signal may include encoded lighting control information.

Power supply 1600 may cause the encoded lighting control information to be superimposed on the reduced voltage across inputs 1602 and 1606. The encoded lighting control information may propagate through one or both of dimming circuits 1000 and 1100 to fixture strings 114 and 116, respectively.

Figure 17:
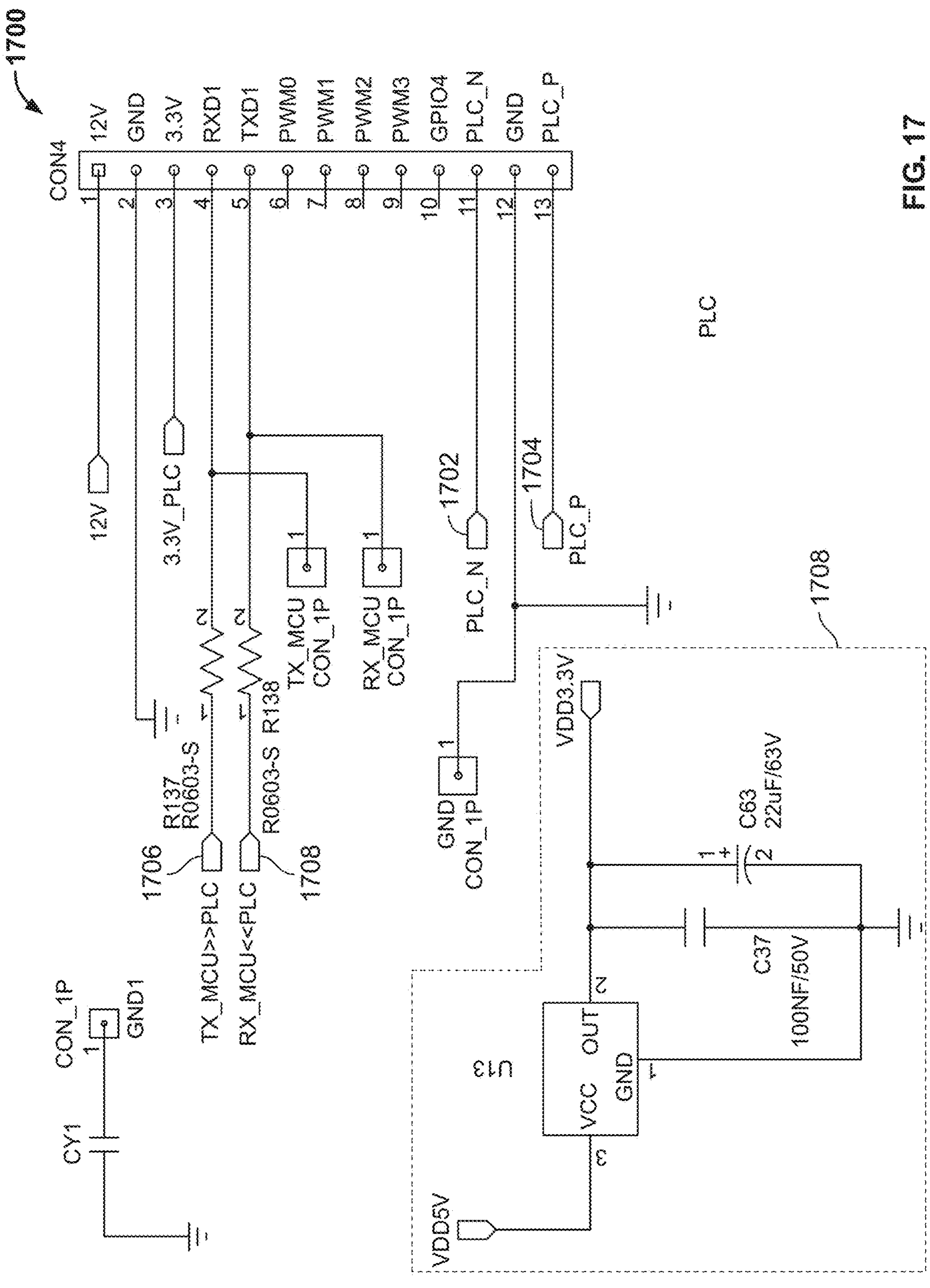
FIG. 17 shows schematically illustrative apparatus in accordance with the principles of the invention.

FIG. 17 shows schematically illustrative PLC module connector 1700 (CON4). Connector 1700 may be configured to connect to a PLC encoder/decoder module (for example, Model No. PLM4010B-B111-HC1S, available from Shenzhen Lihe Microelectronics Co., Ltd., 11F, Research Building, Tsinghua Info-port, North of Hi-Tech Industrial Park, Nanshan District, Shenzhen, Guangdong, P. R. C.; not shown).

The PLC encoder/decoder module may encode lighting control information into an analog PLC signal. PLC module connector 1700 may output the analog PLC signal at inputs 1702 (PLC_N) and 1704 (PLC_P), which may be in communication with corresponding inputs 1608 and 1610 of power supply 1600.

The PLC encoder/decoder module may have a carrier operating frequency of 2.4-5.7 MHz, may have a communication rate of 120 kbps-1.2 Mbps and a point-to-point communication distance of 200-500 meters, and may work on power transmission lines having AC power at 50 or 60 Hz or DC power.

PLC module connector 1700 may receive lighting control information from control unit 912 at input 1706 (TX_MCU>>PLC). PLC module connector 1700 may include output 1708 (RX_MCU<<PLC). Output 1708 may provide lighting control information from PLC module 930 to control unit 912.

Illustrative power supply 1708 may provide operational power to the PLC encoder/decoder module.

Figure 18:
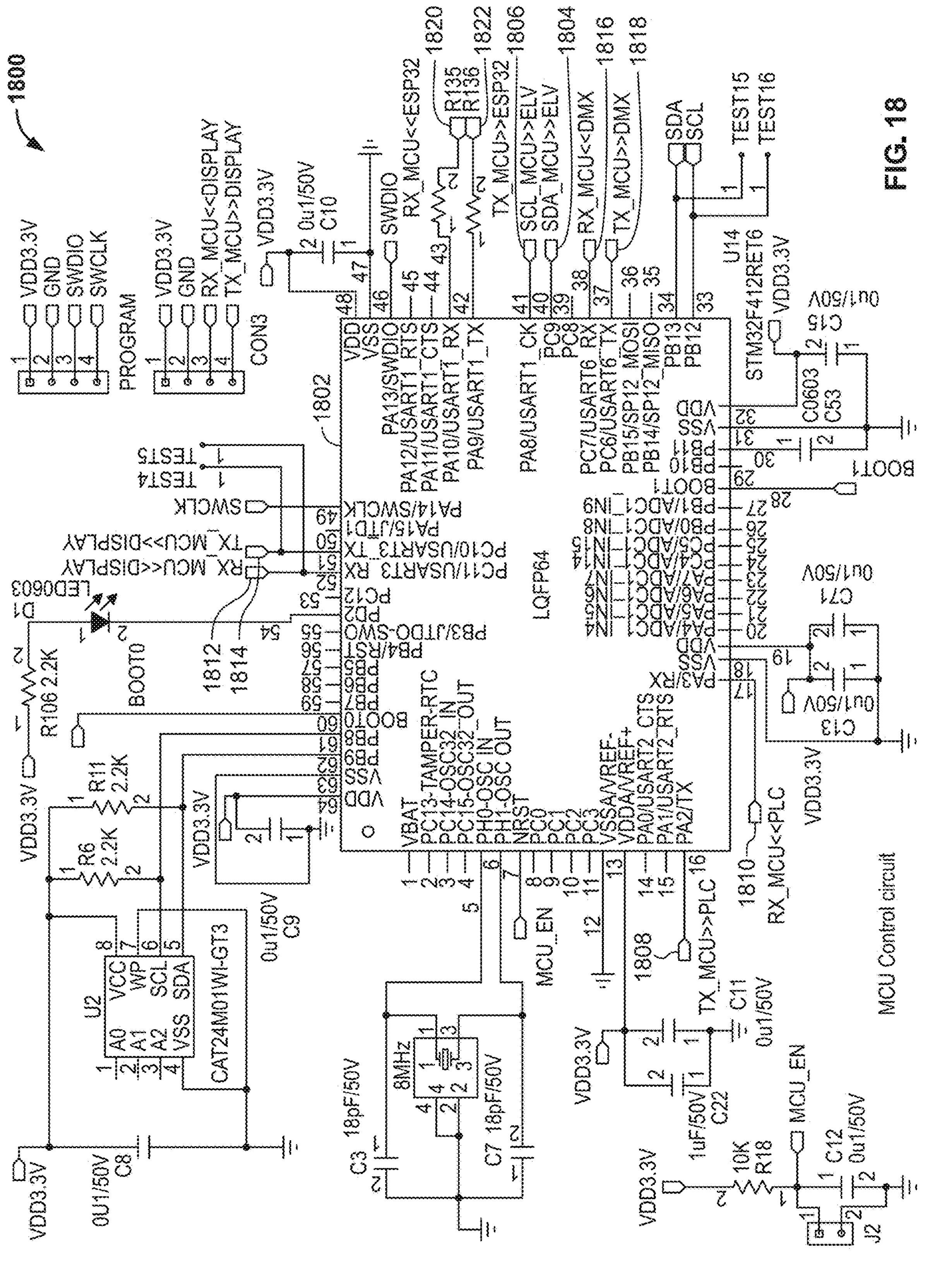
FIG. 18 shows schematically illustrative apparatus in accordance with the principles of the invention.

FIG. 18 shows schematically illustrative control circuit 1800. Control circuit 1800 may be part of control unit 912. Control circuit 1800 may include microcontroller 1802 (U14). Microcontroller 1802 may provide ELV dimming data to one or both of dimming circuits 1000 and 1100. Microcontroller 1802 may provide PLC signals to the PLC encoder/decoder module of PLC module connector 1700.

Microcontroller 1802 may provide output 1804 (SDA_MCU>>ELV). Output 1804 may be provided to input 1504 of ELV dimming circuit 1500. Output 1804 may include serial dimming data that corresponds to one or more dimming levels to be attained by one or both of dimming circuits 1000 and 1100. The dimming data may be based on one or more user inputs 919.

Microcontroller 1802 may provide output 1806 (SCL_MCU>>ELV). Output 1806 may be provided to input 1506 of ELV dimming circuit 1500. Output 1806 may include serial clock data. The serial clock data may synchronize microcontroller 1802 with IC 1502.

Microcontroller 1802 may provide output 1808 (TX_MCU>>PLC). Output 1808 may include lighting control information intended for fixture 906. Output 1808 may feed into input 1706 of PLC module connector 1700.

Microcontroller 1802 receive input 1810 (RX_MCU<<PLC). Input 1810 may include lighting control information received from power transmission line 904. Input 1810 may be fed by output 1708 of PLC module connector 1700.

Control circuit 1800 may be in communication with one or more sources of input such as user inputs 919. Microcontroller 1802 may receive input 1812 (RX_MCU<<DISPLAY) from control panel 927. Microcontroller 1802 may provide output 1814 (TX_MCU>>DISPLAY) to control panel such as 927.

Microcontroller 1802 may receive input 1816 (RX_MCU<<DMX) from DMX module 924. Microcontroller 1802 may provide output 1818 (TX_MCU>>DMX) to DMX module 924.

Microcontroller 1802 may receive input 1820 (RX_MCU<<ESP32) from Wifi I/O module 922. Microcontroller 1802 may provide output 1822 (TX_MCU>>ESP32) to Wifi I/O module 922.

Figure 19:
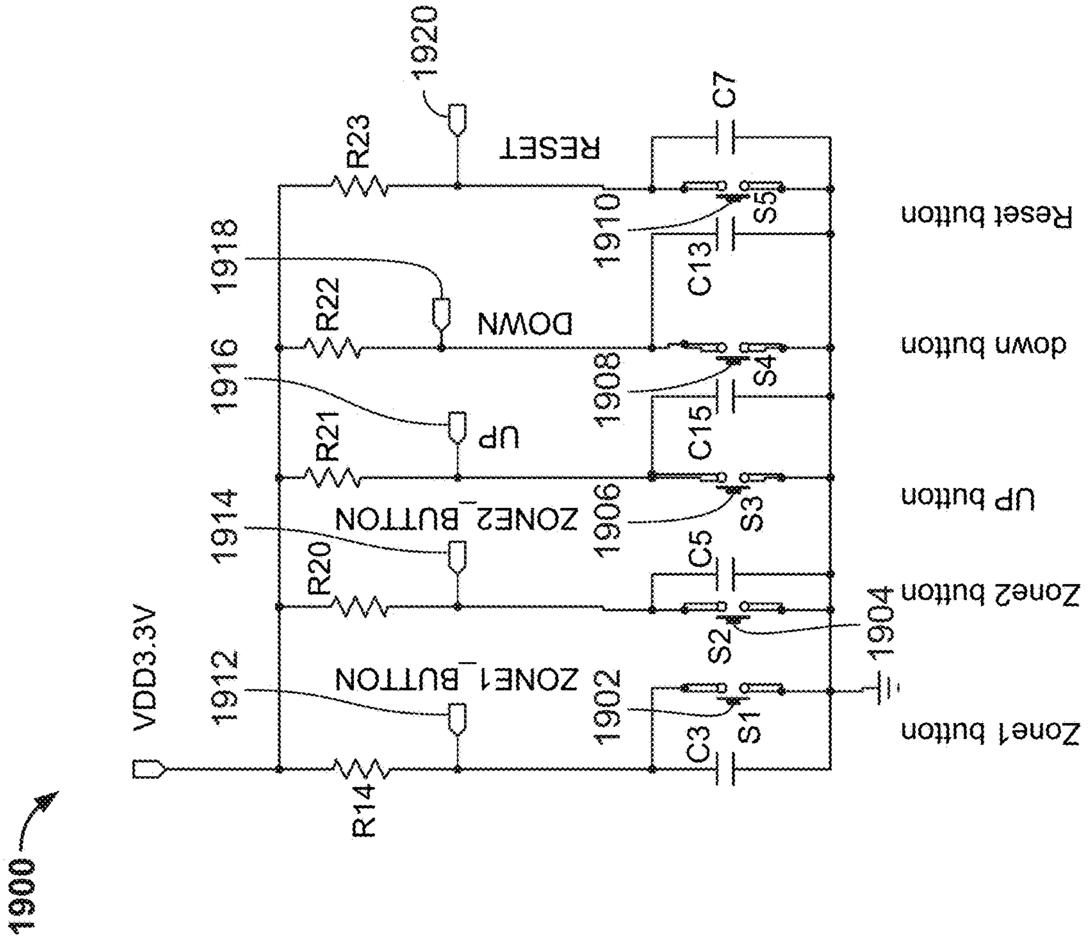
FIG. 19 shows schematically illustrative apparatus in accordance with the principles of the invention.

FIG. 19 shows schematically illustrative manual input module 1900. Input module may be part of control panel 927. Manual input module 1900 may include one or more of input sensor 1902 (ZONE1_BUTTON), input sensor 1904 (ZONE2_BUTTON), input sensor 1906 (UP), input sensor 1908 (DOWN) and input sensor 1910 (RESET). One or more of input sensors 1902, 1904, 1906, 1908 and 1910 may include a mechanical button. One or more of input sensors 1902, 1904, 1906, 1908 and 1910 may include a normally-open pushbutton. One or more of input sensors 1902, 1904, 1906, 1908 and 1910 may include a sensor, such as a capacitance sensor, a heat sensor or any other suitable sensor.

Manual input module 1900 may provide one or more of outputs 1912 (ZONE1_BUTTON), 1914 (ZONE2_BUTTON), 1916 (UP), 1918 (DOWN) and 1920 (RESET). Outputs 1912, 1914, 1916, 1918 and 1910 may receive a signal from input sensors 1902, 1904, 1906, 1908 and 1910, respectively.

A user may activate sensor 1902 to select fixtures in a string of fixtures such as string 114. The user may activate sensor 1904 to select fixtures in a string of fixtures such as string 116. The user may activate sensor 1906 to increase a brightness of fixtures on a string of fixtures selected using either sensor 1902 or sensor 1904. The user may activate sensor 1906 to decrease a brightness of fixtures on a string of fixtures selected using either sensor 1902 or sensor 1904. The changes in brightness may be effected by ELV dimming in dimming circuits 1000 and 1100.

The user may activate sensor 1910 to reset fixture module 902. Activation of sensor 1910 may cause lighting controller 902 to initiate a fixture discovery process. The discovery process may involve exchanging fixture control information with fixtures such as those in fixture string 114 via the PLC encoder/decoder module via PLC module connector 1700.

The discovery process may involve transmitting fixture control information to fixtures such as those in fixture string 114 via a pattern effected by one or both of dimming circuits 1000 and 1100.

Figure 20:
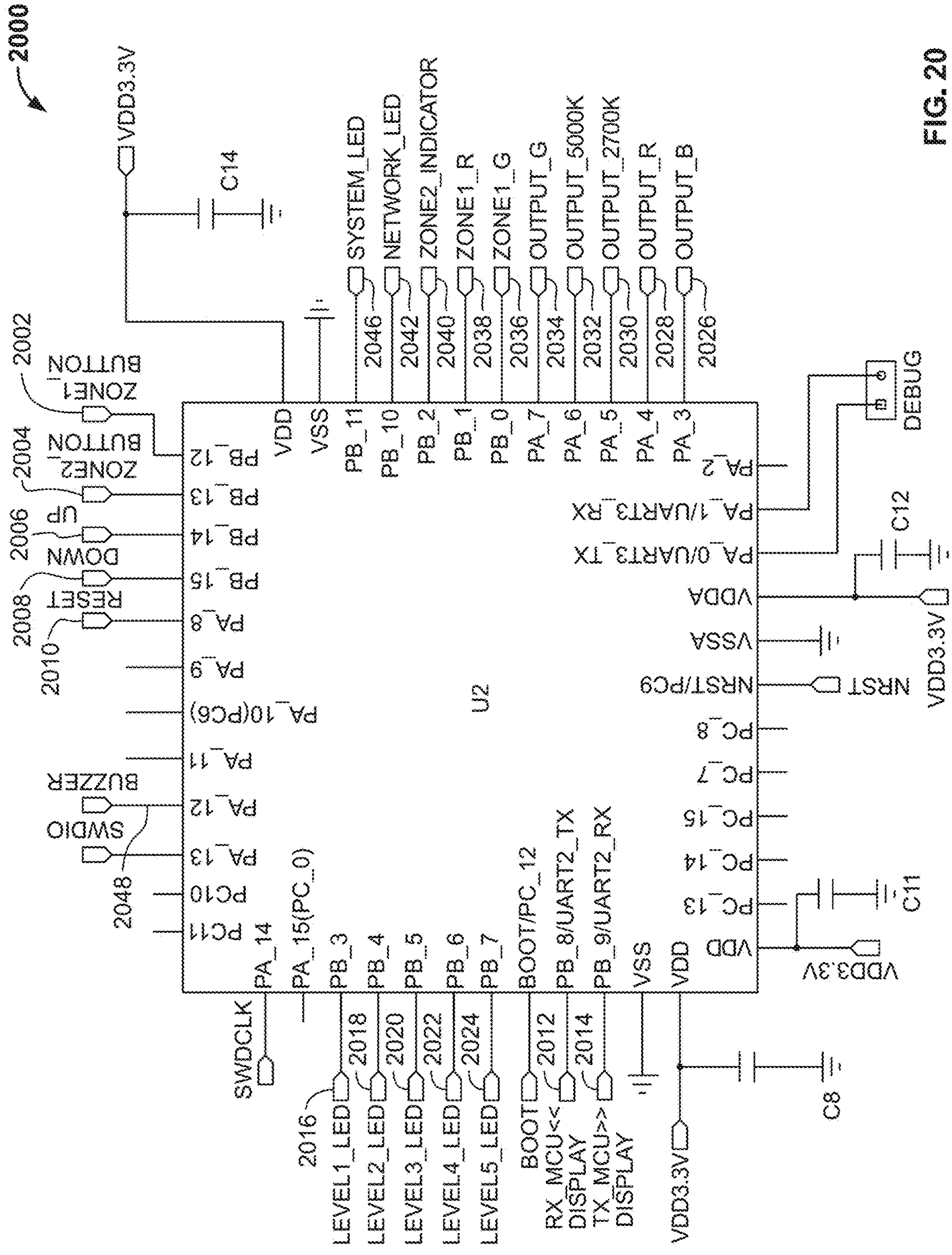
FIG. 20 shows schematically illustrative apparatus in accordance with the principles of the invention.

FIG. 20 shows schematically illustrative IC 2000 (U2). IC 2000 may be part of control panel 927. IC 2000 may receive user inputs from manual input module 1900. IC 2000 may receive one or more of inputs 2002 (ZONE1_BUTTON), 2004 (ZONE2_BUTTON), 2006 (UP), 2008 (DOWN) and 2010 (RESET). Inputs 2002, 2004, 2006, 2008 and 2010 may receive signals from outputs 1912, 1914, 1916, 1918 and 1920, respectively, of manual input module 1900.

IC 2000 may provide output 2012 (RX_MCU<<DISPLAY). IC 2000 may feed signals, based on one or more of inputs 2002, 2004, 2006, 2008 and 2010, via output 2012, to input 1812 of microcontroller 1802. Microcontroller 1802 may effect dimming changes via dimming circuits 1000 and 1100 based on output 2012. Microcontroller may effect transmission of fixture control information via one or more of dimming circuits 1000 and 1100 and the PLC encoder/decoder module based on output 2012.

IC 2000 may receive input 2014 (RX_MCU>>DISPLAY). Input 2014 may be fed from output 1814 of microcontroller 1802. Output 1814 may include system information such as a dimming level for a fixture string, a fixture string selection indicator, a fixture discovery status, an LED color status indication, a buzzer command or any other suitable system information.

IC 2000 may provide one or more of outputs 2016 (LEVEL1_LED), 2018 (LEVEL2_LED), 2020 (LEVEL3_LED), 2022 (LEVEL4_LED) and 2024 (LEVEL5_LED). Each outputs 2016, 2018, 2020, 2022 and 2024 may correspond to an indicator LED that indicates a brightness level of fixtures that are powered by whichever of dimming circuit 1000 and dimming circuit 1100 is selected by buttons 1902 and 1904. Output 2016 may cause a first indicator LED, indicating a first brightness level, to emit. Output 2016 may cause a second indicator LED, indicating a second brightness level, to emit. Output 2016 may cause a third indicator LED, indicating a third brightness level, to emit. Output 2016 may cause a fourth indicator LED, indicating a fourth brightness level, to emit. Output 2016 may cause a fifth indicator LED, indicating a fifth brightness level, to emit.

IC 2000 may provide one or more of outputs 2026 (OUTPUT_B), 2028 (OUTPUT_R), 2030 (OUTPUT_2700K), 2032 (OUTPUT_5000K) and 2034 (OUTPUT_G). Each of outputs 2026, 2028, 2030, 2032 and 2034 may cause a corresponding indicator LED to emit. Outputs 2026, 2028, 2030, 2032 and 2034 may correspond to operational states of blue, red, 2700K white, 5000K white and green LEDs in a fixture string such as fixture string 114. The operational states may include ON and OFF. The operational states may be ascertained by microcontroller 1802. The operational states may be selected by a user via one or more of lighting control user inputs 919. Microcontroller 1802 may provide the user states to IC 2000 via output 1814.

IC 2000 may provide one or more of outputs 2036 (ZONE1_G), 2038 (ZONE1_R) and 2040 (ZONE2_INDICATOR). Outputs 2036, 2038 and 2040 may cause a corresponding indicator LED to emit. Microcontroller 1802 may provide the mode indicators to IC 2000 via output 1814.

IC 2000 may include one or both of outputs 2042 (NETWORK_LED) and 2046 (SYSTEM_LED). Each of outputs 2042 and 2046 may cause a corresponding indicator LED to emit. Output 2042 may correspond to operational states of a network module. The operational states may include CONNECTED and NOT CONNECTED. Output 2046 may correspond to operational states of a dimming circuit such as dimming circuit 1000 or dimming circuit 1100. The operational states may include POWERED and NOT POWERED. The operational states may be ascertained by microcontroller 1802. Microcontroller 1802 may provide the user states to IC 2000 via output 1814.

IC 2000 may provide output 2048. Output 2048 may activate a display buzzer. The buzzer may indicate a fault condition in one or more of the circuits in fixture module 902. The buzzer may indicate a fault condition in a connection between lighting controller 902 and power transmission line 904. The buzzer may indicate a fault condition in a connection between lighting controller 902 and fixture 906.

Figure 21:
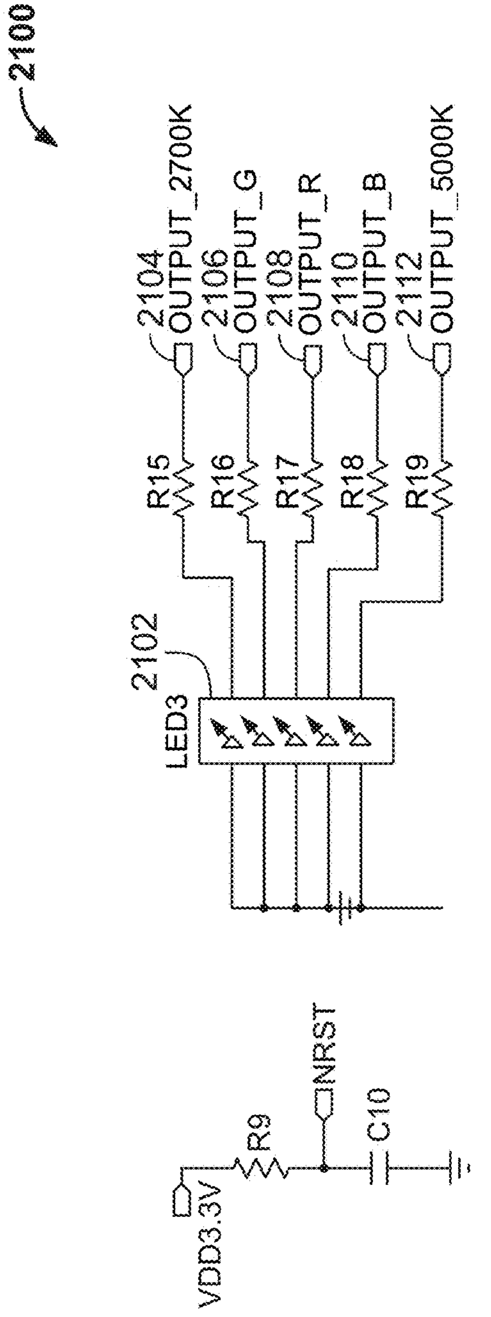
FIG. 21 shows schematically illustrative apparatus in accordance with the principles of the invention.

FIG. 21 shows schematically illustrative circuit 2100. Circuit 2100 may be part of control panel 927. Circuit 2100 may include LED array 2102. LED array 2102 may include indicator LEDs. Each of the indicator LEDs may correspond to an LED color in a fixture such as fixture 906. Emission from an indicator LED may indicate that the corresponding color is emitting in fixture 906. Circuit 2100 may receive one or more of inputs 2104, 2106, 2108, 2110 and 2112. Inputs 2104, 2106, 2108, 2110 and 2112 may be fed, respectively, by outputs 2030, 2034, 2028, 2026 and 2032 of IC 2000.

Figure 22:
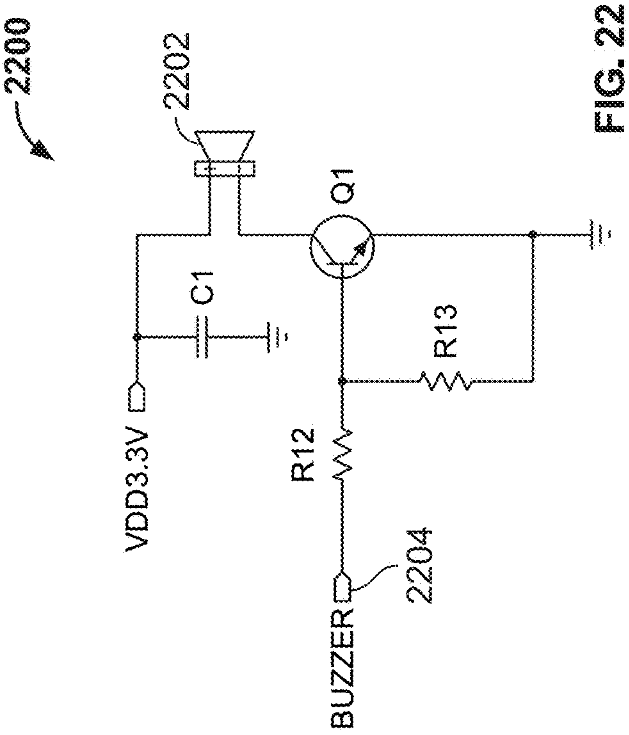
FIG. 22 shows schematically illustrative apparatus in accordance with the principles of the invention.

FIG. 22 shows schematically illustrative circuit 2200. Circuit 2200 may be part of control panel 927. Circuit 2200 may include buzzer 2202. Circuit 2200 may drive buzzer 2202. Circuit 2200 may receive input 2204. Input 2204 may be fed by output 2048 of IC 2000.

Figure 23:
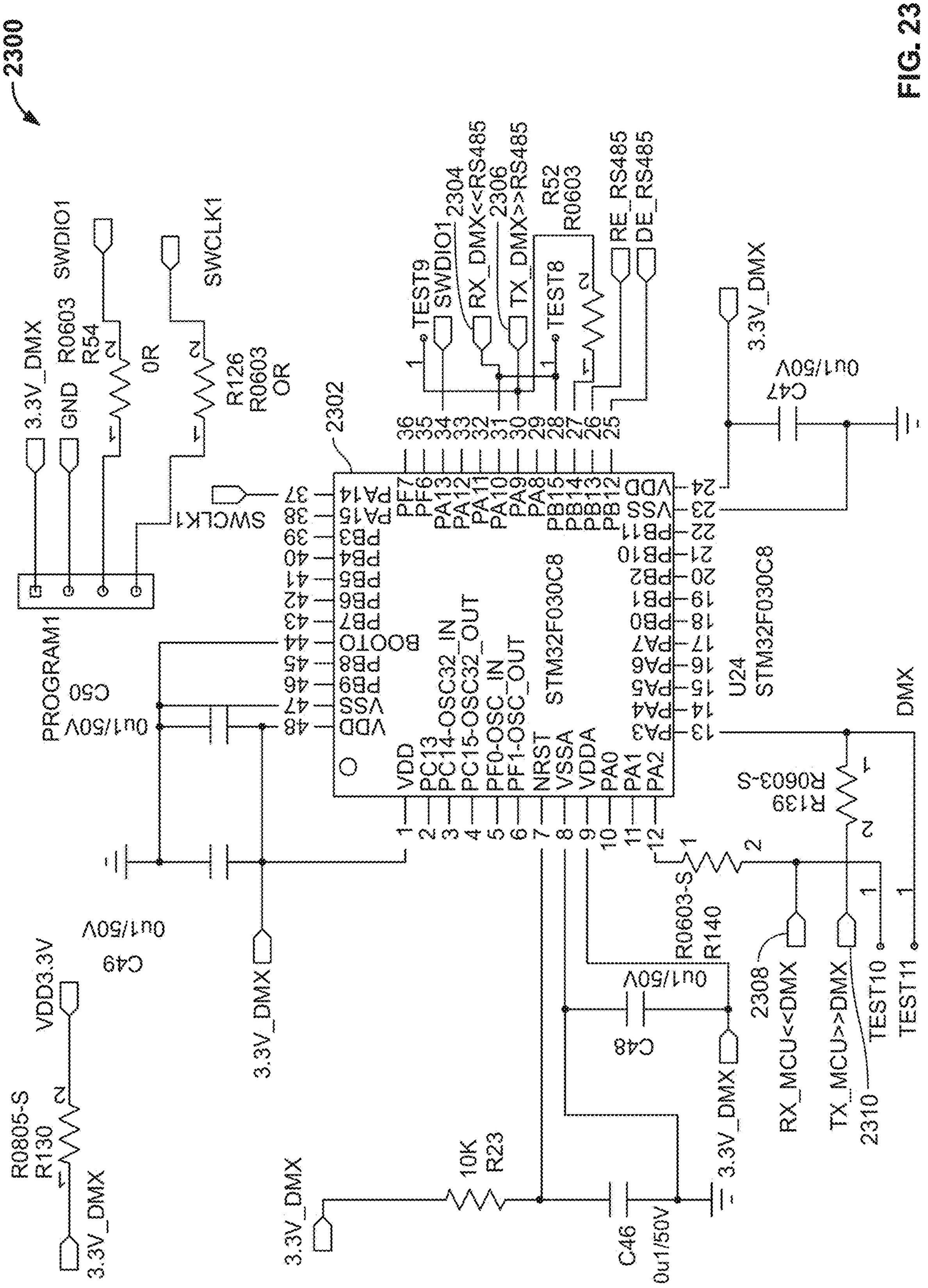
FIG. 23 shows schematically illustrative apparatus in accordance with the principles of the invention.

FIG. 23 shows schematically circuit 2300. Circuit 2300 may be part of DMX module 924. Circuit 2300 may include IC 2302 (U24). IC 2302 may receive input 2304 (RX_DMX<<RS485). IC 2302 may receive input 2304 from a serial data module (not shown). Input 2304 may include serial lighting control information. The serial lighting control information may include light fixture addresses and corresponding light fixture brightness levels. The brightness levels may include an overall brightness level for a fixture. The brightness level may include numerical values that correspond to partitions of the brightness among one or more LED colors in the fixture. The colors may include red ("R"), green ("G"), blue ("B") and one or more white ("W") colors having different correlated color temperatures ("CCT") and any other suitable colors. IC 2302 may provide output 2306. Output 2306 may coordinate communication with the serial data module (not shown).

IC 2302 may translate the serial lighting control information into DMX-formatted data. IC 2302 may provide output 2308 (RX_MCU<<DMX). Output 2308 may include the DMX-formatted data. Output 2308 may feed input 1816 of microcontroller 1802.

IC 2302 may receive input 2310 (TX_MCU>>DMX). Input 2310 may be fed by output 1818 of microcontroller 1802. Output 1818 may support the communication of DMX-formatted data from IC 2302 to microcontroller 1802.

Figure 24:
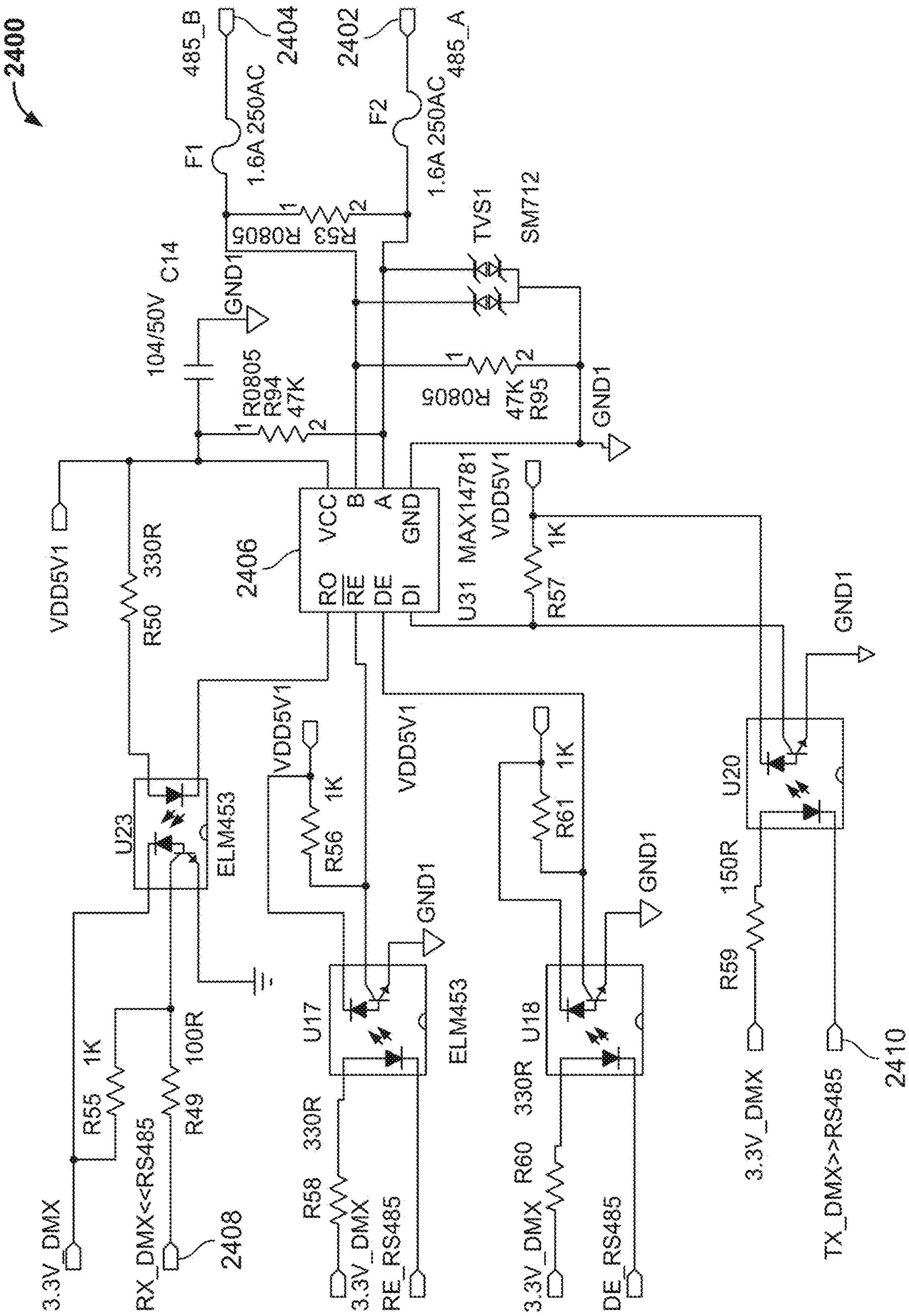
FIG. 24 shows schematically illustrative apparatus in accordance with the principles of the invention.
Figure 24:
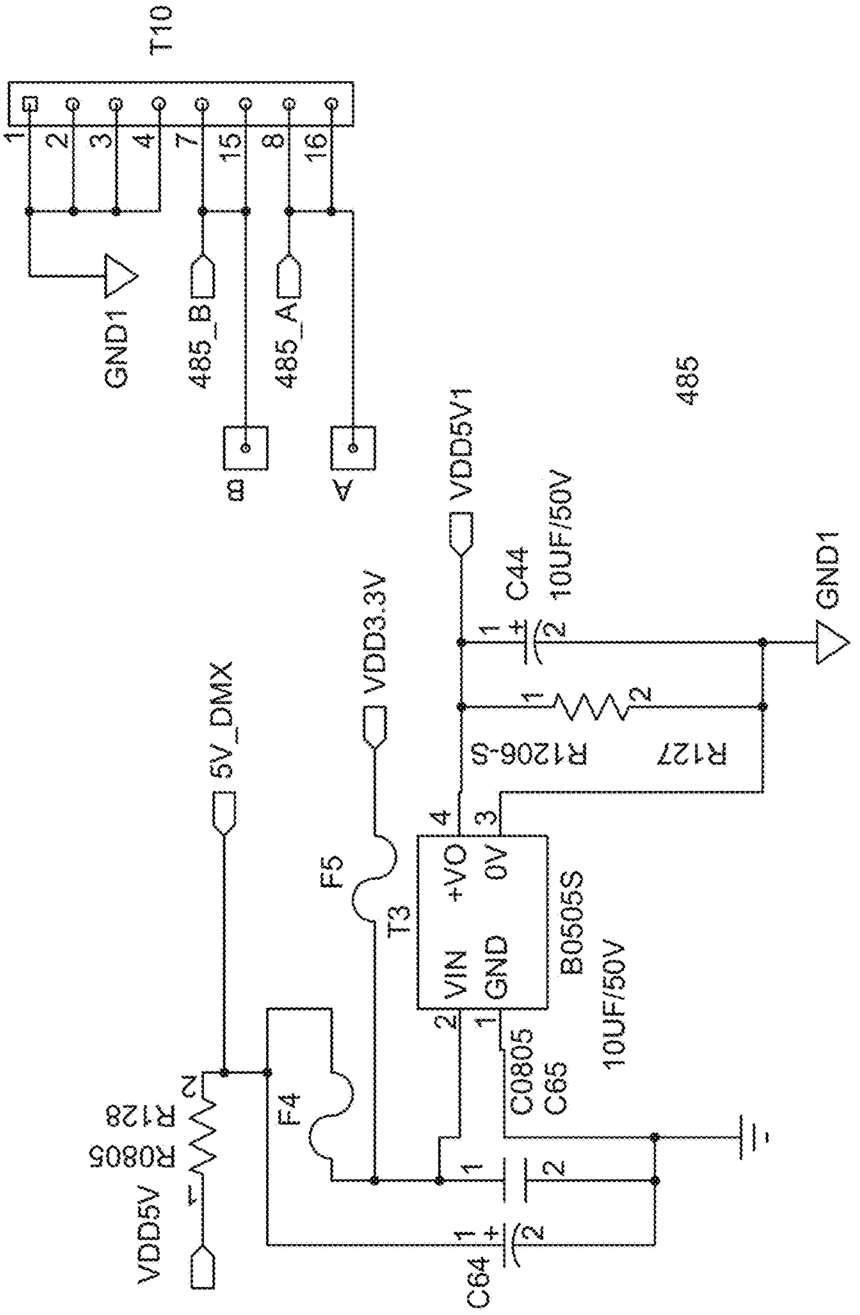

FIG. 24 shows schematically illustrative serial communication port circuit 2400. Circuit 2400 may receive input 2402. Circuit 2400 may receive input 2404. Inputs 2402 and 2404 may receive serial lighting control information in an RS485 format. Circuit 2400 may include IC 2406 (U31). IC 2406 may receive an "A" signal based on input 2402. IC 2406 may receive a "B" signal based on input 2404. The A signal and the B signal may together define a bipolar signal. IC 2406 may convert the A signal and the B signal into a DMX format. Circuit 2400 may provide output 2408 (RX_DMX<<RS485). Output 2408 may include DMX-formatted lighting control information. Output 2408 may feed input 2304 of DMX module circuit 2300. Circuit 2400 may receive input 2410 (TX_DMX>>RS485). Input 2410 may support communication between circuit 2400 and circuit 2300. Input 2410 may be fed by output 2306 of DMX module circuit 2300.

Figure 25:
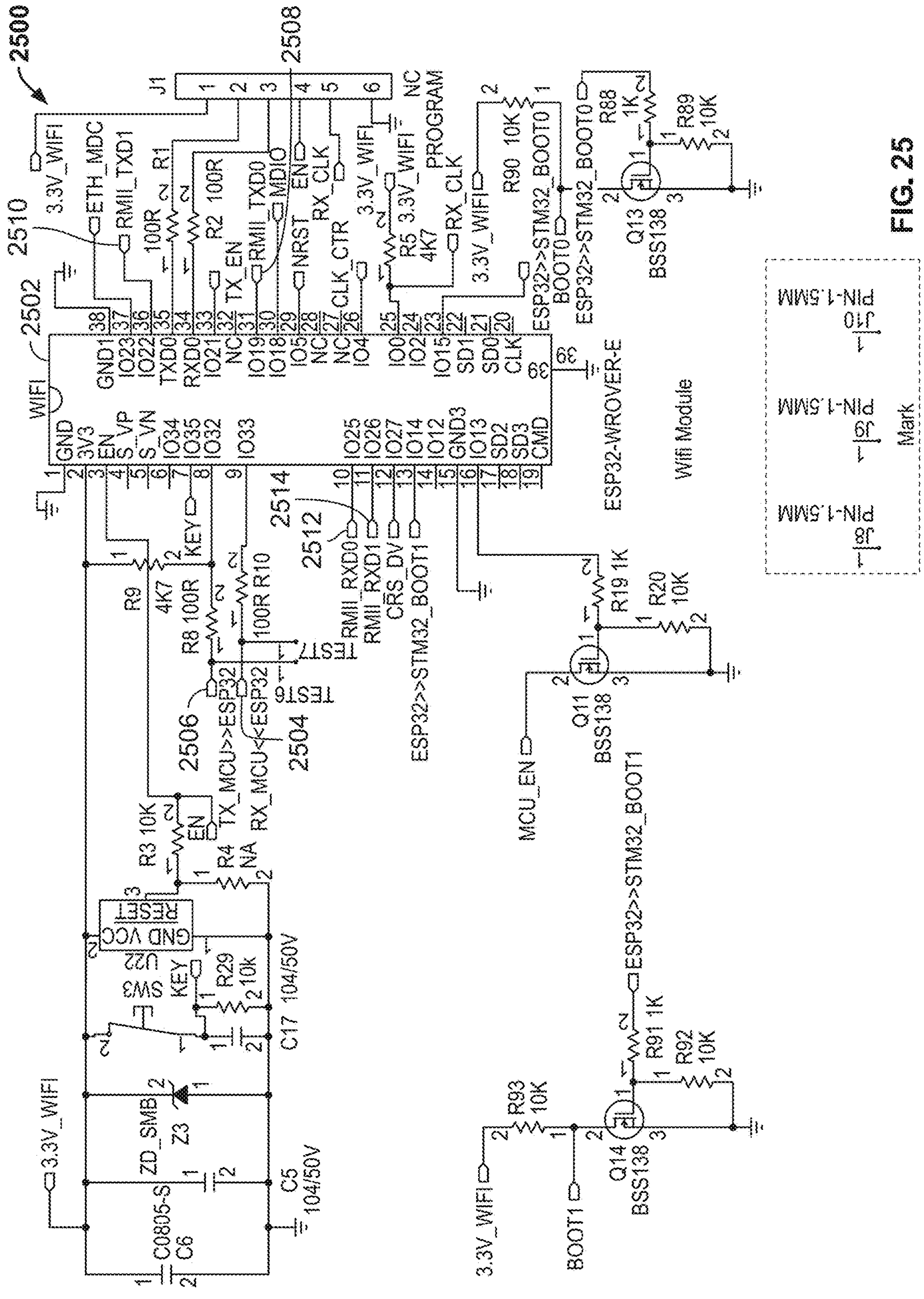
FIG. 25 shows schematically illustrative apparatus in accordance with the principles of the invention.

FIG. 25 shows schematically illustrative transceiver circuit 2500. Transceiver circuit 2500 may be part of Wifi I/O module 922. Transceiver circuit 2500 may transmit and receive signals conforming to a Wifi protocol. Transceiver circuit 2500 may transmit and receive signals conforming to a Bluetooth protocol. Transceiver circuit 2500 may include IC 2502 (Wifi module).

Circuit 2500 may receive from a user lighting control information via wireless signals from a user-operated device. Circuit 2500 may receive from a user lighting control information via a local area network ("LAN") over a cable.

Circuit 2500 may provide output 2504 (RX_MCU<<ESP32). Output 2504 may provide the lighting control information to microcontroller 1802. Output 2504 may feed into input 1820 of microcontroller 1802.

Circuit 2500 may receive input 2506 (TX_MCU>>ESP32). Input 2506 may support transmission of output 2504 to microcontroller 1802. Input 2506 may be fed by output 1822 of microcontroller 1802.

Circuit 2500 may receive one or both of inputs 2508 (RMII_TXD0) and 2510 (RMII_TXD1). Inputs 2508 and 2510 may include lighting control information from the LAN. Circuit 2500 may provide one or both of outputs 2512 (RMII_RXD0) and 2514 (RMII_RXD1). Outputs 2512 and 2514 may support communication of inputs 2508 and 2510, respectively.

Figure 26:
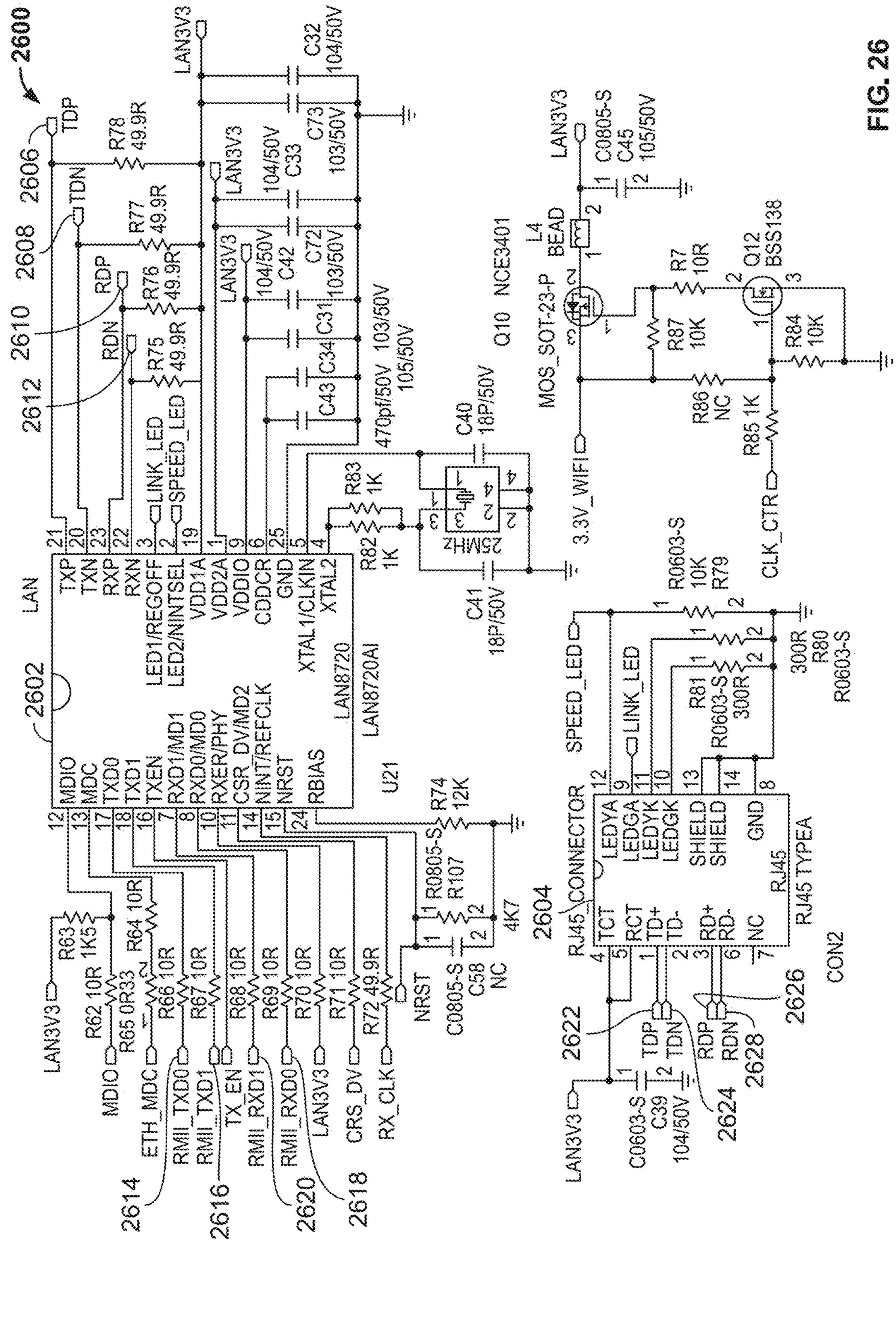
FIG. 26 shows schematically illustrative apparatus in accordance with the principles of the invention.

FIG. 26 shows schematically illustrative network transceiver circuit 2600. Circuit 2600 may include an Ethernet transceiver. Circuit 2600 may include a LAN interface. Circuit 2600 may include IC 2602 (U21). Circuit 2600 may include connector port 2604. Circuit 2600 may receive an RJ45 connector.

IC 2602 may receive inputs 2606 (TDP) and 2608 (TDN). IC 2602 may receive an incoming signal across inputs 2606 and 2608. The signal may include lighting control information. IC 2602 may provide outputs 2610 (RDP) and 2612 (RDN). IC 2602 may provide an outgoing signal across outputs 2610 and 2612. The outgoing signal may support communication of the incoming signal.

IC 2602 may generate outputs 2614 (RMII_TXD0) and 2616 (RMII_TXD1) based on the incoming signal. Outputs 2624 and 2612 may include lighting control information. Outputs 2614 and 2616 may feed inputs 2508 and 2510 of IC 2502.

IC 2602 may receive inputs 2618 (RMII_RXD0) and 2620 (RMII_RXD1). Inputs 2618 and 2620 may be fed by outputs 2512 and 2514 of IC 2502. Inputs 2618 and 2620 may support communication of outputs 2614 and 2616 to IC 2502.

Connector 2604 may receive lighting control information from an Ethernet cable. Connector 2604 may provide outputs 2622 (TDP) and 2624 (TDN) that together form a signal that is fed to inputs 2606 and 2608. The signal may include the lighting control information. Connector 2604 may receive inputs 2626 (RDP) and 2628 (RDN) that together form a signal that may be received form outputs 2610 and 2612 of IC 2602. The signal may support communication of outputs 2622 and 2624.

Figure 27:
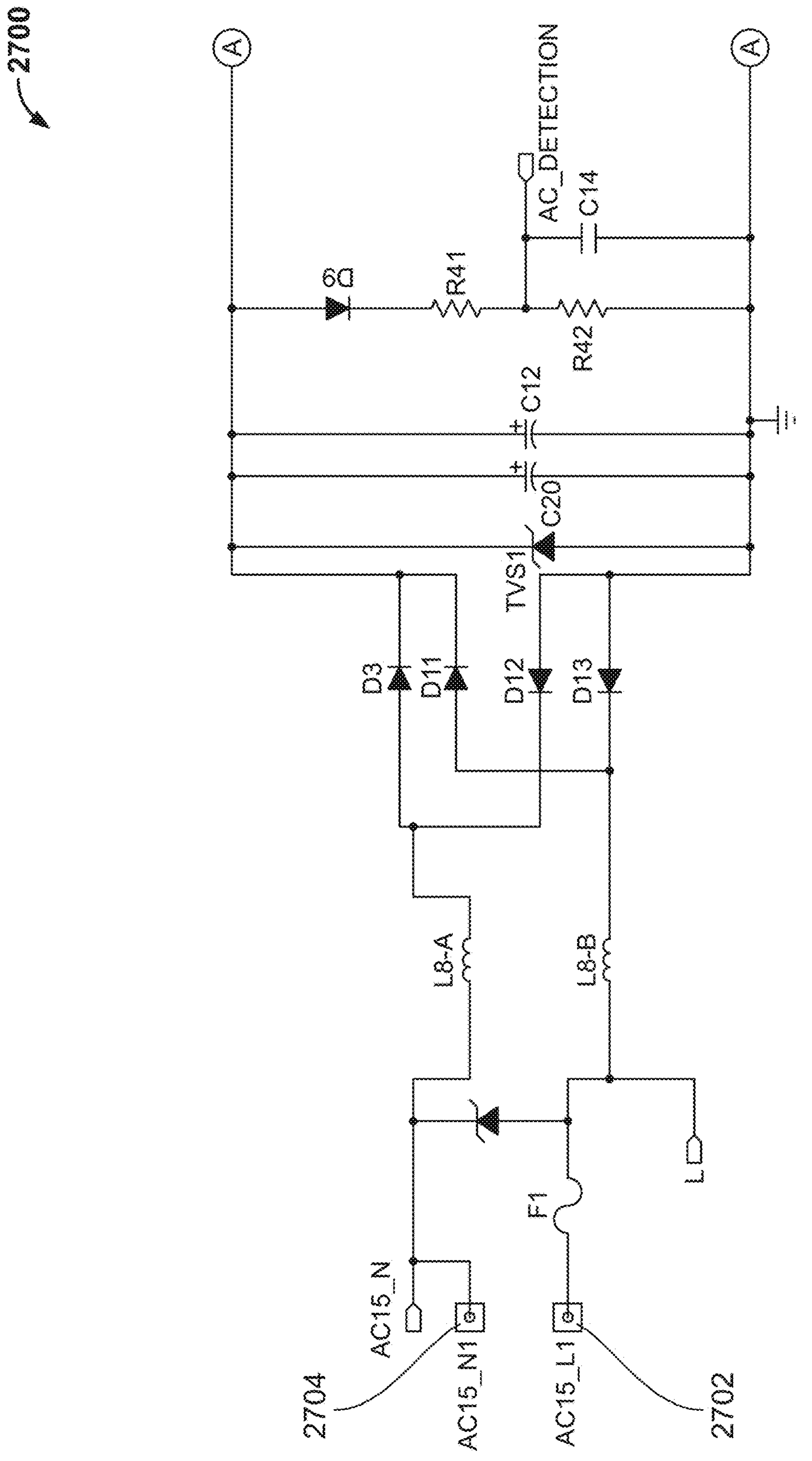
FIG. 27 shows schematically illustrative apparatus in accordance with the principles of the invention.
Figure 27:
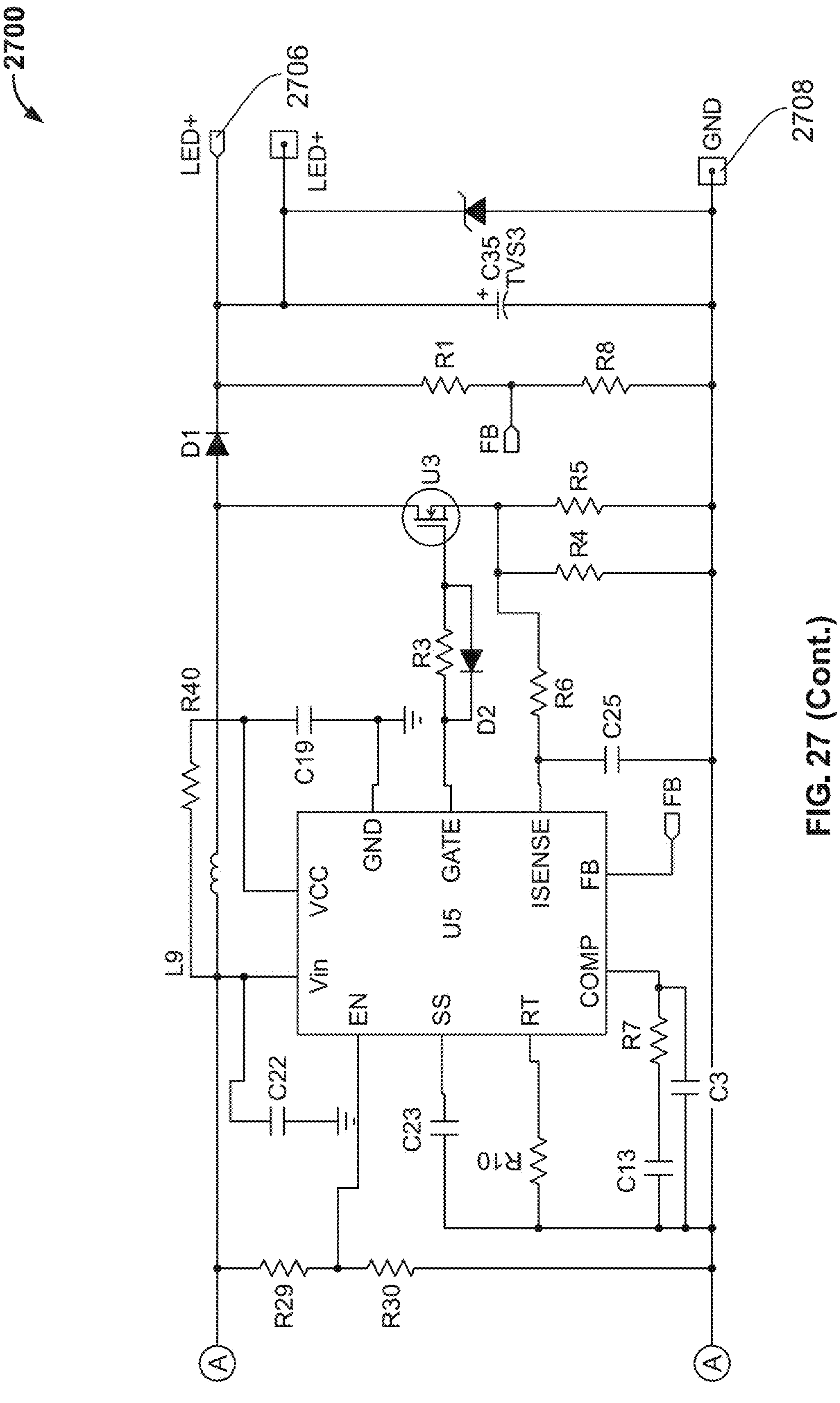

FIG. 27 shows schematically illustrative boost converter circuit 2700. Circuit 2700 may be part of boost converter 928 in fixture 906. Circuit 2700 may include input terminals 2702 (AC15_L1) and 2704 (AC15_N). Input terminals 2702 and 2704 may receive the predetermined voltage from power transmission line 904.

Circuit 2700 may provide output 2706 (LED+). Output 2706 may be at a DC voltage relative to ground 2708. Output 2706 may include a DC current. The DC current may include lighting power for powering LEDs of fixture 906.

Figure 28:
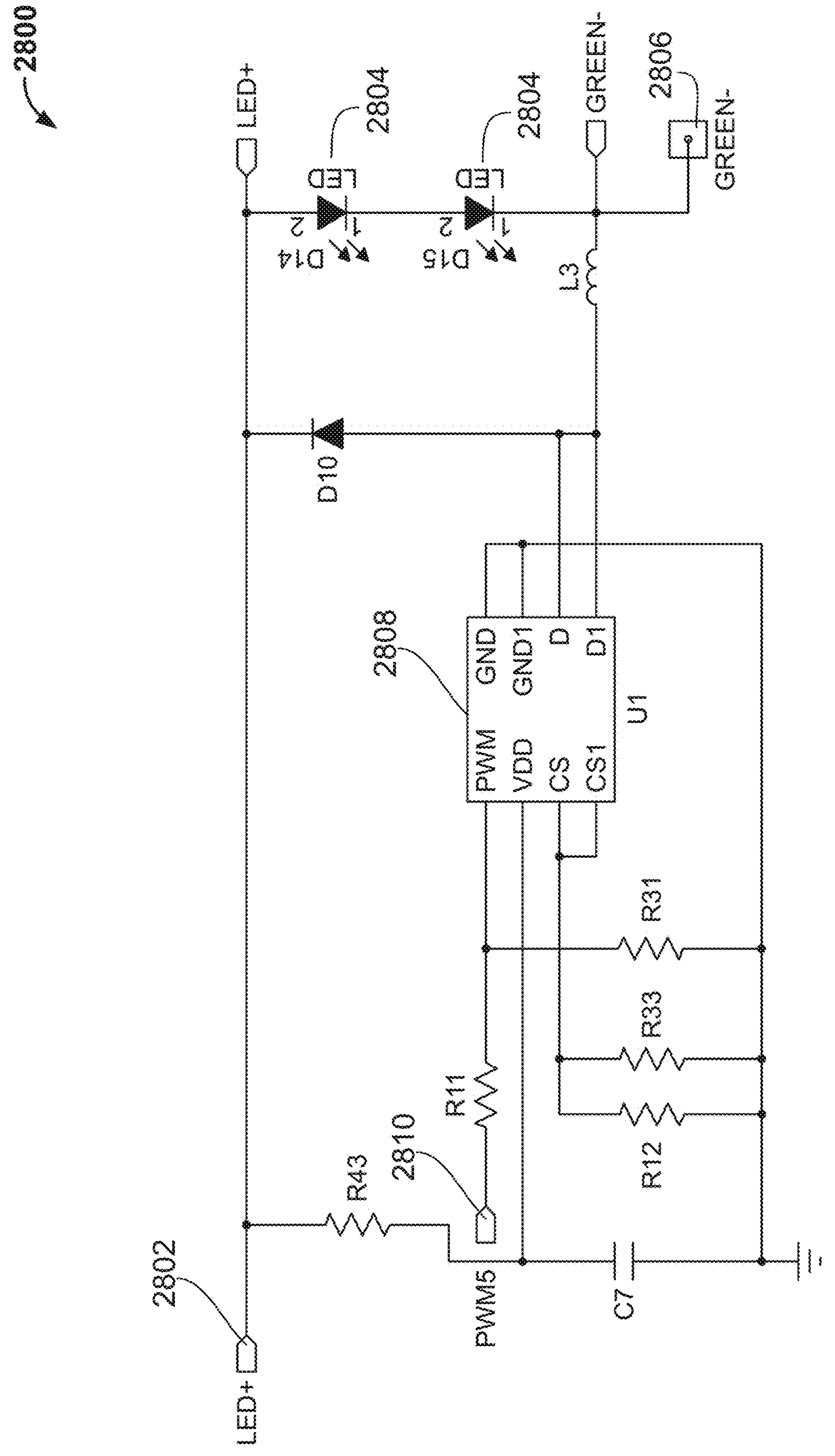
FIG. 28 shows schematically illustrative apparatus in accordance with the principles of the invention.

FIG. 28 shows schematically illustrative LED module circuit 2800. Circuit 2800 may correspond to a buck converter, such as buck converter 936-1, and an LED light source, such as LED light source 934-1. Circuit 2800 may receive input 2802 (LED+). Input 2802 may be fed by output 2706 of boost converter 2700. Circuit 2800 may include one or more LEDs 2804 (D14, e.g.). LEDs 2804 may emit green light based on current passed from input 2802 to terminal 2806 (GREEN−). Circuit 2800 may include IC 2808 (U1). IC 2808 may adjust the current based on input 2810. Input 2810 may include a pulse-width modulated ("PWM") signal. The PWM signal may be determined based lighting control information. The lighting control information may be received from power transmission line 904.

Figure 29:
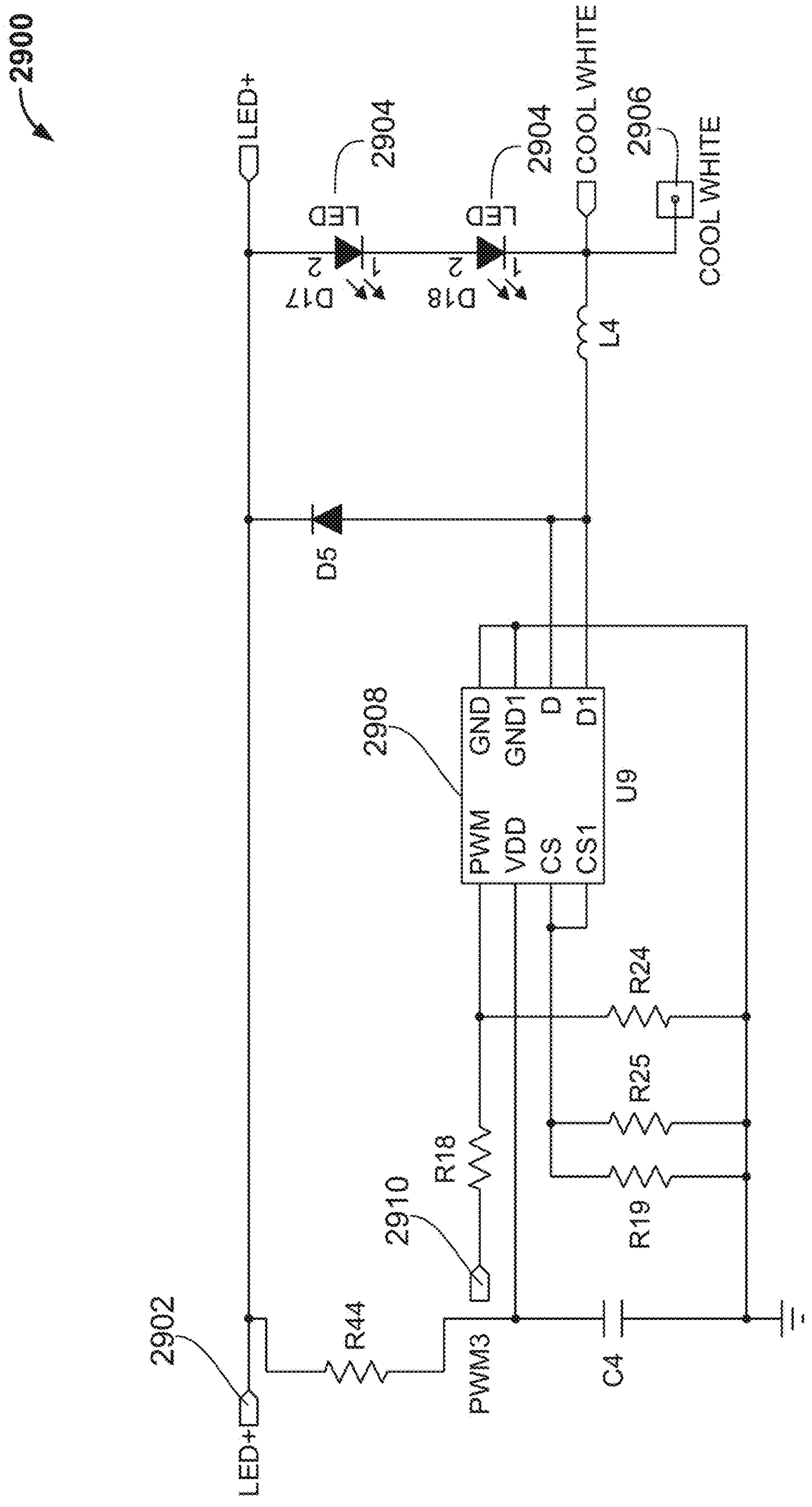
FIG. 29 shows schematically illustrative apparatus in accordance with the principles of the invention.

FIG. 29 shows schematically illustrative LED module circuit 2900. Circuit 2900 may correspond to a buck converter, such as buck converter 936-2, and an LED light source, such as LED light source 934-2. Circuit 2900 may receive input 2902 (LED+). Input 2902 may be fed by output 2706 of boost converter 2700. Circuit 2900 may include one or more LEDs 2904 (D14, e.g.). LEDs 2904 may emit cool white light based on current passed from input 2902 to terminal 2906 (COOL WHITE−). Circuit 2900 may include IC 2908 (U1). IC 2908 may adjust the current based on input 2910. Input 2910 may include a PWM signal. The PWM signal may be determined based lighting control information. The lighting control information may be received from power transmission line 904.

Figure 30:
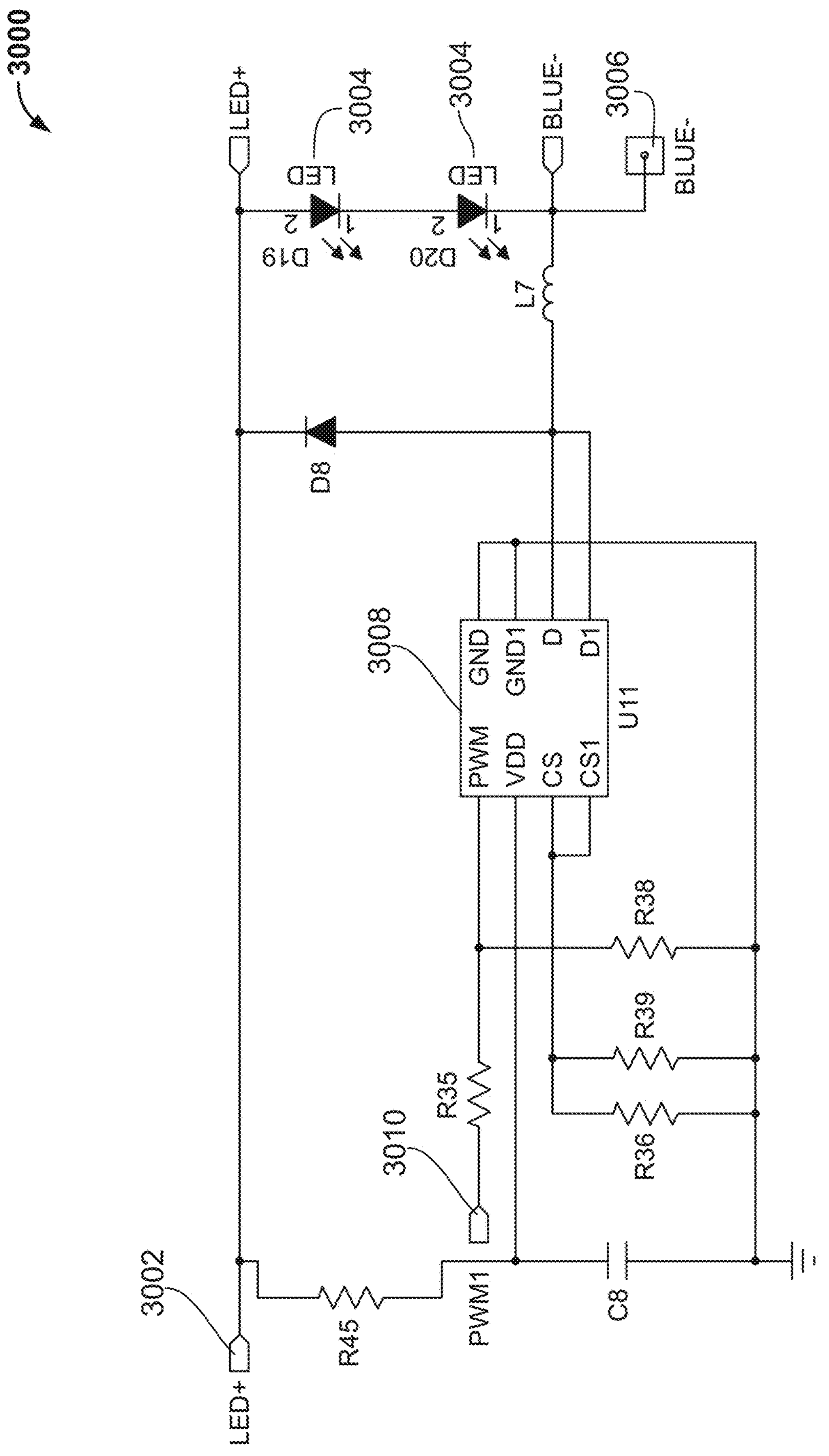
FIG. 30 shows schematically illustrative apparatus in accordance with the principles of the invention.

FIG. 30 shows schematically illustrative LED module circuit 3000. Circuit 3000 may correspond to a buck converter, such as buck converter 936-3, and an LED light source, such as LED light source 934-3. Circuit 3000 may receive input 3002 (LED+). Input 3002 may be fed by output 2706 of boost converter 2700. Circuit 3000 may include one or more LEDs 3004 (D14, e.g.). LEDs 3004 may emit blue light based on current passed from input 3002 to terminal 3006 (BLUE−). Circuit 3000 may include IC 3008 (U1). IC 3008 may adjust the current based on input 3010. Input 3010 may include a PWM signal. The PWM signal may be determined based lighting control information. The lighting control information may be received from power transmission line 904.

Figure 31:
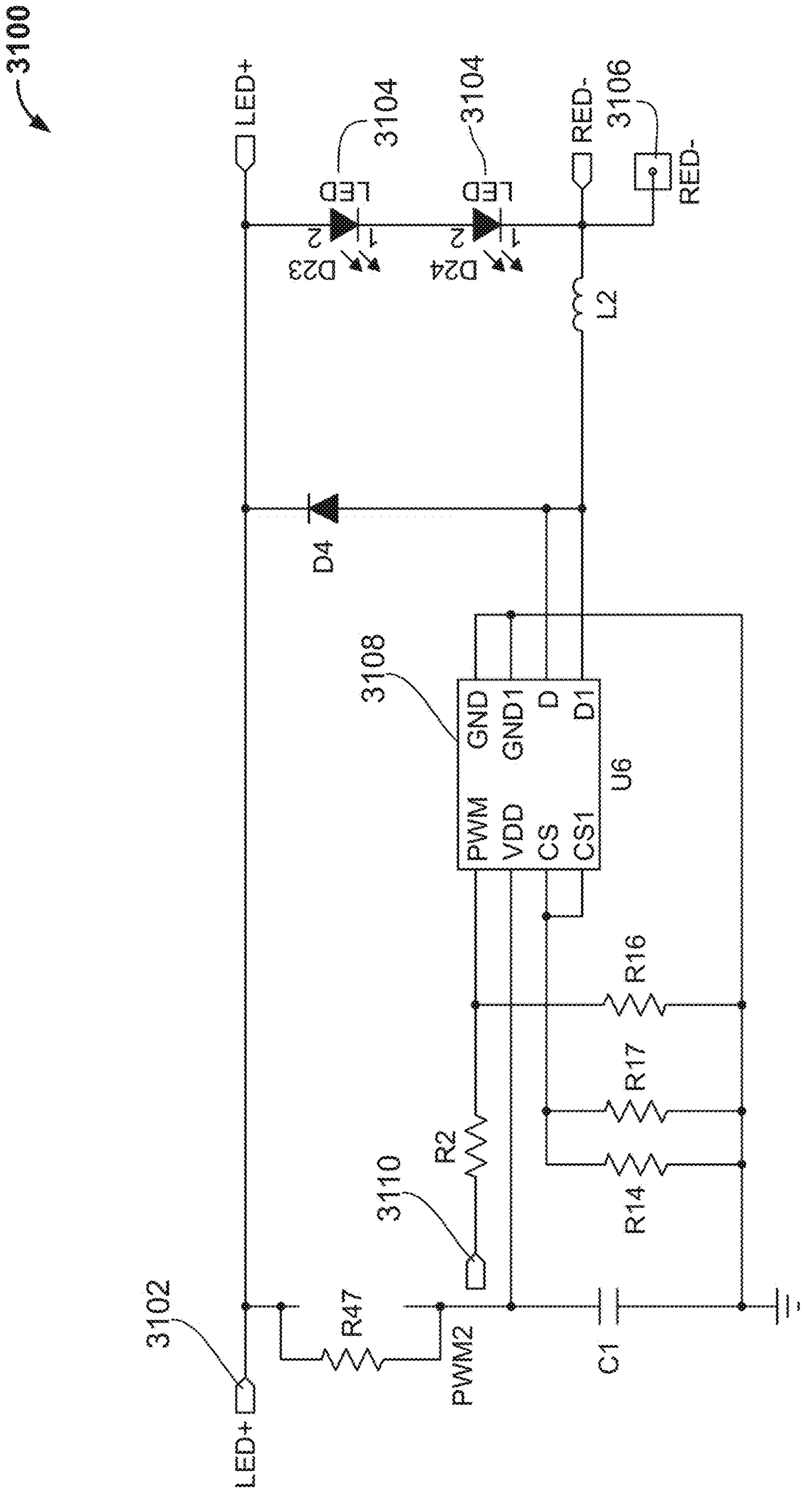
FIG. 31 shows schematically illustrative apparatus in accordance with the principles of the invention.

FIG. 31 shows schematically illustrative LED module circuit 3100. Circuit 3100 may correspond to a buck converter, such as buck converter 936-4, and an LED light source, such as LED light source 934-4. Circuit 3100 may receive input 3102 (LED+). Input 3102 may be fed by output 2706 of boost converter 2700. Circuit 3100 may include one or more LEDs 3104 (D14, e.g.). LEDs 3104 may emit red light based on current passed from input 3102 to terminal 3106 (RED−). Circuit 3100 may include IC 3108 (U1). IC 3108 may adjust the current based on input 3110. Input 3110 may include a PWM signal. The PWM signal may be determined based lighting control information. The lighting control information may be received from power transmission line 904.

Figure 32:
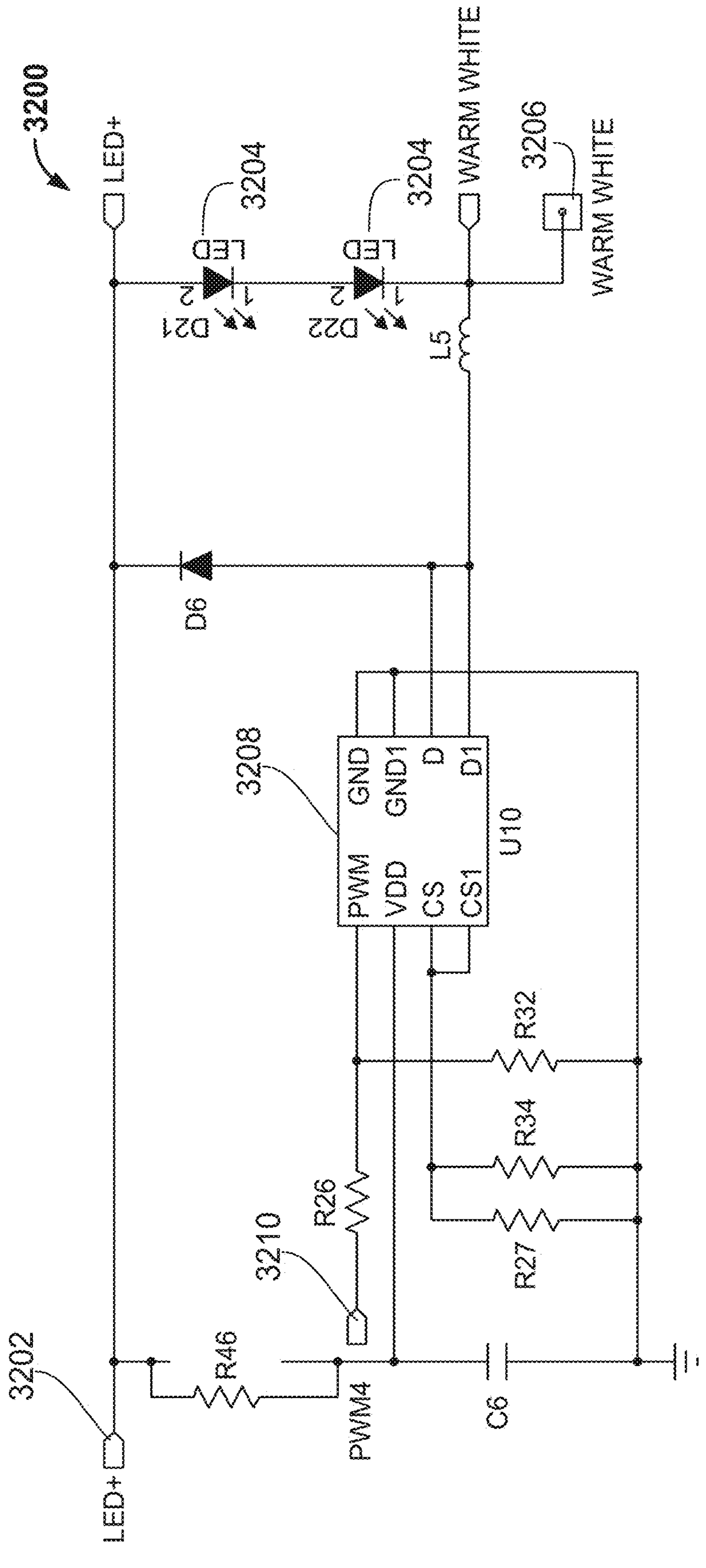
FIG. 32 shows schematically illustrative apparatus in accordance with the principles of the invention.

FIG. 32 shows schematically illustrative LED module circuit 3200. Circuit 3200 may correspond to a buck converter, such as buck converter 936-5, and an LED light source, such as LED light source 934-5. Circuit 3200 may receive input 3202 (LED+). Input 3202 may be fed by output 2706 of boost converter 2700. Circuit 3200 may include one or more LEDs 3204 (D14, e.g.). LEDs 3204 may emit warm white light based on current passed from input 3202 to terminal 3206 (WARM WHITE−). Circuit 3200 may include IC 3208 (U1). IC 3208 may adjust the current based on input 3210. Input 3210 may include a pulse-width modulated ("PWM") signal. The PWM signal may be determined based lighting control information. The lighting control information may be received from power transmission line 904.

Figure 33:
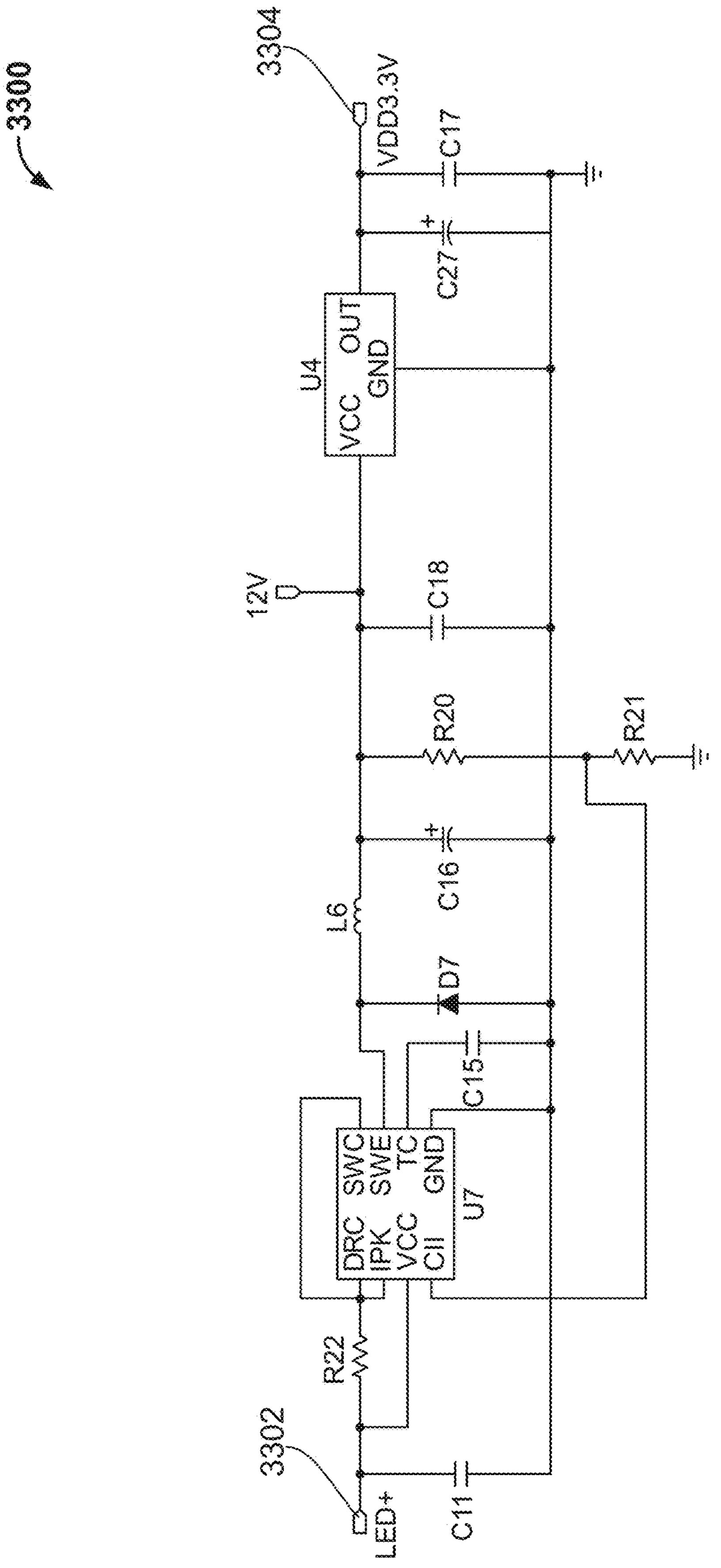
FIG. 33 shows schematically illustrative apparatus in accordance with the principles of the invention.

FIG. 33 shows schematically illustrative power supply circuit 3300. Circuit 3300 may receive input 3302 (LED+). Circuit 3300 may provide output 3304 (VDD3.3V). Output 3304 may provide a DC voltage that is suitable for providing powering a microcontroller.

Figure 34:
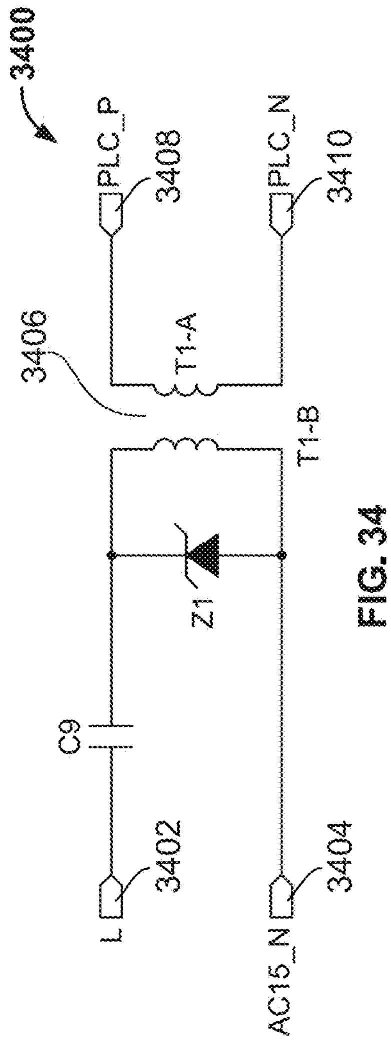
FIG. 34 shows schematically illustrative apparatus in accordance with the principles of the invention.

FIG. 34 shows schematically illustrative PLC interface circuit 3400. Interface circuit 3400 may be included in fixture 906. Interface circuit 3400 may receive inputs 3402 (L) and 3404 (AC15_N). Interface circuit 3400 may include transformer 3406 (T1-A and T1-B). Interface circuit 3400 may provide outputs 3408 (PLC_P) and 3410 (PLC_N), which together may provide an analog PLC signal.

Inputs 3402 and 3404 together may receive power from power transmission line 904. Circuit 3400 may derive the analog PLC signal from inputs 3402 and 3404 and provide the analogy signal as outputs 3408 and 3410. The analog PLC signal may include encoded lighting control information.

A PLC module (not shown) such as 930 may decode the encoded lighting control information.

Figure 35:
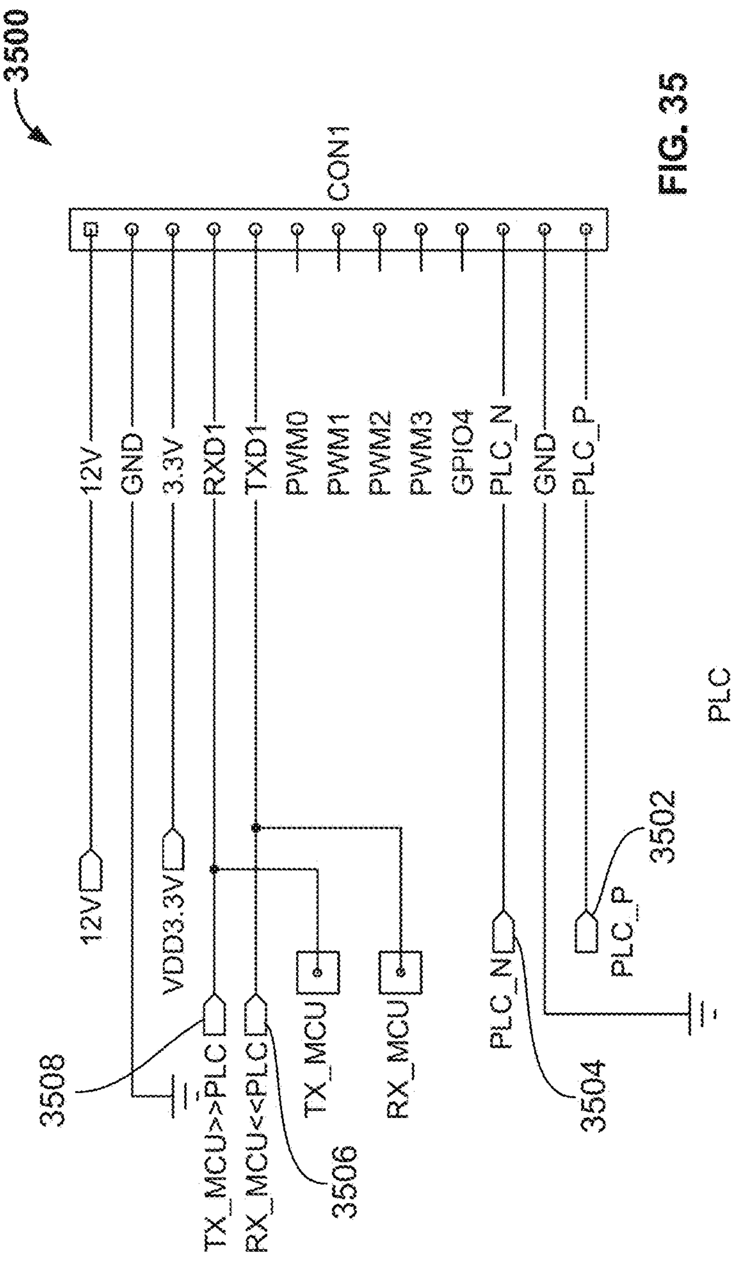
FIG. 35 shows schematically illustrative apparatus in accordance with the principles of the invention.

FIG. 35 shows schematically illustrative PLC module connector 3500 (CON1). Connector 3500 may be configured to connect to a PLC encoder/decoder module (for example, Model No. PLM4010B-B111-HC1S, available from Shenzhen Lihe Microelectronics Co., Ltd., 11F, Research Building, Tsinghua Info-port, North of Hi-Tech Industrial Park, Nanshan District, Shenzhen, Guangdong, P. R. C.; not shown).

Connector 3500 may receive inputs 3502 (PLC_P) and 3504 (PLC_N). Inputs 3502 and 3504 may be fed from outputs 3408 and 3410, respectively.

Connector 3500 may provide output 3506 (RX_MCU<<PCL). Connector 3500 may receive input 3508 (RX_MCU>>PLC). Output 3506 may include lighting control information. Input 3508 may support communication between the PLC encoder/decoder module and a microcontroller such as microcontroller 932 in fixture 906.

Figure 36:
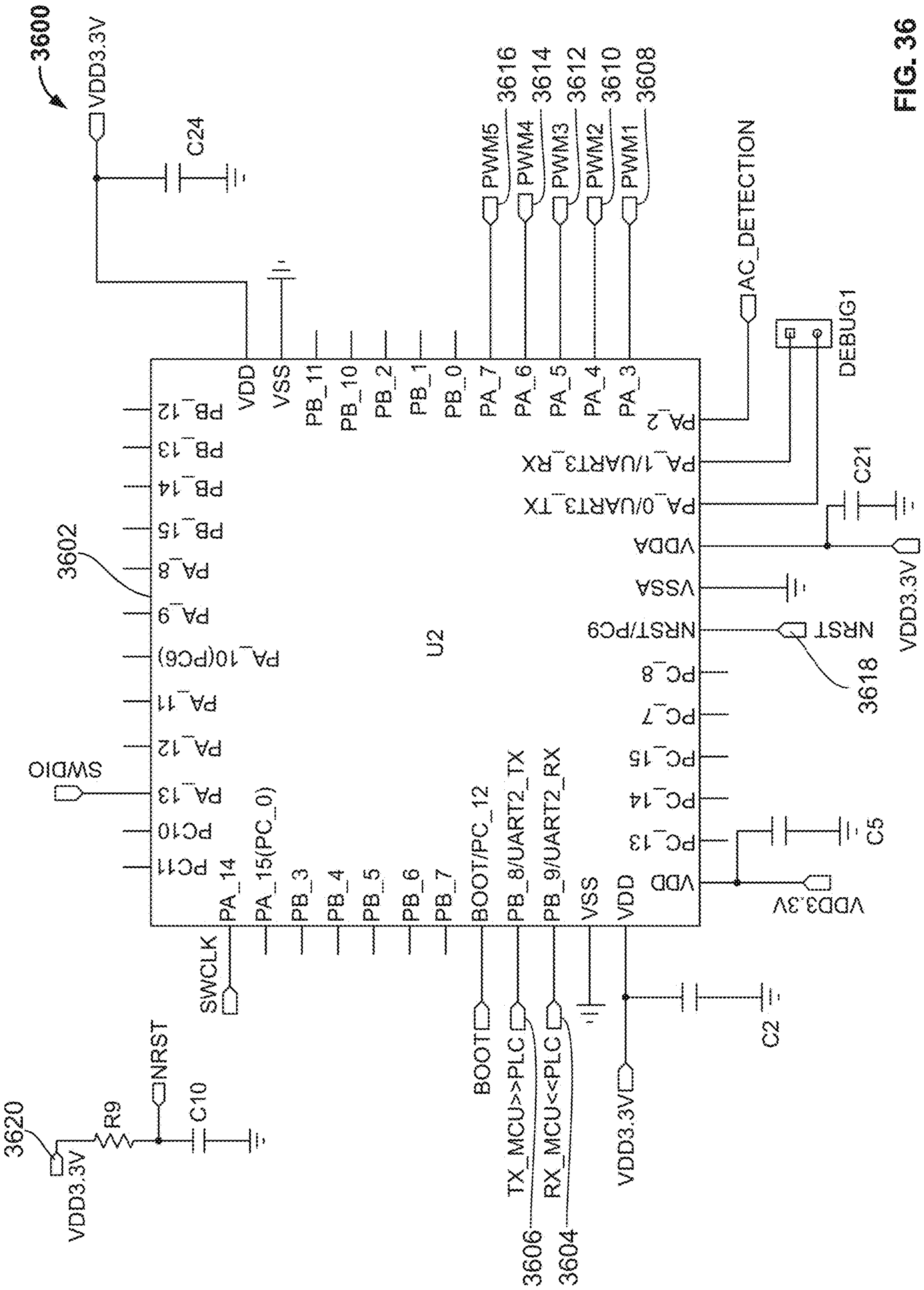
FIG. 36 shows schematically illustrative apparatus in accordance with the principles of the invention.

FIG. 36 shows schematically control circuit 3600. Control circuit 3600 may correspond to microcontroller 932. Control circuit 3600 may include microcontroller 3602 (U2).

Microcontroller 3602 may receive input 3604. Input 3604 may be fed by output 3506 of circuit 3500. Microcontroller 3602 may provide output 3606. Output 3606 may feed input 3508 of circuit 3500. Output 3606 may support the communication of output 3506 to microcontroller 3602.

Microcontroller 3602 may generate one or more of PWM signals 3608 (PWM1), 3610 (PWM2), 3612 (PWM3), 3614 (PWM4) and 3616 (PWM5). PWM signals 3608 (PWM1), 3610 (PWM2), 3612 (PWM3), 3614 (PWM4) and 3616 (PWM5) may feed inputs 2810, 2910, 3010, 3110 and 3210, respectively, of LED module circuits 2800, 2900, 3000, 3100 and 3200, respectively. Microcontroller 3602 may generate the PWM signals based on lighting control information in input 3604 of microcontroller 3602.

Microcontroller 3602 may receive input 3618 (NRST). Input 3618 may be pulled up by a voltage in input 3620 (VDD3.3V). Input 3620 may be fed by output 3304 of circuit 3300. Input 3620 may be responsive to a pattern such as pattern 702. Input 3620 may be pulled high by a pulse such as a pulse 706. Input 3620 may be pulled low by a pause such as a pause 708.

Microcontroller 3602 may include a counter. Microcontroller 3602 may include a timer. The counter may count pulses. Microcontroller 3602 may include memory. The memory may include predetermined pattern information. The predetermined pattern information may correspond to a pattern such as pattern 702. Table 8 lists illustrative predetermined pattern information.

TABLE 8

| Illustrative predetermined pattern information.<br>Illustrative pattern information |
| --- |
| Length of pattern (sec.) |
| Length of pulse (sec.) |
| Length of pause (sec.) |
| Number of pulses (no.) (1-100, e.g.) |
| Other suitable information |

Microcontroller 3602 may use the counter and the timer to determine if pulses received in input 3618 conform to predetermined pattern information. If the pulses received in input 3618, microcontroller may execute a step of a fixture discovery process.

Figure 37:
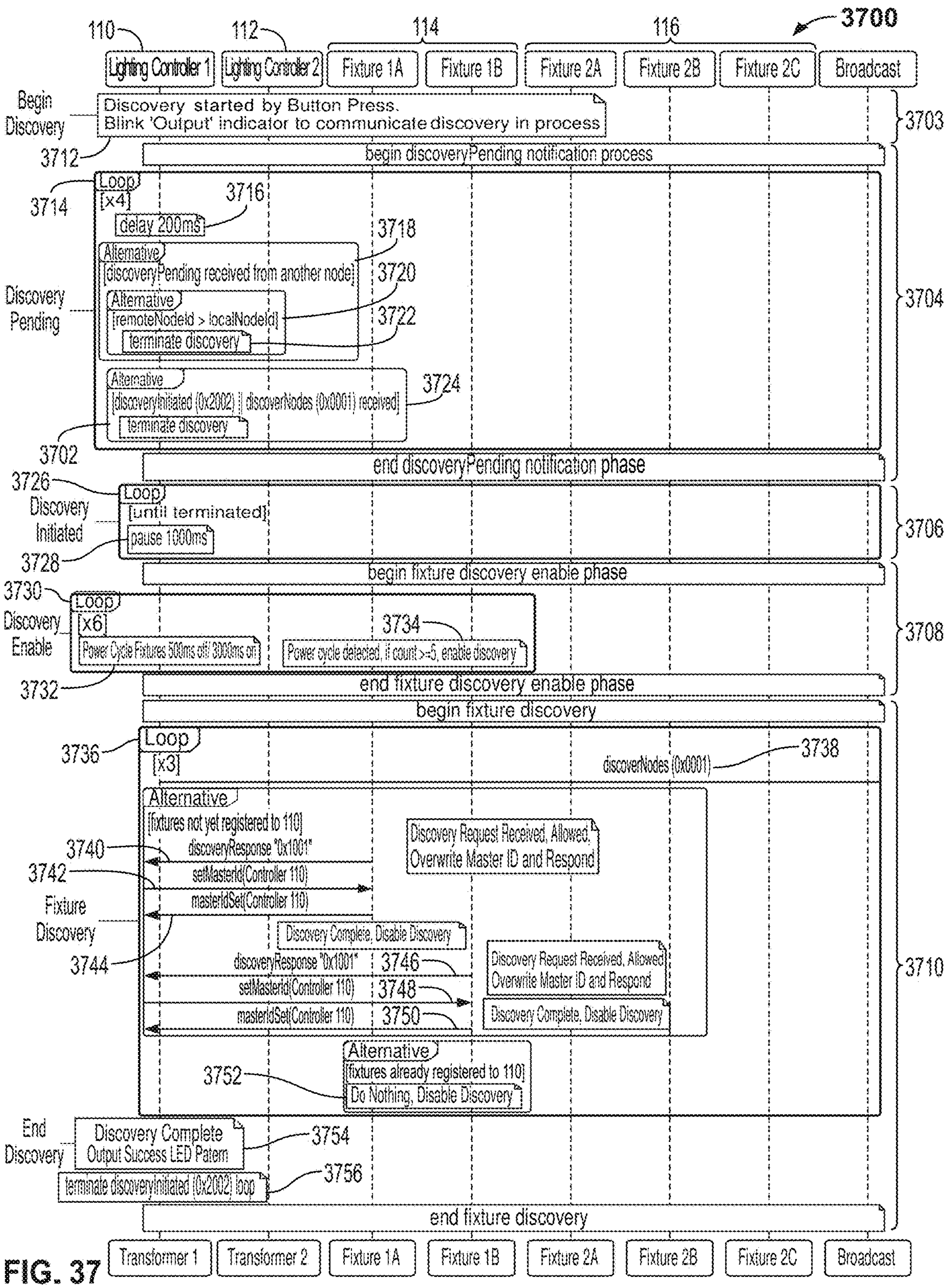
FIG. 37 shows an illustrative process in accordance with the principles of the invention.
Figure 38:
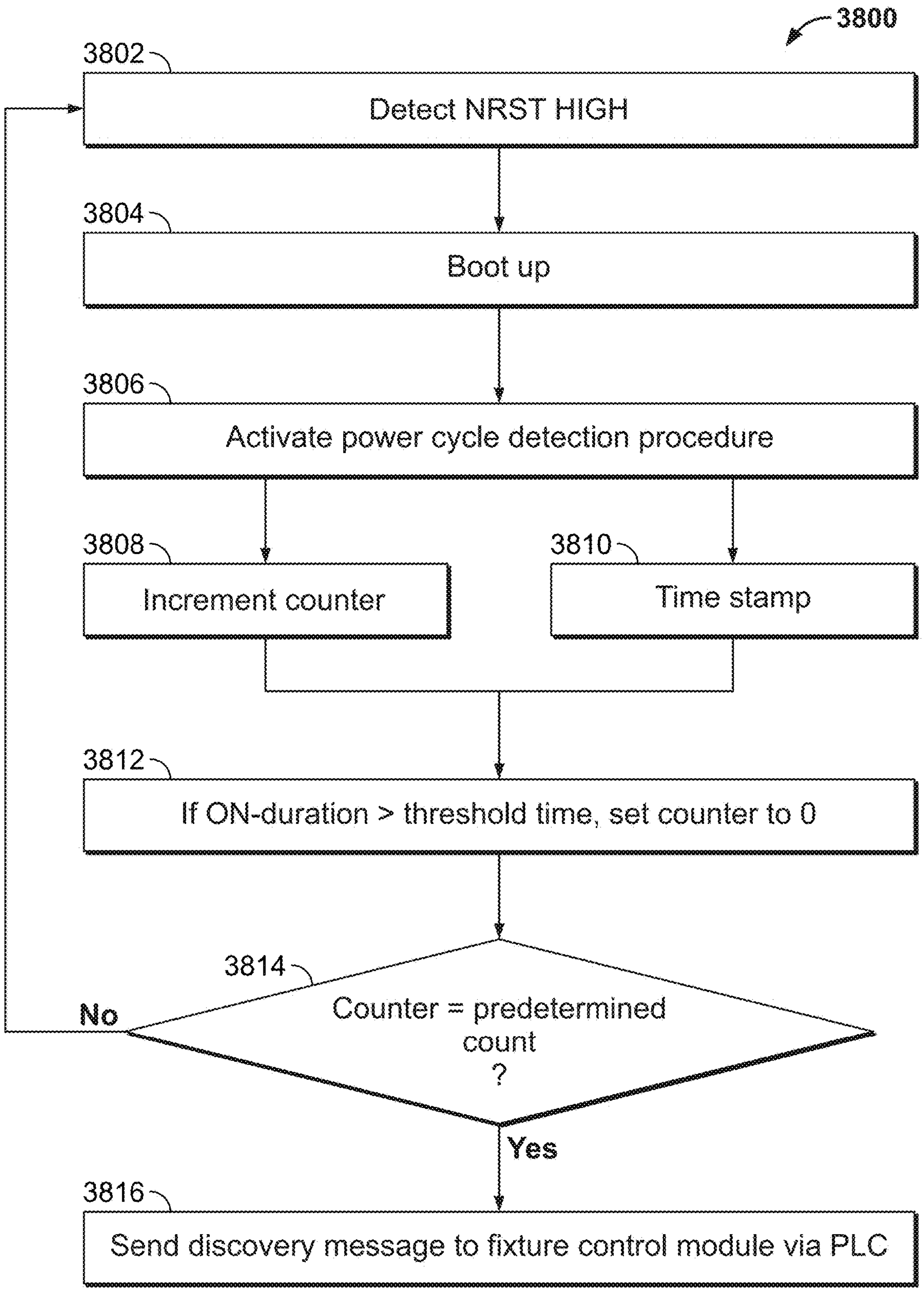
FIG. 38 shows an illustrative process in accordance with the principles of the invention.

Processes in accordance with the principles of the invention may include one or more features of the processes illustrated in FIGS. 37-38. For the sake of illustration, the steps will be described as being performed by a "system". The "system" may include one or more of the features of apparatus and schemas illustrated in FIGS. 1-36 or any other suitable device or approach.

FIG. 37 shows illustrative process 3700. Steps of the process may involve communication between apparatus such as fixture control module 110, fixture control module 114, fixtures of fixture string 114, fixtures of fixture string 116 and other suitable fixtures. Apparatus are represented by dashed vertical lines. Process steps are represented by horizontal fields such as 3702.

Where a process field overlaps a vertical line, the apparatus corresponding to the line is a transmitter or a receiver of information communicated by the process step in the overlapping field. For example, field 3702 overlaps fixture control module 110, fixture control module 112 and Fixture 1A.

Process 3700 may include BEGIN DISCOVERY phase 3703. Process 3700 may include DISCOVERY PENDING NOTIFICATION phase 3704. Process 3700 may include DISCOVERY INITIATED phase 3706. Process 3700 may include DISCOVERY ENABLE phase 3708. Process 3700 may include FIXTURE DISCOVERY phase 3710.

In phase 3703, at step 3712, the system may detect a button-press. The system may cause an indicator LED to blink to communicate to a user that the system detected the button-press (for example, corresponding to sensor 1910).

In response to the button press, the system may begin phase 3704. The system may perform loop 3714. Loop 3714 may include step 3716, which is a delay. The delay may be 200 ms or any other suitable length of time. One or both of lighting controllers 110 and 112 may transmit a DISCOV- ERY PENDING message along a power transmission line. At step 3718, one or both of lighting controllers 110 and 112 may receive a DISCOVERY PENDING message from the other, or another, fixture control module. The DISCOVERY PENDING MESSAGE may have been transmitted via cross-talk such as $CT_{1-2}$ or $CT_{2-1}$. At step 3720, each fixture control module may determine whether the received DISCOVERY PENDING MESSAGE was received from another fixture control module of higher rank. At step 3722, a lower-ranking fixture control module may terminate its own phase 3704. This may eliminate the transmission of fixture control information via $CT_{1-2}$ and $CT_{2-1}$ by all but the highest-ranking fixture control module. At step 3724, the fixture control module may receive from a different fixture control module a DISCOVERY INITIATED message. Then, the system may terminate discovery. At step 3724, the fixture control module may receive from a different fixture control module a DISCOVER-NODES message. Then, the system may terminate discovery. Communication in phase 3704 may reach all fixture control modules. Communication in phase 3704 may reach all fixtures.

If in phase 3704, it is determined that Fixture Control Module 1 (110) has priority to discover fixtures, process 3700 may continue in phase 3706. In phase 3706, Fixture Control Module 1 (110) may initiate loop 3726. Loop 3726 may include pause 3728. In loop 3726, Fixture Control Module 1 (110) may transmit a DISCOVERY INITIATED message over the power transmission line. Loop 3726 may continue until discovery is terminated.

In phase 3708, Fixture Control Module 1 (110) may initiate loop 3730. In power cycle 3732, Fixture Module 1 (110) may transmit a pattern such as pattern 702 over the power transmission line in a power cycle. The power cycle may be generated by Fixture Control Module 1 (110) only. The power cycle 3732 may be transmitted to fixture string 114 only. At step 3734, Fixtures 1A and 1B may detect the power cycle. Fixtures 2A and 2B may be unable to detect the power cycle. If in step 3734 one or both of Fixtures 1A and 1B counts a predetermined number of pulses, fixture discovery may be enabled.

In phase 3710, fixture discovery may be performed. Phase 3710 may include loop 3736. At step 3738, Fixture Control Module 1 (110) may transmit via channel 204 a DISCOVER-NODES message. The DISCOVER-NODES message may reach all fixture control modules. The DISCOVER-NODES message may reach all fixtures.

At step 3740, Fixture 1A may transmit to Fixture Control Module 1 (110) via channel 204 a DISCOVERY-RESPONSE message. The DISCOVERY-RESPONSE message may indicate that Fixture 1A is present on power transmission line 1, because only fixtures on power transmission line 1 were enabled by power cycle 3732. The DISCOVERY-RESPONSE message may include an identifier that identifies Fixture 1A. At step 3742, Fixture Control Module 1 (110) may transmit to Fixture 1A via channel 204 a setMasterID message. The setMasterID message may set in a memory of Fixture 1A an identifier corresponding to Fixture Control Module 1 (110).

At step 3744, Fixture 1A may transmit to Fixture Control Module 1 (110) via channel 204 a MasterIDSet message. The MasterIDSet message may confirm that Fixture 1A set Fixture Control Module 1 (110) as the fixture control module to which it is connected via power transmission line 1. Fixture Control Module 1 (110) may thus know that Fixture 1A is connected to Fixture Control Module 1 (110) via power transmission line 1. Fixture 1A may thus know that it is to act only upon instructions received via channel 204 that identify Fixture Control Module 1 (110). Discovery for Fixture 1A may now be complete. Fixture 1A may thus be registered to Fixture Control Module 1 (110).

At step 3746, Fixture 1B may transmit to Fixture Control Module 1 (110) via channel 204 a DISCOVERY-RESPONSE message. The DISCOVERY-RESPONSE message may indicate that Fixture 1B is present on power transmission line 1, because only fixtures on power transmission line 1 were enabled by power cycle 3732. The DISCOVERY-RESPONSE message may include an identifier that identifies Fixture 1B. At step 3748, Fixture Control Module 1 (110) may transmit to Fixture 1B via channel 204 a setMasterID message. The setMasterID message may set in a memory of Fixture 1B an identifier corresponding to Fixture Control Module 1 (110).

At step 3750, Fixture 1B may transmit to Fixture Control Module 1 (110) via channel 204 a MasterIDSet message. The MasterIDSet message may confirm that Fixture 1B set Fixture Control Module 1 (110) as the fixture control module to which it is connected via power transmission line 1. Fixture Control Module 1 (110) may thus know that Fixture 1B is connected to Fixture Control Module 1 (110) via power transmission line 1. Fixture 1B may thus know that it is to act only upon instructions received via channel 204 that identify Fixture Control Module 1 (110). Discovery for Fixture 1B may now be complete. Fixture 1B may thus be registered to Fixture Control Module 1 (110).

Steps 3740 to 3750 may be performed for fixtures that are on power transmission line 1 but are not yet registered to Fixture Control Module 1 (110). For fixtures that are on power transmission line 1 and already are registered to Fixture Control Module 1 (110), process 3700 may include step 3752. At step 3752, the fixture may communicate no discovery message to Fixture Control Module 1 (110). At step 3754, discovery may be completed. The system may turn on an indicator LED indicating that discovery is completed. At step 3756, the system may terminate loop 3726 (Discovery Initiated).

FIG. 38 shows illustrative process 3800 that may be performed by a microcontroller such as 3602 in a fixture. At step 3802 the fixture may detect an elevated voltage at an NRST pin. At step 3804, the microcontroller may boot up in response to the elevated voltage. At step 3806, the microcontroller may activate a power cycle detection procedure. At step 3808, the microcontroller may increment a counter in response to the boot. The microcontroller may store the count in non-volatile memory. At step 3810, the microcontroller may record the time of the boot. At step 3812, the microcontroller may reset the counter if the elevated voltage is sustained for a predetermined amount of time ("ON-DURATION"). At step 3814, the microcontroller may determine if the counter value has reached a predetermined count. If at step 3814, the microcontroller determines that the count has not reached the predetermined count, the microcontroller may return to step 3802 to detect another elevated voltage. If at step 3814, the microcontroller determines that the count has reached the predetermined count, the microcontroller may move to step 3816 to send discovery message to fixture control module via the PLC module.

Table 9 lists illustrative parts for a lighting controller such as lighting controller 902.

TABLE 9

Illustrative parts for a fixture control module such as fixture control module 902.

| Illustrative Part | Identifier |
|---|---|
| Push-button switch ZE 107S | SW3 |
| Plug-in optocoupler PC817C 4-pin Galaxy | U5 U8 U10 |
| Ethernet port, with LED RJ45 TYPEA | CON2 |
| Plug-in IC DC-DC B0505S-1WR3 SIP4 | T3 |
| Electrolytic capacitor 10 uF/50 V ± 20% 105° C. Φ5*11 12.7 hole spacing tape | C19, C44, C64, C29, C38 |
| Electrolytic capacitor 22 uF ± 20% 63 V 105° C. Φ5*11 mm 5000H | C4 C18 C21 |
| Electrolytic capacitor 330 uF/25 V, +20%, 125° C., Φ8*16 | C69 |
| X2 safety capacitor 10 nF 310 V 10% P 7.5 | C51 |
| Button cell LIR2032 3.6 V 40 mAH | |
| DIP battery holder BS02A1AK001 | BAT1 |
| PLC module PLM4010B B111 HC1S Right angle pin header | CON4 |
| Common mode choke amorphous T16X10X8 | L5 |
| 14# Teflon wire, Blue | L1, L2 |
| 18# Teflon wire, White | AC15_L |
| 18# Teflon wire, Black | AC15_N |
| Double network port female input RJ45 | T10 |
| Electrolytic capacitor 100 UF/10 V ± 20% 105° C. Φ5*11 tape 4000H | C35, C70, C63 |
| Electrolytic capacitor 330 uF/35 V ± 20% 105° C. Φ10*12.5 | C2 |
| Electrolytic capacitor 1000 uF 35 V 105° C. Φ10*20 mm | C67 |
| 22# Teflon wire, Red | VCC |
| 22# Teflon wire, Black | GND |
| 22# Teflon wire, Blue | RX_MCU<<DISPLAY |
| 22# Teflon wire, Brown | TX_MCU<<DISPLAY |
| Antenna adapter | WIFI |
| 22# Teflon wire, Gray | S pin of U9, S pin of U3 |
| 22# Teflon wire, Pink | G pin of U9, G pin of U3 |
| 1/10W Chip resistor, 0R ± 5% (0603) | R37, R38, R54, R126, R135-R142 |
| 1/10W Chip resistor, 100R ± 1% (0603) | R1 R2 R8 R10 R49 R50 R58-R60 R102-R105 R131 |
| 1/10W Chip resistor, 10K ± 5% (0603) | R3 R20 R79 R84 R87 R89 R90 R92 R93 R48 |
| 1/10W Chip resistor_4.7K ± 1% (0603) | R5 R9 R107 |
| 1/10W Chip resistor, 2.2K ± 1% (0603) | R6 R11 |
| 1/10W Chip resistor, 10R ± 1% (0603) | R7 R62 R64 R66-R71 |
| 1/8W Chip resistor 2K ± 1% 0805 | R17 R43 |
| 1/8W Chip resistor, 220Ω ± 1% (0805) | R33 |
| 1/10W Chip resistor, 1K ± 1% (0603) | R101 R100 R19 R29 R55-57 R61 R73 R82 83 R85 R88 R91 R96 R106 R129 |
| 1/10W Chip resistor, 1.5K ± 1% (0603) | R63 |
| 1/10W Chip resistor, 49.9R ± 1% (0603) | R72 R75-R78 |
| 1/10W Chip resistor_12K ± 1% (0603) | R74 |
| 1/10W Chip resistor, 300R ± 1% (0603) | R80 R81 |
| 1/8W Chip resistor, 20K ± 1% (0805) | R12 R39 |
| 1/8W Chip resistor, 22K ± 1% (0805) | R13 R32 R40 |
| 1/8W Chip resistor, 10K ± 1% (0805) | R18, R23, R34 |
| 1/8W Chip resistor, 30K ± 5% (0805) | R98, R144 |
| 1/8W Chip resistor, 510R ± 1% (0805) | R30 |
| 1/8W Chip resistor, 4.7K ± 1% (0805) | R31 |
| 1/8W Chip resistor, 47KΩ ± 1% (0805) | R94 R95 |
| 1/8W Chip resistor, 220K ± 5% (0805) | R97 |
| 1/8W Chip resistor, 0R ± 5% (0805) | R99 R128 R130 R132, R15, R41 |
| 1/4W Chip resistor, 1K ± 5% (1206) | R51 R27 R46 |
| 1/4W Chip resistor, 0.33R ± 1% (1206) | R65 |
| 1/4W Chip resistor_0.2R ± 1% (1206) | RS, RS1 |
| Chip capacitor 18 pF/50 V, ± 5%, 125° C. (0603) | C3 C7 C40 C41 |
| X7R Chip capacitor 100 nF/50 V, ± 10%, 125° C. (0603) | C5 C8 C14 C17 C31-C34 C39 C42 C43 C53 C56 C58-C62 C28 |
| X7R Chip capacitor 1 uF/50 V, ± 10%, 125° C. (0603) | C6 C30 C54 C55 C57 |
| X7R Chip capacitor 100 nF/50 V, ± 10%, 125° C. (0805) | C9-C13 C15 C20 C27 C46-C50 C36 C65 C37 |
| X7R Chip capacitor 1 uF/50 V, ± 10%, 125° C. (0805) | C22 C45 C71 |
| X7R Chip capacitor 1 nF/500 V, ± 10% 125° C. (1206) | C23 |
| Chip two-way TVS tube 7 V/12 V (SOT-23) SM712 | TVS1 |
| Chip resettable fuse 0.05 A/6 0V (1206) | F1 F2 |
| 1/4W Chip resistor, 0R ± 5% (1206) | F4 |

TABLE 9-continued

| Illustrative parts for a fixture control module such as fixture control module 902. | |
|---|---|
| Illustrative Part | Identifier |
| Slow-blow chip FUSE 12A/250VAC (6.1*2.8*2.8) | F3 |
| Chip voltage-regulator IC, 78M12, TO-252 | U1 |
| FLASH chip CAT24M01WI-GT3 SOIC-8 ONSEMI | U2 |
| Chip IC, MCU, STM32F412RET6 LQFP64 ST | U14 |
| Chip optocoupler ELM453 (TA)-V 5-SOP | U17 U18 U20 U23 |
| Chip IC, 1117-3.3, SOT-223 | U13 |
| Chip Ethernet PHY layer chip LAN8720AI 24-QFN | U21 |
| Chip IC AP0809ES3-s SOT-23 | U22 |
| Chip IC MCU STM32F030C8T6 LQFP-48 ST | U24 |
| Chip IC INS5710C | U25 |
| Chip IC CN3130 battery charge | U26 |
| Chip IC MCU MESILICON ME32F031C8T6 LQFP48 | U27 |
| Chip IC MAX13085EESA + T SOIC-8 | |
| Chip NPN triode MMBT3904 SOT-23 | Q2, Q3, Q6-Q8 |
| Chip PNP triode MMBT3906 β = 50~100 SOT-23 | Q4 Q9 |
| Chip field-effect transistor 3N10_3A/100V (SOT-23) | Q5, Q15 |
| Chip PMOS 4.2 A 30 V NCE3401 SOT-23 | Q10 |
| Chip NMOS LBSS138LTIG 0.2 A/50 V SOT-23 | Q11-Q14 |
| Chip rectifier bridge 1 A/800 V, MBF10K, MBF | DB2 |
| Chip crystal oscillator SMD3225 25 MHz 18 pF 85° C. | Y1 |
| Chip crystal oscillator SMD5032 8 MHz 18 pF | Y3 |
| WIFI module ESP32 WROVER IE N8R8 (IPEX)8M | WIFI |
| Chip voltage-regulator diode 15 V/MM1ZB15/0.5 W SOD-123 | Z1 Z2 |
| HOYOL 0603 blue LED wavelength 465 ± 5 nm | D1, D5, D19 |
| Chip Schottky diode 3 A/40 V DSS34 SOD-123FL | D2, D7 |
| Chip fast recovery diode 1 A/1000 V RSIMGR SMA | D3 D9 |
| Chip switching diode, SOD1F6, 1 A/600 V, SOD-123FL | D4 |
| Chip switching diode, IN4148W, 0.15 A/75 V, SOD-123 | D8 |
| Chip inductor 47 uH ± 20% 2.5 A 7*6.6*3.8 mm | L3 |
| Chip two-way TSS tube P0300SA SMA | Z5 |
| Double-sided FR4 135.4X144.1X1.6 mm | |
| 1/4W Chip resistor, 6.8K ± 1% (1206) | R110 |
| 1/4W Chip resistor_8.2K ± 1% (1206) | R111 |
| PLC transformer LC60868 | T2 |
| Chip IC Huihai H6215L ESOP8 | U19 |
| 1/4W Chip resistor, 51K ± 5% (1206) | SR1 |
| 1/4W Chip resistor, 20R ± 1% (1206) | SR2 |
| X5R Chip capacitor 10 UF/16 V ± 20%_85° C. (0805) | C68 |
| 1/8W Chip resistor, 30K ± 5% (0805) | R124 |
| 1/8W Chip resistor, 100K ± 1% (0805) | R125 |
| Chip Schottky Diode 5 A/60 V, SS56, SMA | D10, D11 |
| Chip switching diode 0.2 A/200 V, BAV21W, SOD-123 | D12 |
| X7R Chip capacitor 100 nF/50 V, ± 10%, 125° C. (1206) | SC3, C66 |
| 1/4W Chip resistor 2K ± 1% (1206) | R122 |
| Chip two-way TVS tube 43 V/600W (SMB) SMBJ43CA | TVS4 |
| Chip Schottky bridge rectifier 5 A/40 V | DB5 |
| Chip voltage-regulator IC, LD1117A, 3.3V, SOT-89 | U32, U33 |
| Chip IC Developer DPDW01 SOT23-6 RoHS | U34 |
| Chip IC Developer DP8205 SOT23-6 RoHS | Q1 |
| 1/4W Chip resistor, 0R ± 5% (1206) | R36, R143 |
| 1/4W Chip resistor, 280R ± 1% (1206) | R127 |
| Other suitable parts | |

Table 10 lists illustrative parts for a fixture such as fixture 906.

TABLE 10

| Illustrative parts for a fixture such as fixture 906. | |
|---|---|
| Illustrative Part | Identifier |
| Electrolytic Capacitor 1500 uF/25 V ± 20% 105° C. Φ12.5*20 | C12 |
| Electrolytic Capacitor 330 uF/25 V, ± 20%,125° C.,Φ8*16 | C16 |
| Electrolytic Capacitor 1500 uF/25 V ± 20% 105° C. Φ10*20 7000H | C20 |
| Electrolytic Capacitor 330 uF/50 V ± 20% 105°C Φ10*20 braid | C35 |
| X2 Safety Capacitor 10 nF 310 V 10% P 7.5 | C9 |
| Co mmon mode inductor amorphous T16X10X8 | L8 |
| Filter inductor T16*8.5*5.9 50uH ± 10% | L9 |
| 15 VAC smart dimming LED driver SMD component 5831 | |
| PLC module PLM4010B B111 HCIS 90 degree bent pin header | CON1 |
| U2 firmware ME32F031C8T6 REV.B (V05.42) | U2 |

TABLE 10-continued

| Illustrative parts for a fixture such as fixture 906. | |
|---|---|
| Illustrative Part | Identifier |
| Electrolytic Capacitor 100 UF/10 V ± 20% 105°C Φ5*11 tape 4000H | C27 |
| SMD IC H5118 SOP8 RoHS | U1 U6 U9 U10 U11 |
| SMD IC MCU ME32F031C8T6 LQFP48 | U2 |
| SMD N-MOSFET 15N10, TO-252 | U3 |
| SMD IC MP3910GK-Z MSOP10 RoHS | U5 |
| SMD IC MC34063A SOP-8 VCC −0.3- + 40 V RoHS | U7 |
| SMD IC, 1117-3.3, SOT-223 | U4 |
| SMD inductor 8*8*4 mm 100 uH ± 20% 1 A RoHS | L2 L3 L4 L5 L7 |
| SMD inductor 8*8*4 mm 220 uH ± 20% 0.8 A RoHS | L6 |
| SMD schottky Diode 5 A/40 V GVS54BF SMBF | D1D3D11D12D13 |
| SMD Diode, IN4148W, 0.15 A/75 V, SOD-123 | D2 |
| SMD schottky Diode 3 A/40 V DSS34 SOD-123FL | D7 |
| SMD schottky Diode 5 A/60 V, SS56, SMA | D4 D5 D6 D8 D10 |
| 1/10W SMD Resistor 330K ± 1% (0603) | R1 R29 |
| 1/10W SMD Resistor, 1K ± 1% (0603) | R6, R9 |
| 1/10W SMD Resistor, 10K ± 5% (0603) | R7 |
| 1/10W SMD Resistor, 15K ± 5% (0603) | R10 |
| 1/10W SMD Resistor, 2K ± 1% (0603) | R16, R24, R31, R32, R38 |
| 1/10W SMD Resistor, 13K ± 1% (0603) | R8, R20 |
| 1/10W SMD Resistor, 1.5K ± 1% (0603) | R21 |
| 1/10W SMD Resistor, 100K ± 5% (0603) | R30 |
| 1/8W SMD Resistor, 10R ± 1% (0805) | R3 |
| 1/2W SMD Resistor 0.01R ± 1% (1206) | R5 |
| SMD Resistor, 1/4W, 0.68R ± 1% (1206), ROHS | R12, R14, R19, R27, R36 |
| 1/4W SMD Resistor, 0.33R ± 1% (1206) | R22 |
| X7R SMD Capacitor 1 uF/50 V, ± 10%, 125° C. (0603) | C1, C4, C6, C7, C8 |
| X7R SMD Capacitor 100 nF/50 V, ± 10%, 125° C. (0603) | C2 C5 C11 C21 C24 |
| X7R SMD Capacitor 1 uF/50 V, ± 10%, 125° C. (0603) | C10 |
| X7R SMD Capacitor 22 nF/50 V_ ± 10%_125° C. (0603) | C13 |
| X7R SMD Capacitor 220 nF/50 V ± 10% 125° C. (0603) | C23 |
| NPO SMD Capacitor 470 pF/50 V, ± 5%, 125° C. (0805) | C15 |
| X7R SMD Capacitor 100 nF/50 V, ± 10%, 125° C. (0805) | C17 C18 |
| NPO SMD Capacitor 22 pF/50 V_ ± 5%_125° C. (0603) | C25 |
| X7R SMD Capacitor 4.7 uF/25 V, ± 10%, 125° C. (0805) | C14 |
| X7R SMD Capacitor 1 uF/50 V, ± 10%, 125° C. (0805) | C22 |
| SMD TVS P0300SA SMA | Z1 |
| PLC Transformer LC60868 | T1 |
| PCB, FR4 φ36X1.2 mm 1X3 RoHS | |
| 1/4W SMD Resistor 3.9K ± 1% (1206) | R43, R44, R45, R46, R47 |
| SMD FUSE 12 A/250 VAC (6.1*2.8*2.8) | F1 |
| X7R SMD Capacitor 10 nF/1KV, ± 10%, 125° C. (1206) | C26 |
| 1/10W SMD Resistor, 470 R ± 1% (0603) | R2, R11, R18, R26, R35 |
| 1/4W SMD Resistor, 0.56R ± 1% (1206) | R17, R25, R33, R34, R39 |
| SMD TVS 43 V/600 W (SMB) SMBJ43CA | TVS1 |
| SMD schottky Diode, DSK26, 2A/60V, SOD-123FL | D9 |
| 1/8W SMD Resistor, 100K ± 1% (0805) | R41 |
| 1/8W SMD Resistor, 10K ± 1% (0805) | R42 |
| Other suitable parts | |

Functions of electrical circuits, or parts thereof, disclosed herein may be incorporated into or combined with other electrical circuits, or parts thereof, disclosed herein, or with other suitable electrical circuits.

All ranges and parameters disclosed herein shall be understood to encompass any and all subranges subsumed therein, every number between the endpoints, and the endpoints. For example, a stated range of "1 to 10" should be considered to include any and all subranges between (and inclusive of) the minimum value of 1 and the maximum value of 10; that is, all subranges beginning with a minimum value of 1 or more (e.g. 1 to 6.1), and ending with a maximum value of 10 or less (e.g., 2.3 to 9.4, 3 to 8, 4 to 7), and finally to each number 1, 2, 3, 4, 5, 6, 7, 8, 9, and 10 contained within the range.

Thus, apparatus, methods and algorithms for lighting have been provided. Persons skilled in the art will appreciate that the present invention may be practiced by other than the described embodiments, which are presented for purposes of illustration rather than of limitation.

What is claimed is:

1. A method for discovering a first fixture that is wired to a power transmission line, the method comprising:

activating a switch on a lighting controller, the activating causing the lighting controller to execute an identification process including:

transmitting along the power transmission line a lighting power pattern that is configured to be received by a first fixture and not by a second fixture; and receiving along the power transmission line, in response to the power pattern, a fixture identification code from the first fixture, and not the second fixture, thereby confirming that the first fixture and not the second fixture is wired to the power transmission line.

2. The method of claim 1 wherein the lighting controller is configured to, in response to the activating, transmit over the power transmission line lighting control information that is readable by both the first fixture and the second fixture.

3. The method of claim 2 wherein the identification process further includes transmitting, via the power transmission line, a discovery-pending message.

4. The method of claim 3 wherein the identification process further includes, when:

the lighting controller is a first lighting controller;

the power transmission line is a first power transmission line; and the discovery-pending message is a first discovery pending message, receiving, at the first lighting controller, a second discovery pending message from a second lighting controller via a second power transmission line.

5. The method of claim 2 wherein the lighting controller is further configured to:

transmit, along the power transmission line, lighting control information; and receive:

from the first fixture:

a response to the pattern; and a response to the lighting control information; and, from the second fixture, a response to the lighting control information and not the pattern.

* * * * *